(12) United States Patent
Dousson et al.

(10) Patent No.: US 12,539,332 B2
(45) Date of Patent: Feb. 3, 2026

(54) ANTI-VIRAL AND HEPATIC-TARGETED DRUGS

(71) Applicant: AI-BIOPHARMA, Montpellier (FR)

(72) Inventors: Cyril B. Dousson, Canet (FR); David Dukhan, Montpellier (FR)

(73) Assignee: A-BIOPHARMA, Montpellier (FR)

( * ) Notice: Subject to any disclaimer, the term of this patent is extended or adjusted under 35 U.S.C. 154(b) by 913 days.

(21) Appl. No.: 17/769,131

(22) PCT Filed: Oct. 19, 2020

(86) PCT No.: PCT/EP2020/079330
§ 371 (c)(1),
(2) Date: Apr. 14, 2022

(87) PCT Pub. No.: WO2021/074443
PCT Pub. Date: Apr. 22, 2021

(65) Prior Publication Data
US 2024/0139325 A1     May 2, 2024

(30) Foreign Application Priority Data
Oct. 17, 2019   (EP) ..................................... 19203962

(51) Int. Cl.
*A61P 31/20*       (2006.01)
*A61K 47/54*       (2017.01)

(52) U.S. Cl.
CPC ............ *A61K 47/548* (2017.08); *A61P 31/20* (2018.01)

(58) Field of Classification Search
CPC .............................. A61K 47/548; A61P 31/20
See application file for complete search history.

(56) References Cited

U.S. PATENT DOCUMENTS

| 3,519,627 | A | * | 7/1970 | Nordstrom | ........... | C08K 5/3492 544/207 |
| 2005/0282782 | A1 | | 12/2005 | Martin | | |

FOREIGN PATENT DOCUMENTS

| CN | 101475594 A | 7/2009 |
| CN | 102850402 A | 1/2013 |
| CN | 104710477 A | 6/2015 |
| CN | 108912172 A | 11/2018 |
| EP | 0481214 A1 | 4/1992 |
| JP | H04230694 A | 8/1992 |
| JP | H07128820 A | 5/1995 |
| JP | 2002-505333 A | 2/2002 |
| WO | 9945016 A2 | 9/1999 |
| WO | 2017156262 A1 | 9/2017 |
| WO | 2017220028 A1 | 12/2017 |
| WO | 2019120301 A1 | 6/2019 |

OTHER PUBLICATIONS

Lin et al. "Metabolic activation of pradefovir by CYP3A4 and its potential as an inhibitor or inducer." Antimicrobial agents and chemotherapy 50.9 (2006). 6 pages.
Wang et al. "Design, synthesis, and anti-HBV activity of new bis (l-amino acid) ester tenofovir prodrugs." ACS medicinal chemistry letters 10.6 (2019). 5 pages.
International Search Report for corresponding international application No. PCT/EP2020/079330, dated Jan. 19, 2021.
Gripon et al., "Infection of a human hepatoma cell line by hepatitis B virus", PNAS, vol. 99, No. 24, pp. 5655-15660, Nov. 26, 2002.
Luangsay et al., "Early inhibition of hepatocyte innate responses by hepatitis B virus", Jul. 24, 2015.

\* cited by examiner

*Primary Examiner* — Timothy R Rozof
(74) *Attorney, Agent, or Firm* — Leason Ellis LLP

(57) ABSTRACT

Disclosed herein are identified compound fragments, compounds and their pharmaceutically acceptable salts, isotopes or solvates, useful as antiviral drug and/or as a hepatic-targeted drug, such as for the treatment of HBV, HDV and/or HIV. Formula (I).

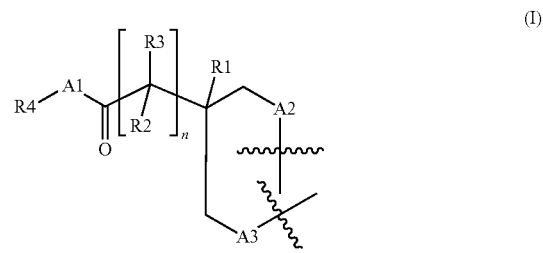

14 Claims, No Drawings

ANTI-VIRAL AND HEPATIC-TARGETED DRUGS

CROSS-REFERENCE TO RELATED PATENT APPLICATIONS

This application is a U.S. National Stage Application under 35 U.S.C. § 371 of International Patent Application No. PCT/EP2020/079330 filed Oct. 19, 2020, which claims the benefit of priority of European Patent Application No. 19203962.6 filed Oct. 17, 2019, both of which are incorporated by reference in their entireties. The International Application was published on Apr. 22, 2021, as International Publication No. WO/2021/074443 A1.

The present invention relates to the fields of chemistry, biochemistry and medicine. More specifically, the present invention concerns hepatic-targeted and/or antiviral drugs and prodrugs, their production processes and their uses.

Viral infectious diseases are considered our days as a major society health issue. Indeed, the fast mutating viruses, in addition to the regular discovery of new viral illnesses makes the task of finding cures endless. Even the treatment of well-known viral diseases such as HBV (hepatitis B virus), HDV (hepatitis D virus) or even HIV (human immunodeficiency virus) are therefore still a matter of concern and research.

One of the well-known ways to treat viral infections is to provide an inhibitor of the RNA and/or DNA replication of the viruses.

For example, Pradefovir is such a type of antiviral drug. Pradefovir is more specifically a prodrug with a particular activity against the hepatitis B virus. Pradefovir is metabolized in the liver by hepatic enzymes (mainly by CYP4503A4) into Adefovir, which in turn is phosphorylated by cellular kinases to its activated form Adefovir diphosphate. The diphosphate form then directly competes with the natural substrate dATP and is incorporated into the viral DNA. This enables to inhibit the RNA dependent DNA polymerase and causes DNA chain termination, and thus the inhibition of HBV replication. Other examples may be found in documents CN108912172A, WO2017220028A1, CN104710477A, CN102850402A or in CN101475594A.

The chemical structure of Pradefovir is thus of interest because it first enables a hepatic targeting. This is of course of interest because many viruses (e.g. the hepatitis family) will concentrate in the liver.

In this context, EP0481214 discloses prodrugs of phosphonate nucleotides analogs. J. E. Starrett, et al. (J. Med. Chem. 1994, 37, 1857-1864) also disclose a series of phosphonates prodrugs in attempt to increase their oral bioavailability.

WO2017/156262 also discloses nucleotide analogs for treating HBV, HDV and/or HIV. As reported in this document, Hepadnavirus family are enveloped viruses utilizing partially double-stranded, partially single-stranded circular DNA genomes. Some of these viruses (Orthohepdnaviruses) cause liver diseases in mammals. Hepatitis B is a causative agent of acute/chronic hepatitis, and has a partially double-stranded 3.2 kb circular DNA from which four proteins are synthesized: the core, polymerase, surface antigen and X-gene product.

During hepatitis infection, HBV virions enter hepatocytes through a receptor-mediated process. Viral replication occurs through a multi-step mechanism. First, the circular, partially double-stranded DNA genome is transcribed by the host cell machinery, and then the full length RNA transcript is packaged into viral procapsids. The transcript is then reverse-transcribed within the capsid by the P protein, utilizing the P protein's intrinsic protein priming activity. The RNA component is then degraded by an intrinsic RNase H activity of the P protein, to yield a full-length minus-strand circular DNA. Finally, a subsequent partial plus-strand DNA is synthesized to yield the final viral genome assembly.

As moreover explained in WO2017/156262 Viral capsids also may release the circular, partially double stranded genome into the nucleus of host cells, where synthesis of the complementary strand to the single stranded region is completed and the remaining viral ends are ligated to form the covalently closed circular DNA (cccDNA), which persists in host cell nuclei and can be passed on to daughter cells during cell division. The presence of the cccDNA gives rise to the risk of viral reemergence throughout the life of the host organism. Additionally, HBV carriers can transmit the disease for many years. Immunosuppressed individuals are especially at risk for the establishment of persistent (chronic) or latent HBV infection. HDV is a sub viral satellite of HBV, and thus, may only propagate in the presence of HBV. See, e.g., Shieh, et al., Nature, 329(6137), pp. 343-346 (1987). Replication of the single-stranded circular RNA HDV genome produces two forms of an RNA-binding protein known as the long and small delta antigens (Ag). After entering a hepatocyte, the virus is uncoated and the nucleocapsid translocated to the nucleus. The virus then uses the host cell's RNA polymerases, which treat the RNA genome as dsDNA due to its tertiary structure. Three forms of RNA are produced during replication: circular genomic RNA, circular complementary antigenomic RNA and a linear polyadenylated antigenomic RNA.

WO2017/156262 moreover reports that HBV and HDV are primarily transmitted by blood or mucosal contact, including by sexual activity. Infection with HBV and/or HDV leads to a wide spectrum of liver disease ranging from acute (including fulminant hepatic failure) to chronic hepatitis, cirrhosis and hepatocellular carcinoma. Acute HBV and/or HDV infection can be asymptomatic, or present with symptomatic acute effects, including fever, headaches, joint aches, and diarrhea, leading to the more severe symptoms of liver enlargement and/or jaundice associated with conjugated hyperbilirubinemia and cholestasis. Most adults infected with the virus recover, but 5%-10% are unable to clear the virus and become chronically infected. Many chronically infected individuals have persistent mild liver disease (latent HBV and/or HDV), presenting with lymphoid aggregates and bile duct damage, steatosis and/or increased fibrosis that may lead to cirrhosis. Others with chronic HBV and/or HDV infection develop active disease, which can lead to life-threatening conditions such as cirrhosis and liver cancer. Some subjects with latent HBV and/or HDV may relapse and develop acute hepatitis.

As it is also disclosed in WO2017/156262, HIV is a lentivirus that belongs to the Retroviridae family. HIV is an enveloped virus with a core consisting of two copies of a positive single-stranded RNA. HIV relies upon reverse transcriptase for reverse transcription of RNA into DNA, which becomes incorporated into host genome as a provirus. HIV uses viral glycoprotein 120 (gp 120) to bind to and infect CD4+ T lymphocytes. An increase in viral plasma load corresponds to a decrease in CD4+T lymphocyte counts. Normal CD4+ T lymphocyte levels are from about 500 to 1,200 cells/mL. Two types of HIV have been characterized, HIV-1 and HIV-2. HIV-1 is more virulent and more infective, and has a global prevalence, whereas HIV-2 is less virulent and is geographically confined. WO2017/156262 thus tries to address these diseases by providing specific compounds.

Moreover, WO2019120301A1 discloses a liver specific delivery (LSD)-based entecavir antiviral prodrug, comprising a nucleoside cyclic phosphate compound, used separately, or in combination with other antiviral drugs against viruses, such as hepatitis B virus (HBV).

In terms of synthesis, US2005/0282782 discloses methods for the synthesis of cyclic phosphonic acid diesters from 1,3-diols, whereby cyclic phosphonic acid diesters are produced by reacting a chiral 1,3-diol and activated phosphonic acid in the presence of a Lewis acid.

However, there is still a need for antiviral drugs, in particular means to more specifically target the liver cells where such viruses replicate.

The present invention answers this need by providing new compounds and by identifying a chemical moiety with specific activities.

SUMMARY OF THE INVENTION

The subject matter of the present invention concerns a chemical moiety of formula (I):

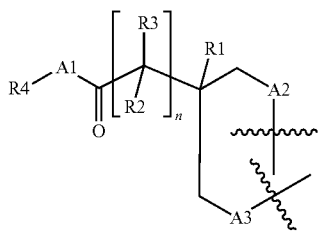

(I)

or a pharmaceutically acceptable salt, isotope or solvate thereof,
wherein
  A1 represents O, S or NR5,
  A2 represents O, S or NR6,
  A3 represents O, S or NR7,
  R1, R2 and R3 each independently represent H, an optionally substituted $C_1$-$C_8$ alkyl, or a halogen, and R2 and R3 can be linked together with the carbon atom to which they are attached to form a 3- to 9-membered cyclic optionally substituted cycloalkyl fragment,
  R4 and R5 each independently represent H, an optionally substituted $C_1$-$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl),
  when A1 is NR5, R4 can be linked with R5 and form a cyclic amine with the N of NR5,
  R6 represents H or an optionally substituted $C_1$-$C_8$ alkyl, a $C_1$-$C_8$ haloalkyl, a $C_1$-$C_8$ hydroxyalkyl,
  R7 represents H, an optionally substituted $C_1$-$C_8$ alkyl,
  n represents an integer comprised from 1 to 3,
  q, r, u, w and z independently represent an integer chosen from 0 or 1.

The subject matter of the present invention thus concerns a chemical moiety according to the present invention (e.g. formula (I)) for use in a medicament.

The subject matter of the present invention thus also concerns a chemical moiety according to the present invention (e.g. formula (I)) for use as a hepatic targeting agent.

Moreover, the subject matter of the present invention concerns a compound of formula (II):

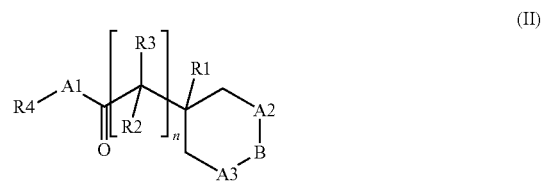

(II)

or a pharmaceutically acceptable salt, isotope or solvate thereof,
wherein
  A1, A2, A3, R1, R2, R3, R4 and n are as defined above, and
  B is a condensed and/or grafted pharmaceutical active compound.

Furthermore, the subject matter of the present invention concerns a compound of formula (IIA):

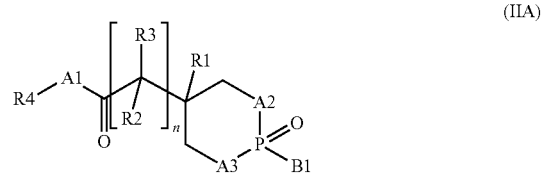

(IIA)

or a pharmaceutically acceptable salt, isotope or solvate thereof,
wherein
  A1 represents O, S or NR5,
  A2 represents O, S or NR6,
  A3 represents O, S or NR7,
  R1, R2 and R3 each independently represent H, an optionally substituted $C_1$-$C_8$ alkyl, or a halogen, and R2 and R3 can be linked together with the carbon atom to which they are attached to form a 3- to 9-membered cyclic optionally substituted cycloalkyl fragment,
  R4 and R5 each independently represent H, an optionally substituted $C_1$-$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl),
  when A1 is NR5, R4 can be linked with R5 and form a cyclic amine with the N of NR5,
  R6 represents H or an optionally substituted $C_1$-$C_8$ alkyl, a $C_1$-$C_8$ haloalkyl, a $C_1$-$C_8$ hydroxyalkyl,
  R7 represents H, an optionally substituted $C_1$-$C_8$ alkyl,
  n represents an integer comprised from 1 to 3, and
  q, r, u, w and z independently represent an integer chosen from 0 or 1, and B1 either represents a nucleoside moiety such as a chemical moiety of formula (IIB1):

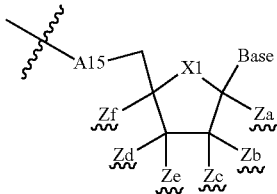

(IIB1)

wherein

A15 represents O or $(CH_2)_{q3}$, q3 represents an integer chosen from 0 or 1

X1 represents O, S, $CH_2$, CH(A16), $C(A16)_2$, C=$CH_2$, C=CH(A16), or C=$C(A16)_2$, NR20

A16 represents a halogen atom, such as F or Cl,

R20 represents H or an optionally substituted $C_1$-$C_8$ alkyl, a $C_1$-$C_8$ haloalkyl, or a $C_1$-$C_8$ hydroxyalkyl, Za represents H, CN, C≡CH, $N_3$, $CH_2$(A17), CH(A17)$_2$, C(A17)$_3$, or a halogen atom such as F or Cl, Zb represents H, $C_1$-$C_6$ alkyl such as $CH_3$, CN, C≡CH, OR21, or a halogen atom such as F, Cl or Br, Zc represents H, $N_3$, C≡CH, $NH_2$, CN, OR21, or a halogen atom such as F, Cl or Br, Zb and Zc can optionally be linked together with the carbon atom to which they are attached to form a 3- to 6-membered cyclic, optionally substituted, oxo-cycloalkyl fragment, Zd represents H, $C_1$-$C_6$ alkyl such as $CH_3$, C≡CH, OR21, or a halogen atom such as F or Cl, Ze represents OR21, $NH_2$, H, or a halogen atom such as F or Cl, Zf represents H, $C_1$-$C_6$ alkyl such as $CH_3$, $CH_2$(A17), CH(A17)$_2$, C(A17)$_3$, C≡CH, CH=$CH_2$, $C_3H_5$, CH=C=$CH_2$, $N_3$, CN, or a halogen atom such as F, Cl or Br, A17 represents a halogen atom, such as F, Cl or Br, R21 represents H or an optionally substituted $C_1$-$C_8$ alkyl, a $C_1$-$C_8$ haloalkyl, or a $C_1$-$C_8$ hydroxyalkyl, and Base represents a chemical moiety chosen from adenine, cytosine, guanine, thymine, uracil, purine, hypoxanthine, xanthine, 5-fluorouracil, 7-deazaadenine, 7-fluoro-7-deazaadenine, N4-hydroxycytosine, 2-fluoroadenine, 2-chloroadenine, 2,6-diaminopurine, 2-aminopurine, 6-ethoxy-2-aminopurine, 6-methylamino-2-aminopurine, 4-aminoimidazo[2,1-f][1,2,4]triazine (7-C-linked) and 4-aminopyrrolo[2,1-f][1,2,4]triazine (7-C-linked)

or

B1 represents a chemical moiety of formula (IIB2):

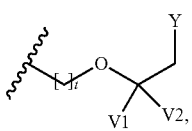

(IIB2)

wherein t represents an integer comprised from 0 to 3,

V1 and V2 each independently represent H, an optionally substituted $C_1$-$C_6$ alkyl, or V1 and V2 can be linked together with the carbon atom to which they are attached to form a 3- to 13-membered cyclic, optionally substituted, cycloalkyl fragment, and Y represents a nucleobase.

Therefore, the subject matter of the present invention may specifically concern a compound of formula (IIA1):

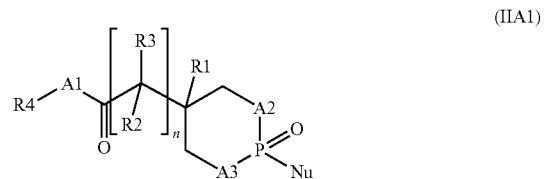

(IIA1)

or a pharmaceutically acceptable salt, isotope, or solvate thereof, wherein

A1 represents O, S or NR5,

A2 represents O, S or NR6,

A3 represents O, S or NR7,

R1, R2 and R3 each independently represent H, an optionally substituted $C_1$-$C_8$ alkyl, or a halogen, and R2 and R3 can be linked together with the carbon atom to which they are attached to form a 3- to 9-membered cyclic optionally substituted cycloalkyl fragment, R4 and R5 each independently represent H, an optionally substituted $C_1$-$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl), when A1 is NR5, R4 can be linked with R5 and form a cyclic amine with the N of NR5, R6 represents H or an optionally substituted $C_1$-$C_8$ alkyl, a $C_1$-$C_8$ haloalkyl, a $C_1$-$C_8$ hydroxyalkyl, R7 represents H, an optionally substituted $C_1$-$C_8$ alkyl, n represents an integer comprised from 1 to 3, Nu represents a nucleoside moiety and q, r, u, w and z independently represent an integer chosen from 0 or 1.

The subject matter of the present invention thus concerns a compound (IIA; IIA1) as defined presently for its use as a medicament.

The subject matter of the present invention thus concerns a compound (IIA; IIA1) as defined presently for its use as an antiviral drug and/or as a hepatic-targeting drug, such as for the treatment of HBV, HDV and/or HIV infections.

The subject matter of the present invention thus concerns a compound (IIA; IIA1) as defined presently for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti- HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist.

Therefore, the subject matter of the present invention may also concern a compound of formula (III):

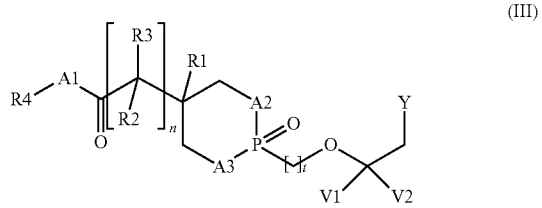

(III)

or a pharmaceutically acceptable salt or solvate thereof, wherein
A1, A2, A3, R1, R2, R3, R4 and n are as defined above
t represents an integer comprised from 0 to 3,
V1 and V2 each independently represent H, an optionally substituted $C_1$-$C_6$ alkyl, or V1 and V2 can be linked together with the carbon atom to which they are attached to form a 3- to 13-membered cyclic optionally substituted cycloalkyl fragment, and
Y represents a nucleobase.

It is to be noted that a particular embodiment of the present invention concerns a compound (III) according to the present invention of more specific formula (IV):

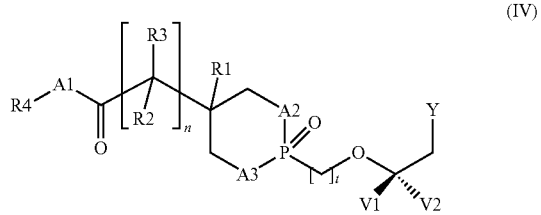

(IV)

wherein preferably
V1 represents H and V2 represents a methyl, or
V2 represents H and V1 represents a methyl.

The subject matter of the present invention therefore concerns a compound according to the present invention for its use as a medicament.

The subject matter of the present invention also concerns a compound according to the present invention for its use as an antiviral drug and/or as a hepatic-targeted drug, such as for the treatment of HBV, HDV and/or HIV.

Compound according to the present invention for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti-HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist.

DEFINITIONS

By "chemical moiety", it is meant in the context of the present invention a fragment that corresponds to a specific group of atoms within a molecule that is responsible for characteristic/specific chemical or biological reactions of that molecule. In the present case, formula (I) correspond to such a chemical moiety. A synonym could be a molecular fragment.

By "pharmaceutically acceptable salt, isotope or solvate thereof", it is meant in the context of the present invention a "pharmaceutically acceptable salt" "isotope" and "solvate" of the compounds which are not biologically or otherwise undesirable (e.g., is neither toxic nor otherwise deleterious to the recipient thereof). Accordingly, pharmaceutically acceptable salt, isotope or solvate of compounds of the present invention (e.g. Formula (II), (IIA), (IIA1), (III) and (IV)), their embodiments and more specific compounds described and claimed herein, do encompass stereoisomers, tautomers, physical forms (e.g., amorphous and crystalline forms), co-crystal forms, solvate and hydrate forms, and any combination of the foregoing forms where such forms are possible. The term "isotope" is the general definition known to the person skilled in the art, i.e. the same element that contain equal numbers of protons but different numbers of neutrons in their nuclei, and hence differ in relative atomic mass but not in chemical properties. In the context of the present invention, this means that for example any hydrogen on the formulas disclosed can be replaced by an isotope such as a deuterium or tritium atom, or that a carbon 12 can be replaced by a carbon 13 or even carbon 14, and so-on.

In the context of the present invention, the expression "independently represent" should be understood in the full extend of its meaning. For example concerning formula (I) above, the combination of expressions "R4 and R5 each independently represent H, an optionally substituted $C_1$-"$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl), with "q, r, u, w and z independently represent an integer chosen from 0 or 1" should be understood as "R4 represents H, an optionally substituted $C_1$-$C_{24}$ alkyl, a ($C_1$-$C_3$ alkylene)$_{q1}$-($C_3$-$C_7$ cycloalkyl), a ($C_1$-$C_3$ alkylene)$_{r1}$-($C_6$-$C_{10}$ aryl), a ($C_1$-$C_3$ alkylene)$_{u1}$-(4-7 membered heterocycloalkyl), a ($C_1$-$C_3$ alkylene)$_{w1}$-(5-6 membered monocycloheteroaryl) or a ($C_1$-$C_3$ alkylene)$_{z1}$-(9-10 membered bicycloheteroaryl), R5 represents H or an optionally substituted $C_1$-$C_{24}$ alkyl, a ($C_1$-$C_3$ alkylene)$_{q2}$-($C_3$-$C_7$ cycloalkyl), a ($C_1$-$C_3$ alkylene)$_{r2}$-($C_6$-$C_{10}$ aryl), a ($C_1$-$C_3$ alkylene)$_{u2}$-(4-7 membered heterocycloalkyl), a ($C_1$-$C_3$ alkylene)$_{w2}$-(5-6 membered monocycloheteroaryl), or a ($C_1$-$C_3$ alkylene)$_{z2}$-(9-10 membered bicycloheteroaryl), q1, r1, u1, w1 and z1 independently represent integers chosen from 0 or 1, and q2, r2, u2, w2 and z2 independently represent integers chosen from 0 or 1".

By "optionally substituted", it is meant in the context of the present invention that a hydrogen atom is replaced by a single entity such as a hydroxyl group, (C1-C6)-alkoxy, (C1-C6)-thioalkyl, or a halogen atom, preferably hydroxyl group or a halogen atom.

By "halogen", it is meant in the context of the present invention the general definition of a halogen, i.e. any of the elements fluorine, chlorine, bromine, iodine, and astatine, preferably fluorine, chlorine or bromine.

By "alkyl", it is meant here its general definition as known in the art, that is a group of atoms derived from an alkane (a hydrocarbon with no carbon-to-carbon multiple bonds) by the loss of at least one hydrogen atom. Indeed, the term "alkyl" embraces also cyclic or even multi cyclic alkyl groups wherein at least 2 hydrogen atoms have been lost. Such a cyclic or even multi cyclic alkyl groups is referred to as a "cycloalkyl" in the context of the present invention. However, when the alkyl group is bi-substituted, and thus corresponds to the formula —$(CH_2)_{n1}$— wherein n1 is a defined increment (e.g. by giving the number of carbon atoms).

By "aryl", it is meant here its general definition as known in the art, that is any functional group or substituent consisting of an aromatic ring, usually an aromatic hydrocarbon, such as a phenyl or a naphthyl group.

By "heterocycloalkyl", it is meant here its general definition as known in the art, that is a cyclic alkyl comprising a hetero atom, such as N, O, or S . . . , within the cycle. For example morpholine is such a heterocycloalkyl group.

By "condensed and/or grafted pharmaceutical active compound", it is meant in the context of the present invention that a pharmaceutical active compound has been reacted, for example by using a coupling agent which acts by eliminating at least one molecule of water (thus the use of term "condensed"), or by other means that generate any chemical bond ((thus the use of term "grafted").

By "hepatic targeting agent", it is meant in the context of the present invention that the liver is aimed thanks to the presence of the designed chemical fragment.

By "nucleobase", it is also comprised in the context of the present invention analogs of natural nucleobases i.e. a compound presenting similar structures and activities of a natural nucleobase.

DETAILED DESCRIPTION

Chemical Moiety and/or Compound

The following detailed description of the different groups A1, A2, A3, R1, R2, R3, R4, R5, R6, R7 and item "n" found in the chemical moiety and/or compound (and thus uses and methods thereof) of the present invention are given hereunder, in particular by way of different preferred combinations and preferred embodiments, to provide a more thorough understanding of the present invention.

Moreover, the compounds of the present invention (i.e. all formulas and specific embodiments) are those which are preferably stable at room temperature (20-25° C.). For example, in compound with moiety II or IIB1, if Zb is OR21 as disclosed above, depending of the environment conditions Zc may not be OR21, $NH_2$, F, Cl or Br and vice versa because acetal-types of products are known products which require specific environments (e.g. low temperatures) for them to be stable. Other types of such unstable-dependent-environment compounds can be found with compounds comprising a moiety of formula IIB1, when Ze is OR21 or $NH_2$, and Zd may thus not be OR21, F, Cl and vice versa. These types of unstable behaviours of compounds are usually well known by the person skilled in the art.

Preferably the compounds of the present invention are stable at room temperature (20-25° C.).

Groups A1, A2 and A3

A subject matter of present invention can concern a chemical moiety or a compound according to the present invention (e.g. formula (I), (II), (IIA), (IIA1), (III) and/or (IV)), wherein A1 can represent O.

A subject matter of present invention can concern a chemical moiety or a compound according to the present invention (e.g. formula (I), (II), (IIA), (IIA1), (III) and/or (IV)), wherein A2 can represent O.

A subject matter of present invention can concern a chemical moiety or a compound according to the present invention (e.g. formula (I), (II), (IIA), (IIA1), (III) and/or (IV)), wherein A3 can represent O.

Here under will be given examples of combinations of chemical moieties of the formulas of the present invention.

Combination 1 represents a preferred option of a chemical moiety or a compound according to the present invention (e.g. formula (I), (II), (IIA), (IIA1), (III) and/or (IV)) wherein A2 and/or A3 represent O.

Combination 2 represents another preferred option of a chemical moiety or a compound according to the present invention (e.g. formula (I), (II), (IIA), (IIA1), (III) and/or (IV)) wherein
A1 represents O, and
A2 and/or A3 represent O.

Combination 3 represents yet another preferred option of a chemical moiety or a compound according to the present invention (e.g. formula (I), (II), (IIA), (IIA1), (III) and/or (IV)) wherein
A1 represents S, and
A2 and/or A3 represent O.

Combination 4 represents yet again another preferred option of a chemical moiety or a compound according to the present invention (e.g. formula (I), (II), (IIA), (IIA1), (III) and/or (IV)) wherein
A1 represents NR5, and
A2 and/or A3 represent O.

Groups R1, R2 and R3

A subject matter of present invention can concern a chemical moiety or a compound according to the present invention (e.g. formula (I), (II), (IIA), (IIA1), (III) and/or (IV)), wherein R1 can represent H, a $C_1$-$C_6$ alkyl, a $C_1$-$C_6$ haloalkyl, a $C_1$-$C_6$ hydroxyalkyl, or a halogen. In particular, R1 can represent H or a $C_1$-$C_6$ alkyl. Preferably, R1 can represent H or a $C_1$-$C_4$ alkyl such as a methyl, ethyl, n-propyl, isopropyl, n-butyl, isobutyl, or tert-butyl. In an embodiment, R1 can represent H.

A subject matter of present invention can concern a chemical moiety or a compound according to the present invention (e.g. formula (I), (II), (IIA), (IIA1), (III) and/or (IV)), wherein R2 can represent H, a $C_1$-$C_6$ alkyl, a $C_1$-$C_6$ haloalkyl, a $C_1$-$C_6$ hydroxyalkyl, or a halogen. In particular, R2 can represent H or a $C_1$-$C_6$ alkyl. Preferably, R2 can represent H or a $C_1$-$C_4$ alkyl such as a methyl, ethyl, n-propyl, isopropyl, n-butyl, isobutyl, or tert-butyl. In an embodiment, R2 can represent H.

A subject matter of present invention can concern a chemical moiety or a compound according to the present invention (e.g. formula (I), (II), (IIA), (IIA1), (III) and/or (IV)), wherein R3 can represent H, a $C_1$-$C_6$ alkyl, a $C_1$-$C_6$ haloalkyl, a $C_1$-$C_6$ hydroxyalkyl, or a halogen. In particular, R3 can represent H or a $C_1$-$C_6$ alkyl. Preferably, R3 can represent H or a $C_1$-$C_4$ alkyl such as a methyl, ethyl, n-propyl, isopropyl, n-butyl, isobutyl, or tert-butyl. In an embodiment, R3 can represent H.

Combination 5 represents a chemical moiety or a compound according to the present invention (e.g. formula (I), (II), (IIA), (IIA1), (III) and/or (IV)), wherein
R1 represents H, a $C_1$-$C_6$ alkyl, a $C_1$-$C_6$ haloalkyl, a $C_1$-$C_6$ hydroxyalkyl, or a halogen,
R2 represents H, a $C_1$-$C_6$ alkyl, a $C_1$-$C_6$ haloalkyl, a $C_1$-$C_6$ hydroxyalkyl, or a halogen,
R3 represents H, a $C_1$-$C_6$ alkyl, a $C_1$-$C_6$ haloalkyl, a $C_1$-$C_6$ hydroxyalkyl, or a halogen, and/or
R2 and R3 are linked together with the carbon atom to which they are attached to form a 3- to 9-membered cycloalkyl, halocycloalkyl or hydroxycycloalkyl fragment.

Combination 6 represents a chemical moiety or a compound according to the present invention (e.g. formula (I), (II), (IIA), (IIA1), (III) and/or (IV)), wherein
R1 represents H or a $C_1$-$C_6$ alkyl,
R2 represents H or a $C_1$-$C_6$ alkyl,
R3 represents H or a $C_1$-$C_6$ alkyl, and/or
R2 and R3 are linked together with the carbon atom to which they are attached to form a 3- to 9-membered cycloalkyl, halocycloalkyl or hydroxycycloalkyl fragment.

Combination 7 represents a chemical moiety or a compound according to the present invention (e.g. formula (I), (II), (IIA), (IIA1), (III) and/or (IV)), wherein
R1 can represent H or a $C_1$-$C_4$ alkyl, such as a methyl, ethyl, n-propyl, isopropyl, n-butyl, isobutyl, or tert-butyl,
R2 can represent H or a $C_1$-$C_4$ alkyl, such as a methyl, ethyl, n-propyl, isopropyl, n-butyl, isobutyl, or tert-butyl,
R3 can represent H or a $C_1$-$C_4$ alkyl, such as a methyl, ethyl, n-propyl, isopropyl, n-butyl, isobutyl, or tert-butyl, and
R2 and R3 are linked together with the carbon atom to which they are attached to form a 3- to 9-membered cycloalkyl, halocycloalkyl or hydroxycycloalkyl fragment.

Combination 8 represents a chemical moiety or a compound according to the present invention (e.g. formula (I), (II), (IIA), (IIA1), (III) and/or (IV)), wherein R1, R2 and/or R3 represent H.

Combination 9 represents the Combination 5 as found above with anyone of Combinations 1, 2, 3 or 4 as found above.

Combination 10 represents the Combination 6 as found above with anyone of Combinations 1, 2, 3 or 4 as found above.

Combination 11 represents the Combination 7 as found above with anyone of Combinations 1, 2, 3 or 4 as found above.

Group R4

A subject matter of present invention can concern a chemical moiety or a compound according to the present invention (e.g. formula (I), (II), (IIA), (IIA1), (III) and/or (IV)), wherein R4 can represent H or a $C_1$-$C_{24}$ alkyl, a $C_1$-$C_{24}$ haloalkyl, a $C_1$-$C_{24}$ hydroxyalkyl, a ($C_1$-$C_3$ alkylene)$_{q1}$-($C_3$-$C_7$ cycloalkyl), a ($C_1$-$C_3$ alkylene)$_{r1}$-($C_6$-$C_{10}$ aryl), a ($C_1$-$C_3$ alkylene)$_{u1}$-(4-7 membered heterocycloalkyl), a ($C_1$-$C_3$ alkylene)$_{w1}$-(5-6 membered monocycloheteroaryl), or a ($C_1$-$C_3$ alkylene)$_{z1}$-(9-10 membered bicycloheteroaryl), with q1, r1, u1, w1 and z1 representing an integer chosen from 0 or 1.

Combination 12 represents the definition of group R4 as found above with anyone of Combinations 1, 2, 3, 4, 5, 6, 7, 8, 9, 10 or 11 as found above.

Particularly, a subject matter of present invention can concern a chemical moiety or a compound according to the present invention (e.g. formula (I), (II), (IIA), (IIA1), (III) and/or (IV)), wherein R4 can represent H or a $C_1$-$C_{12}$ alkyl, a $C_1$-$C_{12}$ haloalkyl, a $C_1$-$C_{12}$ hydroxyalkyl, a ($C_1$-$C_3$ alkylene)$_{q1}$-($C_3$-$C_7$ cycloalkyl), a ($C_1$-$C_3$ alkylene)$_{r1}$-($C_6$-$C_8$ aryl), a ($C_1$-$C_3$ alkylene)$_{u1}$-(4-7 membered heterocycloalkyl), a ($C_1$-$C_3$ alkylene)$_{w1}$-(5-6 membered monocycloheteroaryl), or a ($C_1$-$C_3$ alkylene)$_{z1}$-(9-10 membered bicycloheteroaryl), with q1, r1, u1, w1 and z1 representing an integer chosen from 0 or 1.

Combination 13 represents the definition of group R4 as found above with anyone of Combinations 1, 2, 3, 4, 5, 6, 7, 8, 9, 10 or 11 as found above.

More particularly, a subject matter of present invention can concern a chemical moiety or a compound according to the present invention (e.g. formula (I), (II), (IIA), (IIA1), (III) and/or (IV)), wherein R4 represents H or a $C_1$-$C_6$ alkyl, a $C_1$-$C_6$ haloalkyl, or a $C_1$-$C_6$ hydroxyalkyl.

Combination 14 represents the definition of group R4 as found above with anyone of Combinations 1, 2, 3, 4, 5, 6, 7, 8, 9, 10 or 11 as found above.

Even more particularly, a subject matter of present invention can concern a chemical moiety or a compound according to the present invention (e.g. formula (I), (II), (IIA), (IIA1), (III) and/or (IV)), wherein $R_4$ can represent H or a $C_1$-$C_6$ alkyl.

Combination 15 represents the definition of group R4 as found above with anyone of Combinations 1, 2, 3, 4, 5, 6, 7, 8, 9, 10 or 11 as found above.

A preferred embodiment of the present invention can concern a chemical moiety or a compound according to the present invention (e.g. formula (I), (II), (IIA), (IIA1), (III) and/or (IV)), wherein R4 can represent H or a $C_1$-$C_4$ alkyl, such as a methyl, ethyl, n-propyl, isopropyl, n-butyl, isobutyl, or tert-butyl.

Combination 16 represents the definition of group R4 as found above with anyone of Combinations 1, 2, 3, 4, 5, 6, 7, 8, 9, 10 or 11 as found above.

Group R5

When A1 is NR5, the subject matter of present invention can concern a chemical moiety or a compound according to the present invention (e.g. formula (I), (II), (IIA), (IIA1), (III) and/or (IV)), wherein
R5 can represent H or a $C_1$-$C_{24}$ alkyl, a $C_1$-$C_{24}$ haloalkyl, a $C_1$-$C_{24}$ hydroxyalkyl, a ($C_1$-$C_3$ alkylene)$_{q2}$-($C_3$-$C_7$ cycloalkyl), a ($C_1$-$C_3$ alkylene)$_{r2}$-($C_6$-$C_{10}$ aryl), a ($C_1$-$C_3$ alkylene)$_{u2}$-(4-7 membered heterocycloalkyl), a ($C_1$-$C_3$ alkylene)$_{w2}$-(5-6 membered monocycloheteroaryl), a ($C_1$-$C_3$ alkylene)$_{z2}$-(9-10 membered bicycloheteroaryl),
with q2, r2, u2, w2 and z2 independently representing an integer chosen from 0 or 1.

Combination 17 represents (when A1 is NR5) the definition of group R5 as found above with anyone of Combinations 1, 4, 5, 6, 7, 8, 9, 10, 11, 12, 13, 14, 15 or 16 as found above.

Particularly when A1 is NR5, the subject matter of present invention can concern a chemical moiety or a compound according to the present invention (e.g. formula (I), (II), (IIA), (IIA1), (III) and/or (IV)), wherein R5 can represent H or a $C_1$-$C_{12}$ alkyl, a $C_1$-$C_{12}$ haloalkyl, a $C_1$-$C_{12}$ hydroxyalkyl, a ($C_1$-$C_3$ alkylene)$_{q2}$-($C_3$-$C_7$ cycloalkyl), a ($C_1$-$C_3$ alkylene)$_{r2}$-($C_6$-$C_8$ aryl), a ($C_1$-$C_3$ alkylene)$_{u2}$-(4-7 membered heterocycloalkyl), a $(C_1-C_3$ alkylene)$_{w2}$-(5-6 membered monocycloheteroaryl), or a $(C_1-C_3$ alkylene)$_{z2}$-(9-10 membered bicycloheteroaryl), with q2, r2, u2, w2 and z2 representing an integer chosen from 0 or 1.

Combination 18 represents (when A1 is NR5) the definition of group R5 as found above with anyone of Combinations 1, 4, 5, 6, 7, 8, 9, 10, 11, 12, 13, 14, 15 or 16 as found above.

More particularly when A1 is NR5, the subject matter of present invention can concern a chemical moiety or a compound according to the present invention (e.g. formula (I), (II), (IIA), (IIA1), (III) and/or (IV)), wherein R5 represents H or a $C_1-C_6$ alkyl, a $C_1-C_6$ haloalkyl, or a $C_1-C_6$ hydroxyalkyl.

Combination 19 represents (when A1 is NR5) the definition of group R5 as found above with anyone of Combinations 1, 4, 5, 6, 7, 8, 9, 10, 11, 12, 13, 14, 15 or 16 as found above.

Even more particularly when A1 is NR5, the subject matter of present invention can concern a chemical moiety or a compound according to the present invention (e.g. formula (I), (II), (IIA), (IIA1), (III) and/or (IV)), wherein R5 can represent H or a $C_1-C_6$ alkyl.

Combination 20 represents (when A1 is NR5) the definition of group R5 as found above with anyone of Combinations 1, 4, 5, 6, 7, 8, 9, 10, 11, 12, 13, 14, 15 or 16 as found above.

A preferred embodiment when A1 is NR5 of the present invention can concern a chemical moiety or a compound according to the present invention (e.g. formula (I), (II), (IIA), (IIA1), (III) and/or (IV)), wherein R5 can represent H or a $C_1-C_4$ alkyl, such as a methyl, ethyl, n-propyl, isopropyl, n-butyl, isobutyl, or tert-butyl.

Combination 21 represents (when A1 is NR5) the definition of group R5 as found above with anyone of Combinations 1, 4, 5, 6, 7, 8, 9, 10, 11, 12, 13, 14, 15 or 16 as found above.

Groups R6 and R7

When A2 is NR6, the subject matter of present invention can concern a chemical moiety or a compound according to the present invention (e.g. formula (I), (II), (IIA), (IIA1), (III) and/or (IV)), wherein R6 can represent H or an $C_1-C_8$ alkyl, a $C_1-C_8$ haloalkyl, a $C_1-C_8$ hydroxyalkyl.

Combination 22 represents (when A2 is NR6) the definition of group R6 as found above with anyone of Combinations 5, 6, 7, 8, 9, 10, 11, 12, 13, 14, 15, 16, 17, 18, 19, 20 or 21 as found above.

Particularly when A2 is NR6, the subject matter of present invention can concern a chemical moiety or a compound according to the present invention (e.g. formula (I), (II), (IIA), (IIA1), (III) and/or (IV)), wherein R6 can represent H or an $C_1-C_6$ alkyl, a $C_1-C_6$ haloalkyl, a $C_1-C_6$ hydroxyalkyl.

Combination 23 represents (when A2 is NR6) the definition of group R6 as found above with anyone of Combinations 5, 6, 7, 8, 9, 10, 11, 12, 13, 14, 15, 16, 17, 18, 19, 20 or 21 as found above.

More particularly when A2 is NR6, the subject matter of present invention can concern a chemical moiety or a compound according to the present invention (e.g. formula (I), (II), (IIA), (IIA1), (III) and/or (IV)), wherein R6 can represent H or a $C_1-C_6$ alkyl.

Combination 24 represents (when A2 is NR6) the definition of group R6 as found above with anyone of Combinations 5, 6, 7, 8, 9, 10, 11, 12, 13, 14, 15, 16, 17, 18, 19, 20 or 21 as found above.

A preferred embodiment when A2 is NR6 of the present invention can concern a chemical moiety or a compound according to the present invention (e.g. formula (I), (II), (IIA), (IIA1), (III) and/or (IV)), wherein R6 can represent H or a $C_1-C_4$ alkyl, such as a methyl, ethyl, n-propyl, isopropyl, n-butyl, isobutyl, or tert-butyl.

Combination 25 represents (when A2 is NR6) the definition of group R6 as found above with anyone of Combinations 5, 6, 7, 8, 9, 10, 11, 12, 13, 14, 15, 16, 17, 18, 19, 20 or 21 as found above.

When A3 is NR7, the subject matter of the present invention can concern a chemical moiety or a compound according to the present invention (e.g. formula (I), (II), (IIA), (IIA1), (III) and/or (IV)), wherein R7 can represent H or an $C_1-C_8$ alkyl, a $C_1-C_8$ haloalkyl, a $C_1-C_8$ hydroxyalkyl.

Combination 26 represents (when A3 is NR7) the definition of group R7 as found above with anyone of Combinations 5, 6, 7, 8, 9, 10, 11, 12, 13, 14, 15, 16, 17, 18, 19, 20, 21, 22, 23, 24 or 25 as found above.

Particularly when A3 is NR7, the subject matter of present invention can concern a chemical moiety or a compound according to the present invention (e.g. formula (I), (II), (IIA), (IIA1), (III) and/or (IV)), wherein R7 can represent H or an $C_1-C_6$ alkyl, a $C_1-C_6$ haloalkyl, a $C_1-C_6$ hydroxyalkyl.

Combination 27 represents (when A3 is NR7) the definition of group R7 as found above with anyone of Combinations 5, 6, 7, 8, 9, 10, 11, 12, 13, 14, 15, 16, 17, 18, 19, 20, 21, 22, 23, 24 or 25 as found above.

More particularly when A3 is NR7, the subject matter of present invention can concern a chemical moiety or a compound according to the present invention (e.g. formula (I), (II), (IIA), (IIA1), (III) and/or (IV)), wherein R7 can represent H or a $C_1-C_6$ alkyl.

Combination 28 represents (when A3 is NR7) the definition of group R7 as found above with anyone of Combinations 5, 6, 7, 8, 9, 10, 11, 12, 13, 14, 15, 16, 17, 18, 19, 20, 21, 22, 23, 24 or 25 as found above.

A preferred embodiment when A3 is NR7 of the present invention can concern a chemical moiety or a compound according to the present invention (e.g. formula (I), (II), (IIA), (IIA1), (III) and/or (IV)), wherein R7 can represent H or a $C_1-C_4$ alkyl, such as a methyl, ethyl, n-propyl, isopropyl, n-butyl, isobutyl, or tert-butyl.

Combination 29 represents (when A3 is NR7) the definition of group R7 as found above with anyone of Combinations 5, 6, 7, 8, 9, 10, 11, 12, 13, 14, 15, 16, 17, 18, 19, 20, 21, 22, 23, 24 or 25 as found above.

Item "n"

Item "n" may represent an integer such as 1, 2 or 3.

In particular, "n" may represent 1 or 2.

Combination 30 represents the definition of "n" as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28 or 29 as found above.

Particular Embodiments

Although, the different groups and definitions A1, A2, A3, R1, R2, R3, R4, R5, R6, R7 and item "n" are combinable according to the Combinations 1 to 30 given above, some preferred embodiments are given hereunder for illustrative purposes.

An embodiment of the present invention thus concerns a chemical moiety or a compound according to the present invention (e.g. formula (I), (II), (IIA), (IIA1), (III) and/or (IV)), wherein R1, R2 and R3 each independently represent H, a $C_1-C_6$ alkyl, a $C_1-C_6$ haloalkyl, a $C_1-C_6$ hydroxyalkyl, or a halogen, and R2 and R3 are linked together with the carbon atom to which they are attached to form a 3- to 9-membered cycloalkyl, halocycloalkyl or hydroxycycloalkyl fragment, R4 represents H or a $C_1$-$C_{24}$ alkyl, a $C_1$-$C_{24}$ haloalkyl, a $C_1$-$C_{24}$ hydroxyalkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl), or a ($C_1$-$C_3$ alkylene)$_z$-(9-10 membered bicycloheteroaryl), R5 represents H or a $C_1$-$C_{24}$ alkyl, a $C_1$-$C_{24}$ haloalkyl, a $C_1$-$C_{24}$ hydroxyalkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl), a ($C_1$-$C_3$ alkylene)$_z$-(9-10 membered bicycloheteroaryl), R6 represents H or an $C_1$-$C_8$ alkyl, a $C_1$-$C_8$ haloalkyl, a $C_1$-$C_8$ hydroxyalkyl, and R7 represents H, an $C_1$-$C_8$ alkyl, a $C_1$-$C_8$ haloalkyl, a $C_1$-$C_8$ hydroxyalkyl.

A subject matter of present invention in particular concerns a chemical moiety or a compound according to the present invention (e.g. formula (I), (II), (IIA), (IIA1), (III) and/or (IV)), wherein if A1 is NR5, R5 can represent H or a $C_1$-$C_6$ alkyl, a $C_1$-$C_6$ haloalkyl, or a $C_1$-$C_6$ hydroxyalkyl.

An embodiment of the present invention thus concerns a chemical moiety or a compound according to the present invention (e.g. formula (I), (II), (IIA), (IIA1), (III) and/or (IV)), wherein.

A2 and/or A3 independently represent O,

R4 represents H or a $C_1$-$C_6$ alkyl, a $C_1$-$C_6$ haloalkyl, or a $C_1$-$C_6$ hydroxyalkyl, and if A1 is NR5, R5 represents H or a $C_1$-$C_6$ alkyl, a $C_1$-$C_6$ haloalkyl, or a $C_1$-$C_6$ hydroxyalkyl.

A subject matter of present invention may concern a chemical moiety or a compound according to the present invention (e.g. formula (I), (II), (IIA), (IIA1), (III) and/or (IV)), wherein R2 and/or R3 represent H.

A subject matter of present invention may concern a chemical moiety or a compound according to the present invention (e.g. formula (I), (II), (IIA), (IIA1), (III) and/or (IV)), wherein R4 can represent H, a $C_1$-$C_6$ alkyl, a $C_1$-$C_6$ haloalkyl, or a $C_1$-$C_6$ hydroxyalkyl.

A subject matter of present invention may concern a chemical moiety or a compound according to the present invention (e.g. formula (I), (II), (IIA), (IIA1), (III) and/or (IV)), wherein R4 represents H or a $C_1$-$C_6$ alkyl.

A subject matter of present invention may also concern a chemical moiety or a compound according to the present invention (e.g. formula (I), (II), (IIA), (IIA1), (III) and/or (IV)), wherein R6 can represent H or a $C_1$-$C_6$ alkyl, if A2 is NR6.

A subject matter of present invention may also concern a chemical moiety or a compound according to the present invention (e.g. formula (I), (II), (IIA), (IIA1), (III) and/or (IV)), wherein R7 represents H or a $C_1$-$C_6$ alkyl if A3 is NR7.

A subject matter of present invention may in addition concern a chemical moiety or a compound according to the present invention (e.g. formula (I), (II), (IIA), (IIA1), (III) and/or (IV)), wherein R5, R6 and R7 each independently represent H or a $C_1$-$C_6$ alkyl.

An embodiment of the present invention can also concern a chemical moiety or a compound according to the present invention (e.g. formula (I), (II), (IIA), (IIA1), (III) and/or (IV)), wherein A1 represents O, R2 and/or R3 represent H, and R4, R6 and R7 each independently represent H or a $C_1$-$C_6$ alkyl.

Chemical Compound

The following detailed description of the different groups B, V1, V2, Y, and item "t" found in the chemical compound (and thus uses and methods thereof) of the present invention are given hereunder, in particular by way of different preferred combinations, including combination with other and preferred embodiments, to provide a more thorough understanding of the present invention.

Group B

The subject matter of the present invention generally concerns a compound according to formula (II) wherein B is a condensed and/or grafted pharmaceutical active compound. Indeed, one of the purposes of the chemical moiety of formula (I) is to provide a vectorisation, in particular an antiviral and/or hepatic vectorisation. Therefore, the present invention concerns a compound according to formula (II) wherein B is a condensed and/or grafted antiviral active compound and/or a hepatic active compound.

Group B may also comprise a linker fragment, and thus group B may be represented according to the following formula (B):

$$B1\text{-}B2, \qquad (B)$$

wherein

B1 represents the linker fragment and wherein B1 is linked to A2 and A3; and

B2 is an active chemical compound fragment.

By "active chemical compound fragment", it is meant in the context of the present invention a compound which presents at least some type of biological function enabling a noticeable physiological modification. Advantageously the active chemical compound fragment comprises at least one heteroatom enabling it to be connected to the linker, such as an oxygen, nitrogen, phosphorus, sulfur, boron. This point of attachment may for example be comprised in the following chemical moieties: hydroxyl, amine, amide, carboxyl, phosphate, phosphonate, phosphinate, thiol, boronate of the free active chemical compound.

By "linker" it is meant in the context of the present invention a chemical fragment enabling to connect B2 to B1 and eventually space away B2 from B1. Advantageously the linker is selectively cleavable, such by a specific enzymatic hydrolysis or a self-immolating chemical cleavage. Examples of such linkers may be chosen from (C1-C6)-alkyls, (C1-C6)-amino alkyls, (C1-C6)-oxy alkyls, polyethylene glycols, amino acids, peptidyls, (C2-C6)-aminocarbonyl-alkyls, (C2-C6)-carboxy alkyls, and/or (C1-C6)-hydroxyalkyls, among carbonates, phosphates, phosphonates, borates, boronates, carbamates, carbonate-oxymethyls (e.g. pivaloyloxymethyl or alkoxycarbonyloxy-alkyl), among other types of commonly used linkers.

Nucleoside Nu

The subject matter of the present invention generally concerns a compound according to formula (IIA) wherein Nu is a nucleoside.

Generally speaking, in the art, nucleosides are glycosylamines made up of a nucleic acid base bonded to the anomeric carbon atom of a pentose residue, usually ribose (ribonucleoside) or deoxyribose (deoxyribonucleoside), through a glycosidic bond from the nitrogen atom N1 of a pyrimidine or the N9 atom of a purine.

The subject matter of the present invention thus concerns a compound (IIA) as defined here-above.

More specifically, the subject matter of the present invention can concern a compound (IIA) as defined here-above, wherein A2 and/or A3 independently represent O,
R4 represents H or a $C_1$-$C_7$ alkyl, a $C_1$-$C_6$ haloalkyl, or a $C_1$-$C_6$ hydroxyalkyl, and
if A1 is NR5, R5 represents H or a $C_1$-$C_6$ alkyl, a $C_1$-$C_6$ haloalkyl, or a $C_1$-$C_6$ hydroxyalkyl.

In a particular embodiment, R4 represents a $C_3$-$C_7$ cycloalkyl,

More specifically, the subject matter of the present invention can concern a compound (IIA) as defined here-above, wherein A1 represents O,
R2 and/or R3 represent H, and
R4, R6 and R7 each independently represent H or a $C_1$-$C_6$ alkyl.

In an embodiment, the subject matter of the present invention can concern a compound (IIA) as defined here-above, wherein the nucleoside moiety comprises a common chemical structure with (or the nucleoside moiety essentially consists in a common chemical moiety found in) a compound chosen in the list consisting of Clevudine, Lamuvidine, Metacavir, Cladribine, Gemcitabine, Troxacitabine, Decitabine, Thiarabine, Sapacitabine, Islatravir, Nelarabine, Clofarabine, Pentostatin, Ribavirin, Taribavirin, Abacavir, Entecavir, Zidovudine (AZT), Stavudine, Azvudine, 2',3'-dideoxycytosine (ddC, Zalcitabine), 2',3'-dideoxyadenosine (ddA), 2',3'-dideoxyinosine (ddI, Didanosine), 2',3'-dideoxy-2',3'-didehydrouridine, 5-iodo-2'-deoxyuridine (Idoxuridine), L-dC (Torcitabine), L-deoxyadenosine (L-dA), L-deoxyguanosine (L-dG), Dioxolane T (DOT), Dioxolane aminopurine (APD), Dioxolane guanosine (DXG), Dioxolane fluorocytosine (FDOC), 5-(2-bromovinyl)arabinouracil (BVDU), Bruvidine, Coformycin, Cordycepin, Formycin A, Formycin B, Immucillin-H, 8-aza-Immucillin, Lobucavir, Alovudine, Acyclovir, 5-azacytidine, 5-aminouridine, Cytarabine, Cyclopentenyl cytosine, 3-deazaadenosine, 3-deazaneplanocin A, Desciclovir, Edoxudine, Enocitabine, Fiacitabine, Fialuridine, Floxuridine, Ganciclovir, Lagociclovir, Lodenosine, Maribavir, Mizoribine, Netivudine, Penciclovir, Raluridine, Synguanol, Sorivudine, Trifluridine, Vidarabine, Valganciclovir, Nebularine, Azacitidine, Emtricitabine, Telbivudine, Fludarabine, Flucytosine, Tezacitabine, Apricitabine, Triciribine, Adenosine, Cytidine, Thymidine, Uridine, Guanosine, Inosine, Xanthosine, Oxanosine, Sangyvamycin, Allopurinol riboside, Cyclopropavir, Synadenol, MBX 1616, MBX 2168, A-5021, N6-methyladenosine, Viramidine, Forodesine, 3'-deoxyguanosine, 5-methyl-2'-deoxypseudouridine, Pseudouridine, LNA nucleosides, (1'R,2'S)-9-(2-hydroxy-3'-keto-cyclopenten-1-yl)adenine, Isatoribine, Galidesivir, Tetrahydrouridine, Zebularine, Elvucitabine, Valopicitabine, Censavudine, Dexelvucitabine, Methylthioinosine, Buciclovir, Aristeromycin, Neoplacin A, Psicofuranine, 3-(2-deoxy-β-D-erythro-pentofuranosyl)-6-(4-pentylphenyl)-furo[2,3-d]pyrimidin-2(3H)-one, guanosine-2',3'-O-ethylidenephosphonate, guanosine-2',3'-O-methylidenephosphonate, Acadesine (AICA-riboside), EICAR, Bredinin, Pyrazofurin, Binodenoson, 5-Fluorouridine, Rioprine, Tecadenoson, 2-Fluoroadenosine, 2-(beta-D-glucopyranosyl)-5-methyl-1,3,4-benzothiazole, (South)-methanocarba-thymidine, KP-1461, OSI-7836, TAS-106, GS-441524, Amdoxovir, Loxoribine, ANA975, RG-7795 (ANA773), 9-(6-deoxy-alpha-L-talofuranosyl)-6-methylpurine, (1'R,2'S)-9-(2-hydroxy-3'-keto-cyclopenten-1-yl)adenine, Racivir, 7-Methylguanosine, Queuine, Toyocamycin, Tubercidin and Thiazofurin.

By "the nucleoside moiety essentially consists in a common chemical moiety found in" it is meant in the context of the present invention that one of the chemical compound listed here-above has been very slightly altered (e.g. by suppression in a hydrogen atom) to form a link with the rest of the chemical compound (IIA).

In an embodiment, the subject matter of the present invention can concern a compound (IIA) as defined here-above, wherein the nucleoside moiety is of formula (IIB1):

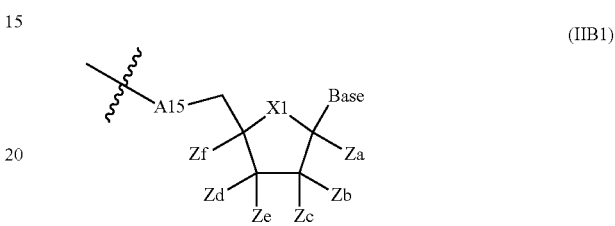

(IIB1)

wherein
A15 represents O or $(CH_2)_{q3}$,
q3 represent an integer chosen from 0 or 1
X1 represents O, S, $CH_2$, CH(A16), C(A16)$_2$, C=$CH_2$, C=CH(A16), or C=C(A16)$_2$, NR20
A16 represents a halogen atom, such as F or Cl,
R20 represents H or an optionally substituted $C_1$-$C_8$ alkyl, a $C_1$-$C_8$ haloalkyl, or a $C_1$-$C_8$ hydroxyalkyl,
Za represents H, CN, C≡CH, $N_3$, $CH_2$(A17), CH(A17)$_2$, C(A17)$_3$, or a halogen atom such as F or Cl,
Zb represents H, $C_1$-$C_6$ alkyl such as $CH_3$, CN, C≡CH, OR21, or a halogen atom such as F, Cl or Br,
Zc represents H, $N_3$, C≡CH, $NH_2$, CN, OR21, or a halogen atom such as F, Cl or Br,
Zb and Zc can optionally be linked together with the carbon atom to which they are attached to form a 3- to 6-membered cyclic optionally substituted oxo-cycloalkyl fragment,
Zd represents H, $C_1$-$C_6$ alkyl such as $CH_3$, C≡CH, OR21, or a halogen atom such as F or Cl,
Ze represents OR21, $NH_2$, H, or a halogen atom such as F or Cl,
Zf represents H, $C_1$-$C_6$ alkyl such as $CH_3$, $CH_2$(A17), CH(A17)$_2$, C(A17)$_3$, C≡CH, CH=$CH_2$, $C_3H_5$, CH=C=$CH_2$, $N_3$, CN, or a halogen atom such as F, Cl or Br,
A17 represents a halogen atom, such as F, Cl or Br,
R21 represents H or an optionally substituted $C_1$-$C_8$ alkyl, a $C_1$-$C_8$ haloalkyl, or a $C_1$-$C_8$ hydroxyalkyl, and
Base represents a chemical moiety chosen from adenine, cytosine, guanine, thymine, uracil, purine, hypoxanthine, xanthine, 5-fluorouracil, 7-deazaadenine, 7-fluoro-7-deazaadenine, N4-hydroxycytosine, 2-fluoroadenine, 2-chloroadenine, 2,6-diaminopurine, 2-aminopurine, 6-ethoxy-2-aminopurine, 6-methylamino-2-aminopurine, 4-aminoimidazo[2,1-f][1,2,4]triazine (7-C-linked) and 4-aminopyrrolo[2,1-f][1,2,4]triazine (7-C-linked).

Preferably, the subject matter of the present invention can concern a compound (IIA) as defined here-above wherein the nucleoside moiety (of formula (IIB1)) is more specifically of the following formula (IIC):

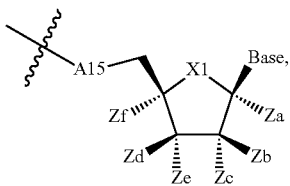

(IIC)

or its enantiomer,
wherein A15, X1, base, Za, Zb, Zc, Zd, Ze and Zf are as defined above.

Therefore, in an embodiment, the subject matter of the present invention can concern a compound (IIA) as defined here-above, wherein the chemical moiety (IIB1) is an D nucleoside, i.e. presents the stereochemistry as shown in compound (IIC) here-above.

Specific examples of compounds (IIB1) and (IIC) are given in the hereunder table:

TABLE 1 examples of compounds (IIB1) and (IIC):

| A15 | Za | Zb  | Zc   | Zd | Ze | Zf     | X1 | Base              |
|-----|----|-----|------|----|----|--------|----|-------------------|
| O   | H  | H   | OH   | H  | OH | $CH_3$ | O  | Uracil            |
| O   | H  | H   | OH   | H  | OH | $CH_3$ | O  | Cytosine          |
| O   | H  | H   | OH   | H  | OH | $CH_3$ | O  | Adenine           |
| O   | H  | H   | OH   | H  | OH | $CH_3$ | O  | Guanine           |
| O   | H  | H   | H    | H  | OH | $CH_3$ | O  | Thymine           |
| O   | H  | H   | F    | H  | OH | $CH_2Cl$ | O | Cytosine          |
| O   | H  | H   | F    | H  | OH | $CH_3$ | O  | Uracil            |
| O   | H  | H   | F    | H  | OH | $CH_3$ | O  | Cytosine          |
| O   | H  | H   | F    | H  | OH | $CH_3$ | O  | Adenine           |
| O   | H  | H   | F    | H  | OH | $CH_3$ | O  | Guanine           |
| O   | H  | H   | $NH_2$ | H | OH | $CH_3$ | O  | Uracil            |
| O   | H  | H   | $NH_2$ | H | OH | $CH_3$ | O  | Cytosine          |
| O   | H  | H   | $NH_2$ | H | OH | $CH_3$ | O  | Adenine           |
| O   | H  | H   | $NH_2$ | H | OH | $CH_3$ | O  | Guanine           |
| O   | H  | $CH_3$ | OH | H  | OH | H      | O  | Uracil            |
| O   | H  | $CH_3$ | OH | H  | OH | H      | O  | Cytosine          |
| O   | H  | $CH_3$ | OH | H  | OH | H      | O  | Adenine           |
| O   | H  | $CH_3$ | OH | H  | OH | H      | O  | Guanine           |
| O   | H  | $CH_3$ | OH | H  | OH | H      | O  | 7-deazaadenine    |
| O   | H  | $CH_3$ | OH | H  | OH | H      | O  | 7-Fluoro-7-deazaadenine |
| O   | H  | $CH_3$ | OH | H  | OH | H      | O  | N4-hydroxycytosine |
| O   | H  | H   | OH   | H  | OH | H      | O  | N4-hydroxycytosine |
| O   | H  | $CH_3$ | F  | H  | OH | H      | O  | Uracil            |
| O   | H  | $CH_3$ | F  | H  | OH | H      | O  | Cytosine          |
| O   | H  | $CH_3$ | F  | H  | OH | H      | O  | Adenine           |
| O   | H  | $CH_3$ | F  | H  | OH | H      | O  | Guanine           |
| O   | H  | $CH_3$ | Cl | H  | OH | H      | O  | Uracil            |
| O   | H  | $CH_3$ | Cl | H  | OH | H      | O  | Cytosine          |
| O   | H  | $CH_3$ | Cl | H  | OH | H      | O  | Adenine           |
| O   | H  | $CH_3$ | Cl | H  | OH | H      | O  | Guanine           |
| O   | H  | $CH_3$ | CN | H  | OH | H      | O  | Uracil            |
| O   | H  | $CH_3$ | CN | H  | OH | H      | O  | Cytosine          |
| O   | H  | $CH_3$ | CN | H  | OH | H      | O  | Adenine           |
| O   | H  | $CH_3$ | CN | H  | OH | H      | O  | Guanine           |
| O   | H  | $CH_3$ | $NH_2$ | H | OH | H     | O  | Uracil            |
| O   | H  | $CH_3$ | $NH_2$ | H | OH | H     | O  | Cytosine          |
| O   | H  | $CH_3$ | $NH_2$ | H | OH | H     | O  | Adenine           |
| O   | H  | $CH_3$ | $NH_2$ | H | OH | H     | O  | Guanine           |
| O   | H  | $CH_3$ | C≡CH | H | OH | H     | O  | Uracil            |
| O   | H  | $CH_3$ | C≡CH | H | OH | H     | O  | Cytosine          |
| O   | H  | $CH_3$ | C≡CH | H | OH | H     | O  | Adenine           |
| O   | H  | $CH_3$ | C≡CH | H | OH | H     | O  | Guanine           |
| O   | H  | $CH_3$ | $N_3$ | H | OH | H      | O  | Uracil            |
| O   | H  | $CH_3$ | $N_3$ | H | OH | H      | O  | Cytosine          |
| O   | H  | $CH_3$ | $N_3$ | H | OH | H      | O  | Adenine           |
| O   | H  | $CH_3$ | $N_3$ | H | OH | H      | O  | Guanine           |
| O   | H  | H   | OH   | H  | OH | F      | O  | Uracil            |
| O   | H  | H   | OH   | H  | OH | F      | O  | Cytosine          |
| O   | H  | H   | OH   | H  | OH | F      | O  | Adenine           |
| O   | H  | H   | OH   | H  | OH | F      | O  | Guanine           |
| O   | H  | H   | F    | H  | OH | F      | O  | Uracil            |
| O   | H  | H   | F    | H  | OH | F      | O  | Cytosine          |
| O   | H  | H   | F    | H  | OH | F      | O  | Adenine           |
| O   | H  | H   | F    | H  | OH | F      | O  | Guanine           |
| O   | H  | $CH_3$ | OH | H  | OH | F      | O  | Uracil            |
| O   | H  | $CH_3$ | OH | H  | OH | F      | O  | Cytosine          |
| O   | H  | $CH_3$ | OH | H  | OH | F      | O  | Adenine           |
| O   | H  | $CH_3$ | OH | H  | OH | F      | O  | Guanine           |
| O   | H  | $CH_3$ | F  | H  | OH | F      | O  | Uracil            |
| O   | H  | $CH_3$ | F  | H  | OH | F      | O  | Cytosine          |

TABLE 1-continued examples of compounds (IIB1) and (IIC):

| A15 | Za | Zb | Zc | Zd | Ze | Zf | X1 | Base |
|---|---|---|---|---|---|---|---|---|
| O | H | CH$_3$ | F | H | OH | F | O | Adenine |
| O | H | CH$_3$ | F | H | OH | F | O | Guanine |
| O | H | H | OH | H | OH | C≡CH | O | Uracil |
| O | H | H | OH | H | OH | C≡CH | O | Cytosine |
| O | H | H | OH | H | OH | C≡CH | O | Adenine |
| O | H | H | OH | H | OH | C≡CH | O | Guanine |
| O | H | H | F | H | OH | C≡CH | O | Uracil |
| O | H | H | F | H | OH | C≡CH | O | Cytosine |
| O | H | H | F | H | OH | C≡CH | O | Adenine |
| O | H | H | F | H | OH | C≡CH | O | Guanine |
| O | H | H | H | H | OH | C≡CH | O | Uracil |
| O | H | H | H | H | OH | C≡CH | O | Thymine |
| O | H | H | H | H | OH | C≡CH | O | Cytosine |
| O | H | H | H | H | OH | C≡CH | O | Adenine |
| O | H | H | H | H | OH | C≡CH | O | Guanine |
| O | H | H | H | H | OH | C≡CH | CH$_2$ | 2-Fluoro-adenine |
| O | H | H | H | H | OH | C≡CH | CH$_2$ | Guanine |
| O | H | H | OH | C≡CH | OH | H | O | Uracil |
| O | H | H | OH | C≡CH | OH | H | O | Cytosine |
| O | H | H | OH | C≡CH | OH | H | O | Adenine |
| O | H | H | OH | C≡CH | OH | H | O | Guanine |
| O | H | H | F | C≡CH | OH | H | O | Uracil |
| O | H | H | F | C≡CH | OH | H | O | Cytosine |
| O | H | H | F | C≡CH | OH | H | O | Adenine |
| O | H | H | F | C≡CH | OH | H | O | Guanine |
| O | H | F | F | H | OH | H | O | Uracil |
| O | H | F | F | H | OH | H | O | Adenine |
| O | H | F | F | H | OH | H | O | Guanine |
| O | H | Cl | F | H | OH | H | O | Uracil |
| O | H | Cl | F | H | OH | H | O | Cytosine |
| O | H | Cl | F | H | OH | H | O | Adenine |
| O | H | Cl | F | H | OH | H | O | Guanine |
| O | H | F | Cl | H | OH | H | O | Uracil |
| O | H | F | Cl | H | OH | H | O | Cytosine |
| O | H | F | Cl | H | OH | H | O | Adenine |
| O | H | F | Cl | H | OH | H | O | Guanine |
| O | H | Cl | Cl | H | OH | H | O | Uracil |
| O | H | Br | Cl | H | OH | H | O | Uracil |
| O | H | Cl | Br | H | OH | H | O | Uracil |
| O | H | Br | F | H | OH | H | O | Uracil |
| O | H | F | Br | H | OH | H | O | Uracil |
| O | H | F | H | H | OH | H | O | Uracil |
| O | H | F | H | H | OH | H | O | Cytosine |
| O | H | F | H | H | OH | H | O | Adenine |
| O | H | F | H | H | OH | H | O | Guanine |
| O | H | F | H | H | OH | H | O | Thymine |
| O | H | F | H | H | OH | H | C=CH$_2$ | Adenine |
| O | H | F | H | H | OH | H | C=CH$_2$ | Guanine |
| O | H | H | H | H | OH | H | C=CH$_2$ | Adenine |
| O | H | CN | H | H | OH | H | O | Thymine |
| O | H | CN | H | H | OH | H | O | Uracil |
| O | H | CN | H | H | OH | H | O | Cytosine |
| O | H | CN | H | H | OH | H | O | Adenine |
| O | H | CN | H | H | OH | H | O | Guanine |
| O | H | OH | H | H | OH | H | O | Thymine |
| O | H | OH | H | H | OH | H | O | Uracil |
| O | H | OH | H | H | OH | H | O | 2-Fluoro-adenine |
| O | H | OH | H | H | OH | H | O | Guanine |
| O | H | F | H | H | OH | H | S | Thymine |
| O | H | F | H | H | OH | H | S | Uracil |
| O | H | F | H | H | OH | H | S | Cytosine |
| O | H | F | H | H | OH | H | S | Adenine |
| O | H | F | H | H | OH | H | S | Guanine |
| O | H | OH | H | H | OH | H | S | Thymine |
| O | H | OH | H | H | OH | H | S | Uracil |
| O | H | OH | H | H | OH | H | S | Adenine |
| O | H | OH | H | H | OH | H | S | Guanine |
| O | H | CN | H | H | OH | H | S | Thymine |
| O | H | CN | H | H | OH | H | S | Uracil |
| O | H | CN | H | H | OH | H | S | Cytosine |
| O | H | CN | H | H | OH | H | S | Adenine |
| O | H | CN | H | H | OH | H | S | Guanine |
| O | H | H | OH | H | OH | H | S | Uracil |
| O | H | H | OH | H | OH | H | S | Cytosine |
| O | H | H | OH | H | OH | H | S | Adenine |
| O | H | H | OH | H | OH | H | S | Guanine |

TABLE 1-continued examples of compounds (IIB1) and (IIC):

| A15 | Za | Zb | Zc | Zd | Ze | Zf | X1 | Base |
|---|---|---|---|---|---|---|---|---|
| O | H | H | F | H | OH | H | S | Uracil |
| O | H | H | F | H | OH | H | S | Cytosine |
| O | H | H | F | H | OH | H | S | Adenine |
| O | H | H | F | H | OH | H | S | Guanine |
| O | H | H | OH | H | OH | H | $CH_2$ | Uracil |
| O | H | H | OH | H | OH | H | $CH_2$ | Cytosine |
| O | H | H | OH | H | OH | H | $CH_2$ | Adenine |
| O | H | H | OH | H | OH | H | $CH_2$ | Guanine |
| O | CN | H | OH | H | OH | H | O | Uracil |
| O | CN | H | OH | H | OH | H | O | Cytosine |
| O | CN | H | OH | H | OH | H | O | Adenine |
| O | CN | H | OH | H | OH | H | O | Guanine |
| O | CN | H | OH | H | OH | H | O | 4-aminoimidazo[2,1-f][1,2,4]triazine (7-C-linked) |
| O | CN | H | OH | H | OH | H | O | 4-aminopyrrolo[2,1-f][1,2,4]triazine (7-C-linked) |
| O | C≡CH | H | OH | H | OH | H | O | Uracil |
| O | C≡CH | H | OH | H | OH | H | O | Cytosine |
| O | C≡CH | H | OH | H | OH | H | O | Adenine |
| O | C≡CH | H | OH | H | OH | H | O | Guanine |
| O | C≡CH | H | OH | H | OH | H | O | 4-aminoimidazo [2,1-f][1,2,4]triazine (7-C-linked) |
| O | C≡CH | H | OH | H | OH | H | O | 4-aminopyrrolo[2,1-f][1,2,4]triazine (7-C-linked) |
| O | H | F | H | H | OH | $N_3$ | O | Cytosine |
| O | H | OH | H | H | OH | $N_3$ | O | Cytosine |
| O | H | F | H | H | OH | $N_3$ | O | Thymine |
| O | H | OH | H | H | OH | $N_3$ | O | Thymine |
| O | H | F | H | H | OH | $N_3$ | O | Adenine |
| O | H | OH | H | H | OH | $N_3$ | O | Adenine |
| O | H | F | H | H | OH | $N_3$ | O | Guanine |
| O | H | OH | H | H | OH | $N_3$ | O | Guanine |
| O | H | F | H | H | OH | $N_3$ | O | Uracil |
| O | H | OH | H | H | OH | $N_3$ | O | Uracil |
| O | H | H | OH | H | OH | $N_3$ | O | Uracil |
| O | H | H | F | H | OH | $N_3$ | O | Uracil |
| O | H | H | OH | H | OH | $N_3$ | O | Cytosine |
| O | H | H | F | H | OH | $N_3$ | O | Cytosine |
| O | H | H | F | H | OH | $N_3$ | O | Adenine |
| O | H | H | F | H | OH | $N_3$ | O | Guanine |
| O | H | H | H | H | OH | $N_3$ | O | Thymine |

Preferably, the subject matter of the present invention can concern a compound (IIA) as defined here-above wherein the nucleoside moiety (of formula (IIB1)) is more specifically of the following formula (IID):

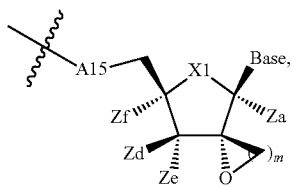

(IID)

or its enantiomer, wherein A15, X1, Base, Za, Zd, Ze and Zf are as defined above, and m represents an integer comprised between 1 to 5.

Therefore, in an embodiment, the subject matter of the present invention can concern a compound (IIA) as defined here-above, wherein the chemical moiety (IIB1) is a D nucleoside, i.e. presents the stereochemistry as shown in compound (IID) here-above.

Specific examples of compounds (IIB1) and (IID) are given in the hereunder table 2.

TABLE 2 examples of compounds (IIB1) (when Zb and Zc form an alkoxy ring) and (IID)

| A15 | Za | m | Zd | Ze | Zf | X1 | Base |
|---|---|---|---|---|---|---|---|
| O | H | 1 | H | OH | H | O | Uracil |
| O | H | 1 | H | OH | H | O | Cytosine |
| O | H | 1 | H | OH | H | O | Adenine |
| O | H | 1 | H | OH | H | O | Guanine |
| O | H | 1 | H | OH | H | O | Thymine |
| O | H | 2 | H | OH | H | O | Uracil |
| O | H | 2 | H | OH | H | O | Cytosine |
| O | H | 2 | H | OH | H | O | Adenine |
| O | H | 2 | H | OH | H | O | Guanine |
| O | H | 2 | H | OH | H | O | Thymine |

Groups V1 and V2

In particular, a subject matter of present invention can concern a compound according to the present invention (e.g. formula (III) and/or (IV)), wherein V1 may represent H or a $C_1$-$C_6$ alkyl, a $C_1$-$C_6$ haloalkyl or a $C_1$-$C_6$ hydroxyalkyl.

Combination 31 represents a compound according to the present invention (e.g. formula (III) and/or (IV)), wherein the definition of group V1 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 as found above.

More particularly, a subject matter of present invention can concern a compound according to the present invention (e.g. formula (III) and/or (IV)), wherein V1 can represent H or a $C_1$-$C_4$ alkyl such as a methyl, ethyl, n-propyl, isopropyl, n-butyl, isobutyl, or tert-butyl.

Combination 32 represents a compound according to the present invention (e.g. formula (III) and/or (IV)), wherein the definition of group V1 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 as found above.

Preferably, a subject matter of present invention can concern a compound according to the present invention (e.g. formula (III) and/or (IV)), wherein, V1 can represent H or a methyl.

Combination 33 represents a compound according to the present invention (e.g. formula (III) and/or (IV)), wherein the definition of group V1 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 as found above.

In particular, a subject matter of present invention can concern a compound according to the present invention (e.g. formula (III) and/or (IV)), wherein V2 may represent H or a $C_1$-$C_6$ alkyl, a $C_1$-$C_6$ haloalkyl or a $C_1$-$C_6$ hydroxyalkyl.

Combination 34 represents a compound according to the present invention (e.g. formula (III) and/or (IV)), wherein the definition of group V2 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 as found above.

More particularly, a subject matter of present invention can concern a compound according to the present invention (e.g. formula (III) and/or (IV)), wherein V2 can represent H or a $C_1$-$C_4$ alkyl such as a methyl, ethyl, n-propyl, isopropyl, n-butyl, isobutyl, or tert-butyl.

Combination 35 represents a compound according to the present invention (e.g. formula (III) and/or (IV)), wherein the definition of group V2 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 as found above.

Even more particularly, a subject matter of present invention can concern a compound according to the present invention (e.g. formula (III) and/or (IV)), wherein V2 can represent H or a $C_1$-$C_3$ alkyl such as a methyl, ethyl, n-propyl or isopropyl.

Combination 36 represents a compound according to the present invention (e.g. formula (III) and/or (IV)), wherein the definition of group V2 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 as found above.

Preferably, a subject matter of present invention can concern a compound according to the present invention (e.g. formula (III) and/or (IV)), wherein, V2 can represent H or a methyl.

Combination 37 represents a compound according to the present invention (e.g. formula (III) and/or (IV)), wherein the definition of group V2 is as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 as found above.

More particularly, a subject matter of present invention can concern a compound according to the present invention (e.g. formula (III) and/or (IV)), wherein V1 and V2 can be linked together with the carbon atom to which they are attached to form a 3- to 13-membered cycloalkyl, halocycloalkyl or hydroxycycloalkyl fragment.

Combination 38 represents a compound according to the present invention (e.g. formula (III) and/or (IV)), wherein V1 and V2 can be linked together as found above, in combination with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or 37 as found above.

Item "t"

Item "t" may represent an integer such as 0, 1, 2 or 3.

In particular, "t" may represent 0, 1 or 2.

Combination 38 represents a compound according to the present invention (e.g. formula (III) and/or (IV)), wherein "t" as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or 37 as found above.

More particularly, "t" may represent an integer chosen from 1 or 2.

Combination 39 represents a compound according to the present invention (e.g. formula (III) and/or (IV)), wherein "t" as found above with anyone of Combinations 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or 37 as found above.

Group Y

The subject matter of the present invention concerns a compound according to the present invention (e.g. formula (III) and/or (IV)), wherein Y represents a nucleobase moiety of formula (V):

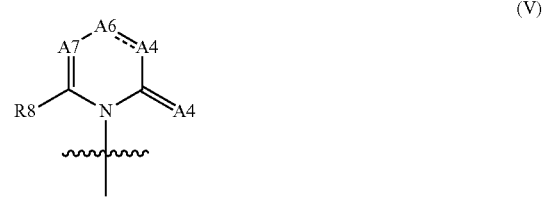

(V)

wherein
A4 represents O or S,
A5 represents N or NR9
A6 represents C═O or C—R10,
A7 represents N or CR11,
R8 and R11 each independently represent H, an optionally substituted $C_1$-$C_6$ alkyl, an optionally substituted $C_2$-$C_6$ alkenyl, an optionally substituted $C_2$-$C_6$ alkynyl, OR13, SR13, N(R13)$_2$ or a halogen,
R9 represents N, CR12, C(OR12) or C(NHR12), R10 represents H, an optionally substituted $C_1$-$C_7$ alkyl, an optionally substituted $C_2$-$C_6$ alkenyl, an optionally substituted $C_2$-$C_6$ alkynyl, CN, $NO_2$, NH(OR14), OR14, N(R14)$_2$, SR14, NHC(O)OR14, NHC(O)N(R14)$_2$, N[C(O)OR14]$_2$, N[C(O)R14]$_2$, N(R14)C(O)R14, 5-6 membered monocycloheteroaryl, 9-10 membered bicycloheteroaryl or a halogen, R12, R13 and R14 each independently represent H, an optionally substituted $C_1$-$C_{24}$ alkyl, a ($C_1$-$C_3$ alkylene)$_a$-($C_3$-$C_7$ cycloalkyl), a ($C_1$-$C_3$ alkylene)$_b$-($C_6$-$C_{10}$ aryl), a ($C_1$-$C_3$ alkylene)$_d$-(4-7 membered heterocycloalkyl), a ($C_1$-$C_3$ alkylene)$_e$-(5-6 membered monocycloheteroaryl) or a ($C_1$-$C_3$ alkylene)$_f$-(9-10 membered bicycloheteroaryl), and a, b, d, e and f independently represent an integer chosen from 0 or 1.

In particular, the subject matter of the present invention concerns a compound according to the present invention (e.g. formula (III) and/or (IV)), wherein Y represents a nucleobase moiety of formula (V), wherein R8 and R11 each independently represent H, a $C_1$-$C_6$ alkyl, a $C_1$-$C_6$ haloalkyl, a $C_1$-$C_6$ hydroxyalkyl, a $C_2$-$C_6$ alkenyl, a $C_1$-$C_6$ haloalkenyl, a $C_2$-$C_6$ alkynyl, a $C_1$-$C_6$ haloalkynyl, OR13, SR13 or N(R13)$_2$ or a halogen R10 represents H, a $C_1$-$C_6$ non-cyclic alkyl, a $C_3$-$C_7$ cyclic alkyl, a $C_1$-$C_6$ haloalkyl, a $C_1$-$C_6$ hydroxyalkyl, a $C_2$-$C_6$ alkenyl, a $C_1$-$C_6$ haloalkenyl, a $C_2$-$C_6$ alkynyl, a $C_1$-$C_6$ haloalkynyl, CN, $NO_2$, OR14, NH(OR14), N(R14)$_2$, SR14, NHC(O)OR14, N[C(O)OR14]$_2$, N[C(O)R14]$_2$, NHC(O)N(R14)$_2$, N(R14)C(O)R14, 5-6 membered monocycloheteroaryl, 9-10 membered bicycloheteroaryl or a halogen, R12, R13 and R14 each independently represent H, a $C_1$-$C_{24}$ alkyl, a $C_1$-$C_{24}$ haloalkyl, a $C_1$-$C_{24}$ hydroxyalkyl, a ($C_1$-$C_3$ alkylene)$_a$-($C_3$-$C_7$ cycloalkyl), a ($C_1$-$C_3$ alkylene)$_b$-($C_6$-$C_{10}$ aryl), a ($C_1$-$C_3$ alkylene)$_d$-(4-7 membered heterocycloalkyl), a ($C_1$-$C_3$ alkylene)$_e$-(5-6 membered monocycloheteroaryl) or a ($C_1$-$C_3$ alkylene)$_f$-(9-10 membered bicycloheteroaryl), and a, b, d, e and f independently represent an integer chosen from 0 or 1.

More particularly, the subject matter of the present invention may concern a compound according to the present invention (e.g. formula (III) and/or (IV)), wherein Y represents a nucleobase moiety of formula (VI), (VII) or (VIII):

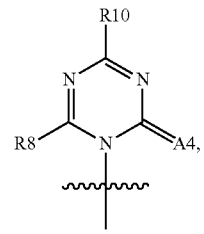

(VI)

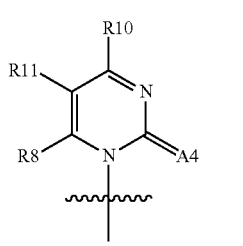

(VII)

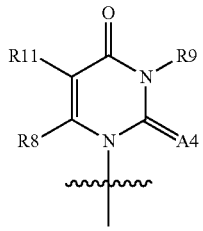

(VIII)

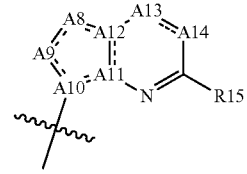

wherein R8, R9, R10, R11 and A4 are as defined above.

Alternatively, the subject matter of the present invention may concern a compound according to the present invention (e.g. formula (III) and/or (IV)), wherein Y represents a nucleobase moiety of formula (IX):

(IX)

wherein

A8 and A9 are each independently selected from N, CR16, C(OR16), C(NHR16),

A10, A11 and A12 independently represent C or N, with at least one of A10, A11, A12 representing N, A13 represents C(O) or CR17, A14 represents N or NR18, R15 and R17 independently represent H, an optionally substituted $C_1$-$C_7$ alkyl, an optionally substituted $C_2$-$C_6$ alkenyl, an optionally substituted $C_2$-$C_6$ alkynyl, CN, $NO_2$, OR19, N(R19)$_2$, SR19, NHC(O)OR19, N[C(O)OR19]$_2$, NHC(O)N(R19)$_2$, N(R19)C(O)R19, N[C(O)R19]$_2$, 5-6 membered monocycloheteroaryl, 9-10 membered bicycloheteroaryl or a halogen, R16 and R18 independently represent H or an optionally substituted $C_1$-$C_6$ alkyl, R19 represents H, an optionally substituted $C_1$-$C_{24}$ alkyl, a ($C_1$-$C_3$ alkylene)$_g$-($C_3$-$C_7$ cycloalkyl), an optionally substituted ($C_1$-$C_3$ alkylene)$_i$-($C_6$-$C_{10}$ aryl), a ($C_1$-$C_3$ alkylene)$_j$-(4-7 membered heterocycloalkyl), a ($C_1$-$C_3$ alkylene)$_k$-(5-6 membered monocycloheteroaryl) or a ($C_1$-$C_3$ alkylene)$_l$-(9-10 membered bicycloheteroaryl), g, i, j, k and l independently represent an integer chosen from 0 or 1, and there may be at least three double bonds in the double cyclic structure formed by A8, A9, A10, A11, A12, A13 and A14 of formula (IX).

Throughout the present description, when several moieties such as R19, or [C(O)R19] are linked on the same fragment or atom, such as N(R19)$_2$, or N[C(O)R19]$_2$, the person skilled in the art will understand in the context of the present invention that these moieties are not necessarily exactly the same. For example N(R19)C(O)R19 may be NHC(O)R19, with R19 being chosen in the list of possible fragments as found above. Therefore, when several R19 are found on the same fragment, the different R19 can independently be chosen one from another.

N(R19)C(O)R19 is preferably NHC(O)R19.

In particular, the subject matter of the present invention may concern a compound according to the present invention (e.g. of formula (III) and/or (IV)), wherein Y represents a nucleobase moiety of formula (IX) as found above, wherein:

R15 and R17 independently represent H, a $C_1$-$C_6$ non-cyclic alkyl, a $C_3$-$C_7$ cyclic alkyl, a $C_1$-$C_6$ haloalkyl, a $C_1$-$C_6$ hydroxyalkyl, a $C_2$-$C_6$ alkenyl, a $C_1$-$C_6$ haloalkenyl, a $C_2$-$C_6$ alkynyl, a $C_1$-$C_6$ haloalkynyl, CN, $NO_2$, OR19, $N(R19)_2$, SR19, NHC(O)OR19, $N[C(O)OR19]_2$, $NHC(O)N(R19)_2$, N(R19)C(O)R19, $N[C(O)R19]_2$, 5-6 membered monocycloheteroaryl, 9-10 membered bicycloheteroaryl or a halogen, R16 and R18 independently represent H, a $C_1$-$C_6$ alkyl, a $C_1$-$C_6$ haloalkyl, or a $C_1$-$C_6$ hydroxyalkyl, R19 represent H, a $C_1$-$C_{24}$ alkyl, a $C_1$-$C_{24}$ haloalkyl, a $C_1$-$C_{24}$ hydroxyalkyl, a ($C_1$-$C_3$ alkylene)$_g$-($C_3$-$C_7$ cycloalkyl), a ($C_1$-$C_3$ alkylene)$_i$-($C_6$-$C_{10}$ aryl), a ($C_1$-$C_3$ alkylene)$_i$-($C_6$-$C_{10}$ haloaryl), a ($C_1$-$C_3$ alkylene)$_j$-(4-7 membered heterocycloalkyl), a ($C_1$-$C_3$ alkylene)$_k$-(5-6 membered monocycloheteroaryl) or a ($C_1$-$C_3$ alkylene)$_l$-(9-10 membered bicycloheteroaryl), and g, i, j, k and l independently represent an integer chosen from 0 or 1.

N(R19)C(O)R19 is preferably NHC(O)R19.

More particularly, the subject matter of the present invention may concern a compound according to the present invention (e.g. of formula (III) and/or (IV)), wherein Y represents a nucleobase moiety of formula (X), (XI), (XII) or (XIII):

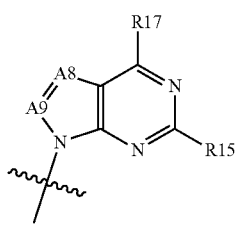
(X)

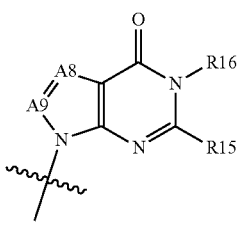
(XI)

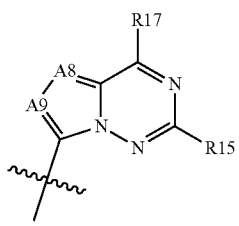
(XII)

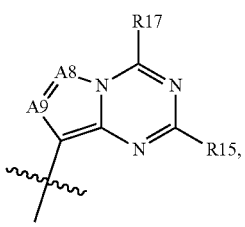
(XIII)

wherein R15, R16, R17, A8 and A9 are as defined above.

Particular Embodiments

In a preferred embodiment of the invention, the subject matter of the present invention may concern a compound according to the present invention (i.e. formula (III) or (IV)), wherein A2 and A3 are O.

The subject matter of the present invention may also concern a compound according to the present invention (i.e. formula (III) or (IV)), wherein V1 and V2 each independently represent H or a $C_1$-$C_3$ alkyl, a $C_1$-$C_3$ haloalkyl or a $C_1$-$C_3$ hydroxyalkyl or V1 and V2 can be linked together with the carbon atom to which they are attached to form a 3- to 8-, preferably a 3- to 7- or a 5- to 7-, membered cycloalkyl, halocycloalkyl or hydroxycycloalkyl fragment, preferably H or a methyl and t represents an integer chosen from 1 or 2.

Specifically, the subject matter of the present invention may concern a compound according to the present invention (i.e. formula (III) or (IV)), wherein V1 and V2 each independently represent H, a $C_1$-$C_6$ alkyl, a $C_1$-$C_6$ haloalkyl or a $C_1$-$C_6$ hydroxyalkyl or V1 and V2 can be linked together with the carbon atom to which they are attached to form a 4- to 13-membered cycloalkyl, halocycloalkyl or hydroxycycloalkyl fragment.

More specifically, the subject matter of the present invention may concern a compound according to the present invention (i.e. formula (III) or (IV)), wherein V1 and V2 each independently represent H or a $C_1$-$C_3$ alkyl, a $C_1$-$C_3$ haloalkyl or a $C_1$-$C_3$ hydroxyalkyl or V1 and V2 can be linked together with the carbon atom to which they are attached to form a 5- to 7-membered cycloalkyl halocycloalkyl or hydroxycycloalkyl fragment.

In a particular embodiment, the subject matter of the present invention may concern a compound according to the present invention (i.e. formula (III) or (IV)), wherein V1 represents H, and V2 preferably represents a methyl.

In another particular embodiment, the subject matter of the present invention may concern a compound according to the present invention (i.e. formula (III) or (IV)), wherein V2 represents H, and V1 preferably represents a methyl.

In a particular embodiment, the subject matter of the present invention may concern a compound according to the present invention (i.e. formula (III) or (IV)), wherein Y is of formula (X), A8 represents N, A9 represents CH, R15 represents H, R17 represents $N(R19)_2$, NHC(O)OR19, $N[C(O)OR19]_2$, $NHC(O)N(R19)_2$, N(R19)C(O)R19, or $N[C(O)R19]_2$, and R19 represents H, a $C_1$-$C_4$ alkyl, a phenyl, a halophenyl.

N(R19)C(O)R19 is preferably NHC(O)R19.

In another particular embodiment, the subject matter of the present invention may concern a compound according to the present invention (i.e. formula (III) or (IV)), wherein Y represents an adenine, cytosine, guanine, thymine, uracil, 2,6-diamino purine or hypoxanthine fragment.

Synthesis Methods

In terms of synthesis, there is no specific difficulty to produce the claimed chemical moieties or compounds.

For example, the method to synthesize a compound according to the invention may comprise the following steps:

(a) reacting a compound of formula (XIV):

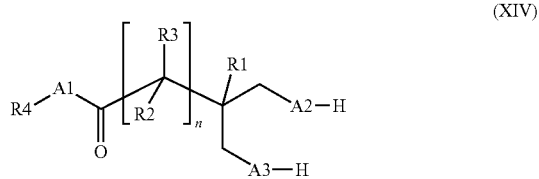

(XIV)

with a compound of formula (XV):

X—(OH)$_2$ (XV)

wherein compounds (XIV) and (XV) are conveniently protected if need-be, before being put in the presence of a coupling agent, or by first activating one of the compounds of formula (XIV) or (XV) before reacting them together, (b) optionally deprotecting the resulting compound of step (a), and (c) retrieving the compound of formula (II), (III) or (IV) according to the present invention.

By "retrieving" the compound, it is meant in the context of the present invention that all means of extraction and purification commonly used in chemistry can be used to recuperate the compound of interest.

Another embodiment of the present disclosure is a compound of Formula (II), (III) or (IV) and detailed description of these formulas as found above wherein the compound or its salt, isotope or solvate is in a substantially pure form.

As used herein "pure" or "substantially pure" means suitably at least about 60 wt. %, typically at least about 70 wt. %, preferably at least about 80 wt. %, more preferably at least about 90 wt. % (e.g., from about 90 wt. % to about 99 wt. %)), even more preferably at least about 95 wt. %> (e.g., from about 95 wt. %>to about 99 wt. %), or from about 98 wt. %>to 100 wt. %>), and most preferably at least about 99 wt. %) (e.g., 100 wt. %>) of a product containing a compound of Formula (II), (III) or (IV) and detailed description of these formulas as found above (e.g., the product isolated from a reaction mixture affording the compound or salt, isotope and/or solvate). The level of purity of the compounds and salts can be determined using a standard method of analysis (IR, NMR, HPLC, MS, or coupled analysis means).

In regards, to a compound of the disclosure which could present one or more asymmetric centers and can occur as mixtures of stereoisomers, a substantially pure compound can be either a substantially pure mixture of the stereoisomers or a substantially pure individual stereoisomer.

Therefore, as it can be seen above, one aspect of the present invention concerns the synthesis intermediate of formula (XIV):

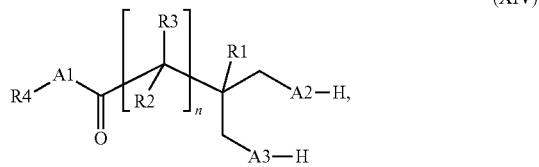

(XIV)

wherein A1, A2, A3, R1, R2, R3, R4 and n are as defined above.

Therapeutic Applications

A subject matter of the present invention concerns a compound of the present invention (e.g. formula (II), (III) and (IV)), for its use as a medicament. A subject matter of the present invention concerns a pharmaceutical composition comprising an effective amount of a compound of the present invention, or a pharmaceutically acceptable salt, isotope or solvate thereof, and a pharmaceutically acceptable carrier, diluent, excipient or combination thereof. In particular, a subject matter of the present invention thus concerns a compound of the present invention (e.g. formula (II), (III) and (IV)), for its use as an antiviral drug and/or as a hepatic-targeted drug.

More particularly, a subject matter of the present invention thus concerns a compound of the present invention (e.g. formula (II), (III) and (IV)), for its use, or for preparing a medicament, for the treatment of HBV, HDV and/or HIV infections.

In particular, a subject matter of the present invention concerns a compound, or a pharmaceutical composition comprising an effective amount of a compound of the present invention, or a pharmaceutically acceptable salt, isotope or solvate thereof, for its use, or for preparing a medicament, for the treatment of a HBV and/or HDV infection.

Particularly, a subject matter of the present invention concerns a compound, or a pharmaceutical composition comprising an effective amount of a compound of the present invention, or a pharmaceutically acceptable salt, isotope or solvate thereof, for its use, or for preparing a medicament, for inhibiting replication of a HBV and/or HDV virus of a HBV and/or HDV infection.

Moreover, a subject matter of the present invention also concerns a compound of the present invention (e.g. formula (II), (III) and (IV)), for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti-HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist.

More particularly, a subject matter of the present invention concerns a compound or pharmaceutical composition of the present invention, for the treatment of a HBV and/or HDV infection, or for inhibiting replication of a HBV and/or HDV virus of a HBV and/or HDV infection, further comprising the use of one or more agents selected from the group consisting of a HBV and/or HDV polymerase inhibitor, an immunomodulatory agent, an interferon, a pegylated interferon, a viral fusion/entry inhibitor, a viral maturation inhibitor, a capsid assembly modulator, a reverse transcriptase inhibitor, a NS5A inhibitor, a cyclophilin/TNF inhibitor, a FXR agonist, a TLR-agonist, an siRNA or antisense oligonucleotide cccDNA inhibitor, a gene silencing agent, an HBx inhibitor, an sAg secretion inhibitor, and an HBV vaccine, or a pharmaceutically acceptable salt of any of the aforementioned.

Another embodiment of the present invention concerns a method of ameliorating or treating a HBV and/or HDV infection, comprising administering to a subject suffering from the HBV and/or HDV infection an effective amount of a compound of the present invention (e.g. of formulas (II), (III), and/or (IV)), or a pharmaceutically acceptable salt thereof, or the pharmaceutical composition of the present invention.

In particular, the present invention concerns a method of ameliorating or treating a HBV and/or HDV infection, comprising contacting a cell infected with HBV and/or HDV with a compound of the present invention (e.g. of formulas (II), (III), and/or (IV)), or a pharmaceutically acceptable salt, isotope or solvate thereof, or the pharmaceutical composition of the present invention.

More particularly, the present invention concerns a method of reducing the reoccurrence of a HBV and/or HDV infection, comprising contacting a cell infected with HBV and/or HDV with a compound the present invention (e.g. of formulas (II), (III), and/or (IV)), or a pharmaceutically acceptable salt, isotope or solvate thereof, or the pharmaceutical composition of the present invention.

Preferably, the present invention concerns a method of inhibiting replication of a HBV and/or HDV virus, comprising contacting a cell infected with HBV and/or HDV with a compound of the present invention (e.g. of formulas (II), (III), and/or (IV)), or a pharmaceutically acceptable salt, isotope or solvate thereof, or the pharmaceutical composition of the present invention.

Preferably, the method of the present invention, further comprises the use of one or more agents selected from the group consisting of a HBV and/or HDV polymerase inhibitor, an immunomodulatory agent, an interferon, a pegylated interferon, a viral fusion/entry inhibitor, a viral maturation inhibitor, a capsid assembly modulator, a reverse transcriptase inhibitor, a cyclophilin/TNF inhibitor, a FXR agonist, a TLR-agonist, an siRNA or antisense oligonucleotide cccDNA inhibitor, a gene silencing agent, an HBx inhibitor, an sAg secretion inhibitor, and an HBV vaccine, or a pharmaceutically acceptable salt, isotope or solvate of any of the aforementioned.

The subject matter of the present invention also concerns the use of a compound of the present invention (e.g. of formulas (II), (III), and/or (IV)), or a pharmaceutically acceptable salt, isotope or solvate thereof, or the pharmaceutical composition of the present invention, for preparing a medicament for ameliorating or treating a HIV infection.

In particular, a subject matter of the present invention also concerns the use of a compound of the present invention (e.g. of formulas (II), (III), and/or (IV)), or a pharmaceutically acceptable salt, isotope or solvate thereof, or the pharmaceutical composition of the present invention, for preparing a medicament for inhibiting replication of a HIV virus.

More particularly, a subject matter of the present invention also concerns the use of the present invention, further comprising the use of one or more antiretroviral therapy (ART) agents selected from the group consisting of a non-nucleoside reverse transcriptase inhibitor (NNRTI), a nucleoside reverse transcriptase inhibitor (NRTI), a protease inhibitor (PI), a fusion/entry inhibitor (also called a CCR5 antagonist), an integrase strand transfer inhibitor (INSTI), and an HIV other antiretroviral therapy, or a pharmaceutically acceptable salt of any of the aforementioned.

An embodiment of the present invention concerns a method of ameliorating or treating a HIV infection comprising administering to a subject suffering from the HIV infection an effective amount of a compound of the present invention (e.g. of formulas (II), (III), and/or (IV)), or a pharmaceutically acceptable salt, isotope or solvate thereof, or the pharmaceutical composition of the present invention.

In particular, a subject matter of the present invention also concerns a method for inhibiting replication of a HIV virus comprising contacting a cell infected with the HIV virus with a compound of the present invention (e.g. of formulas (II), (III), and/or (IV)), or a pharmaceutically acceptable salt, isotope or solvate thereof, or the pharmaceutical composition of the present invention.

More particularly, a subject matter of the present invention also concerns a method for ameliorating or treating a HIV infection comprising contacting a cell infected with the HIV with a compound of the present invention (e.g. of formulas (II), (III), and/or (IV)), or a pharmaceutically acceptable salt, isotope or solvate thereof, or the pharmaceutical composition of the present invention.

Preferably, a subject matter of the present invention also concerns a method of the present invention, further comprising one or more antiretroviral therapy (ART) agents selected from the group consisting of a non-nucleoside reverse transcriptase inhibitor (nnRTI), a nucleoside reverse transcriptase inhibitor (nRTI), a protease inhibitor (PI), a fusion/entry inhibitor (also called a CCR5 antagonist), an integrase strand transfer inhibitor (INSTI), and an HIV other antiretroviral therapy, or a pharmaceutically acceptable salt, isotope or solvate of any of the aforementioned.

Such HIV combinable drugs can for example be chosen from the following list: delavirdine, delavirdine mesylate, DLV, Rescriptor® nnRTI dolutegravir, Tivicay® InI; doravirine, MK-1439 nnRTI; efavirenz, EFV, Sustiva®, Stocrin® nnRTI; EFdA (4'-ethynyl-2-fluoro-2'-deoxyadenosine) nRTI; elvitegravir InI; emtricitabine, FTC, Emtriva® nRTI; emivirine, Coactinon® nnRTI; enfuvirtide, Fuzeon® FI; enteric coated didanosine, Videx EC® nRTI; etravirine, TMC-125 nnRTI; fosamprenavir calcium, Lexiva® PI; indinavir, indinavir sulfate, Crixivan® PI; lamivudine, 3TC, Epivir® nRTI; lamivudine+zidovudine, Combivir® nRTI; tenofovir alafenamide, nRTI; tenofovir disoproxil, nRTI, lopinavir PI; lopinavir+ritonavir, Kaletra® PI; maraviroc, Selzentry® EI; nelfinavir, nelfinavir mesylate, Viracept® PI; nevirapine, NVP, Viramune® nnRTI; PPL-100 (also known as PL-462) (Ambrilia) PI; raltegravir, MK-0518, Isentress™ InI; rilpivirine nnRTI; ritonavir, Norvir® PI; saquinavir, saquinavir mesylate, Invirase®, Fortovase® PI; stavudine, d4T,didehydrodeoxythymidine, Zerit® nRTI; tipranavir, Aptivus® PI; and/or vicriviroc EI; wherein EI=entry inhibitor; FI=fusion inhibitor; InI=integrase inhibitor; PI=protease inhibitor; nRTI=nucleoside reverse transcriptase inhibitor; nnRTI=non-nucleoside reverse transcriptase inhibitor. Some of the drugs listed above are used in a salt form; e.g., abacavir sulfate, delavirdine mesylate, indinavir sulfate, atazanavir sulfate, nelfinavir mesylate, saquinavir mesylate.

In the context of the present invention, the term "administration" and variants thereof (e.g., "administering" a compound) in reference to a compound of Formula I means providing the compound to the individual in need of treatment or prophylaxis and includes both self-administration and administration to the patient by another person. When a compound is provided in combination with one or more other active agents (e.g., antiviral agents useful for treating or prophylaxis of HIV infection or AIDS), "administration" and its variants are each understood to include provision of the compound and other agents at the same time or at different times. When the agents of a combination are administered at the same time, they can be administered together in a single composition or they can be administered separately.

In the context of the present invention, the term "composition" is intended to encompass a product comprising the specified ingredients, as well as any product which results from combining the specified ingredients. Ingredients suitable for inclusion in a pharmaceutical composition are pharmaceutically acceptable ingredients, which means the ingredients must be compatible with each other and not deleterious to the recipient thereof.

In the context of the present invention, the term "subject" or "patient" refers to an animal, preferably a mammal, most preferably a human, who has been the object of treatment, observation or experiment.

CLAUSES

The present invention can be summarized by the following clauses.

Clause 1: Chemical moiety of formula (I):

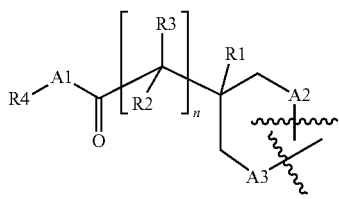

(I)

or a pharmaceutically acceptable salt, isotope or solvate thereof,
wherein
A1 represents O, S or NR5,
A2 represents O, S or NR6,
A3 represents O, S or NR7,
R1, R2 and R3 each independently represent H, an optionally substituted $C_1$-$C_8$ alkyl, or a halogen, and R2 and R3 can be linked together with the carbon atom to which they are attached to form a 3- to 9-membered cyclic optionally substituted cycloalkyl fragment,
R4 and R5 each independently represent H, an optionally substituted $C_1$-$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl),
when A1 is NR5, R4 can be linked with R5 and form a cyclic amine with the N of NR5,
R6 represents H or an optionally substituted $C_1$-$C_8$ alkyl, a $C_1$-$C_8$ haloalkyl, a $C_1$-$C_8$ hydroxyalkyl,
R7 represents H, an optionally substituted $C_1$-$C_8$ alkyl,
n represents an integer comprised from 1 to 3, and
q, r, u, w and z independently represent an integer chosen from 0 or 1.

Clause 2: Chemical moiety according to clause 1, wherein:
A2 and/or A3 independently represent O,
R4 represents H or a $C_1$-$C_6$ alkyl, a $C_1$-$C_6$ haloalkyl, or a $C_1$-$C_6$ hydroxyalkyl, and
if A1 is NR5, R5 represents H or a $C_1$-$C_6$ alkyl, a $C_1$-$C_6$ haloalkyl, or a $C_1$-$C_6$ hydroxyalkyl.

Clause 3: Chemical moiety according to clause 1 or 2, wherein
A1 represents O,
R2 and/or R3 represent H, and
R4, R6 and R7 each independently represent H or a $C_1$-$C_6$ alkyl.

Clause 4: Compound of formula (II):

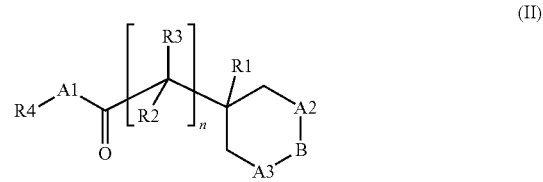

(II)

or a pharmaceutically acceptable salt, isotope or solvate thereof,
wherein
A1, A2, A3, R1, R2, R3, R4 and n are as defined in any one of clauses 1 to 3, and
B is a condensed and/or grafted pharmaceutical active compound.

Clause 5: Compound of formula (II) according to clause 4 wherein the condensed and/or grafted pharmaceutical active compound is an antiviral active compound and/or a hepatic active compound.

Clause 6: Chemical moiety according to any one of clauses 1 to 5 for use in a medicament.

Clause 7: Chemical moiety according to any one of clauses 1 to 6 for use as a hepatic targeting agent.

Clause 8: Compound of formula (III):

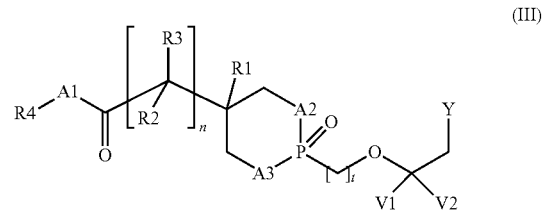

(III)

or a pharmaceutically acceptable salt, isotope or solvate thereof,
wherein
A1, A2, A3, R1, R2, R3, R4 and n are as defined in any one of clauses 1 to 3
t represents an integer comprised from 0 to 3,
V1 and V2 each independently represent H, an optionally substituted $C_1$-$C_6$ alkyl, or V1 and V2 can be linked together with the carbon atom to which they are attached to form a 3- to 13-membered cyclic optionally substituted cycloalkyl fragment, and
Y represents a nucleobase.

Clause 9: Compound according to clause 8, wherein
V1 and V2 each independently represent H or a $C_1$-$C_3$ alkyl, a $C_1$-$C_3$ haloalkyl or a $C_1$-$C_3$ hydroxyalkyl or V1 and V2 can be linked together with the carbon atom to which they are attached to form a 3- to 8, preferably 5- to 7-, membered cycloalkyl, halocycloalkyl or hydroxycycloalkyl fragment, preferably H or a methyl and
t represents an integer chosen from 1 or 2.

Clause 10: Compound according to clause 8 or 9 of formula (IV):

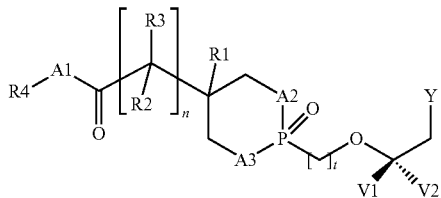

(IV)

wherein preferably

V1 represents H and V2 represents a methyl, or

V2 represents H and V1 represents a methyl.

Clause 11: Compound according to any one of clauses 8 to 10, wherein A2 and A3 are O.

Clause 12: Compound according to any one of clauses 8 to 11, wherein Y represents a nucleobase moiety of formula (V):

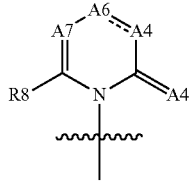

(V)

wherein

A4 represents O or S,

A5 represents N or NR9,

A6 represents C=O or C—R10,

A7 represents N or CR11,

R8 and R11 each independently represent H, an optionally substituted $C_1$-$C_6$ alkyl, an optionally substituted $C_2$-$C_6$ alkenyl, an optionally substituted $C_2$-$C_6$ alkynyl, OR13, SR13, N(R13)$_2$ or a halogen, R9 represents N, CR12, C(OR12) or C(NHR12), R10 represents H, an optionally substituted $C_1$-$C_7$ alkyl, an optionally substituted $C_2$-$C_6$ alkenyl, an optionally substituted $C_2$-$C_6$ alkynyl, CN, NO$_2$, OR14, NH(OR14), N(R14)$_2$, SR14, NHC(O)OR14, N[C(O)OR14]$_2$, N[C(O)R14]$_2$, NHC(O)N(R14)$_2$, N(R14)C(O)R14, 5-6 membered monocycloheteroaryl, 9-10 membered bicycloheteroaryl or a halogen, R12, R13 and R14 each independently represent H, an optionally substituted $C_1$-$C_{24}$ alkyl, a ($C_1$-$C_3$ alkylene)$_a$-($C_3$-$C_7$ cycloalkyl), a ($C_1$-$C_3$ alkylene)$_b$-($C_6$-$C_{10}$ aryl), a ($C_1$-$C_3$ alkylene)$_d$-(4-7 membered heterocycloalkyl), a ($C_1$-$C_3$ alkylene)$_e$-(5-6 membered monocycloheteroaryl) or a ($C_1$-$C_3$ alkylene)$_f$-(9-10 membered bicycloheteroaryl), and a, b, d, e and f independently represent an integer chosen from 0 or 1.

Clause 13: Compound according to any one of clauses 8 to 11, wherein Y represents a nucleobase moiety of formula (IX):

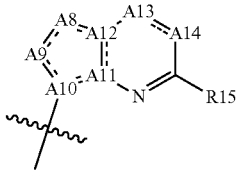

(IX)

wherein

A8 and A9 are each independently selected from N, CR16, C(OR16), C(NHR16),

A10, A11 and A12 independently represent C or N, with at least one of

A10, A11, A12 representing N,

A13 represents C(O) or CR17,

A14 represents N or NR18,

R15 and R17 independently represent H, an optionally substituted $C_1$-$C_7$ alkyl, an optionally substituted $C_2$-$C_6$ alkenyl, an optionally substituted $C_2$-$C_6$ alkynyl, CN, NO$_2$, OR19, N(R19)$_2$, SR19, NHC(O)OR19, N[C(O)OR19]$_2$, NHC(O)N(R19)$_2$, N(R19)C(O)R19, N[C(O)R19]$_2$, 5-6 membered monocycloheteroaryl, 9-10 membered bicycloheteroaryl or a halogen, R16 and R18 independently represent H or an optionally substituted $C_1$-$C_6$ alkyl, R19 represents H, an optionally substituted $C_1$-$C_{24}$ alkyl, a ($C_1$-$C_3$ alkylene)$_g$-($C_3$-$C_7$ cycloalkyl), an optionally substituted ($C_1$-$C_3$ alkylene)$_i$-($C_6$-$C_{10}$ aryl), a ($C_1$-$C_3$ alkylene)$_j$-(4-7 membered heterocycloalkyl), a ($C_1$-$C_3$ alkylene)$_k$-(5-6 membered monocycloheteroaryl) or a ($C_1$-$C_3$ alkylene)$_l$-(9-10 membered bicycloheteroaryl), g, i, j, k and l independently represent an integer chosen from 0 or 1, and there are at least three double bonds in the double cyclic structure formed by A8, A9, A10, A11, A12, A13 and A14 of formula (IX).

Clause 14: Compound according to clause 13, characterised in that Y is of formula (X), (XI), (XII) or (XIII):

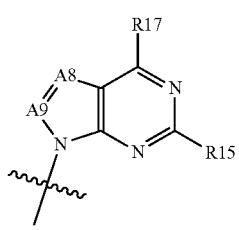

(X)

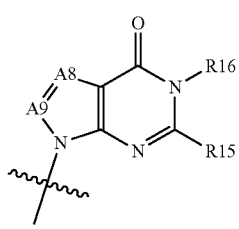

(XI)

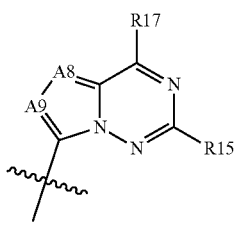

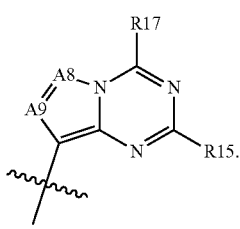

Clause 15: Compound according to clause 14, wherein
Y is of formula (X),
A8 represents N,
A9 represents CH,
R15 represents H,
R17 represents N(R19)$_2$, NHC(O)OR19, N[C(O)OR19]$_2$, NHC(O)N(R19)$_2$, N(R19)C(O)R19, or N[C(O)R19]$_2$, and
R19 represents H, a C$_1$-C$_4$ alkyl, a phenyl, a halophenyl.

Clause 16: Compound according to any one of clauses 8 to 15 for its use as a medicament.

Clause 17: Compound according to any one of clauses 8 to 15 for its use as an antiviral drug and/or as a hepatic-targeted drug, such as for the treatment of HBV, HDV and/or HIV infections.

Clause 18: Compound according to any one of clauses 8 to 15 for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti-HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist.

Clause 19: Compound of formula (IIA):

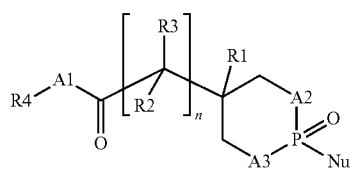

(IIA)

or a pharmaceutically acceptable salt, isotope, or solvate thereof,
wherein
A1 represents O, S or NR5,
A2 represents O, S or NR6,
A3 represents O, S or NR7,
R1, R2 and R3 each independently represent H, an optionally substituted C$_1$-C$_8$ alkyl, or a halogen, and R2 and R3 can be linked together with the carbon atom to which they are attached to form a 3- to 9-membered cyclic optionally substituted cycloalkyl fragment,
R4 and R5 each independently represent H, an optionally substituted C$_1$-C$_{24}$ alkyl, a (C$_1$-C$_3$ alkylene)$_q$-(C$_3$-C$_7$ cycloalkyl), a (C$_1$-C$_3$ alkylene)$_r$-(C$_6$-C$_{10}$ aryl), a (C$_1$-C$_3$ alkylene)$_u$-(4-7 membered heterocycloalkyl), a (C$_1$-C$_3$ alkylene)$_w$-(5-6 membered monocycloheteroaryl) or a (C$_1$-C$_3$ alkylene)$_z$-(9-10 membered bicycloheteroaryl),
when A1 is NR5, R4 can be linked with R5 and form a cyclic amine with the N of NR5,
R6 represents H or an optionally substituted C$_1$-C$_8$ alkyl, a C$_1$-C$_8$ haloalkyl, a C$_1$-C$_8$ hydroxyalkyl,
R7 represents H, an optionally substituted C$_1$-C$_8$ alkyl,
n represents an integer comprised from 1 to 3,
Nu represents a nucleoside moiety and
q, r, u, w and z independently represent an integer chosen from 0 or 1.

Clause 20: Compound (IIA) according to clause 19, wherein
A2 and/or A3 independently represent O,
R4 represents H or a C$_1$-C$_7$ alkyl, a C$_1$-C$_6$ haloalkyl, or a C$_1$-C$_6$ hydroxyalkyl, and
if A1 is NR5, R5 represents H or a C$_1$-C$_6$ alkyl, a C$_1$-C$_6$ haloalkyl, or a C$_1$-C$_6$ hydroxyalkyl.

Clause 21: Compound (IIA) according to clause 19 or 20, wherein
A1 represents O,
R2 and/or R3 represent H, and
R4, R6 and R7 each independently represent H or a C$_1$-C$_6$ alkyl.

Clause 22: Compound (IIA) according to any one of clauses 19 to 21 wherein the nucleoside moiety comprises a common chemical structure with a compound chosen in the list consisting of Clevudine, Lamuvidine, Metacavir, Cladribine, Gemcitabine, Troxacitabine, Decitabine, Thiarabine, Sapacitabine, Islatravir, Nelarabine, Clofarabine, Pentostatin, Ribavirin, Taribavirin, Abacavir, Entecavir, Zidovudine (AZT), Stavudine, Azvudine, 2',3'-dideoxycytosine (ddC, Zalcitabine), 2',3'-dideoxyadenosine (ddA), 2',3'-dideoxyinosine (ddI, Didanosine), 2',3'-dideoxy-2',3'-didehydrouridine, 5-iodo-2'-deoxyuridine (Idoxuridine), L-dC (Torcitabine), L-deoxyadenosine (L-dA), L-deoxyguanosine (L-dG), Dioxolane T (DOT), Dioxolane aminopurine (APD), Dioxolane guanosine (DXG), Dioxolane fluorocytosine (FDOC), 5-(2-bromovinyl)arabinouracil (BVDU), Bruvidine, Coformycin, Cordycepin, Formycin A, Formycin B, Immucillin-H, 8-aza-Immucillin, Lobucavir, Alovudine, Acyclovir, 5-azacytidine, 5-aminouridine, Cytarabine, Cyclopentenyl cytosine, 3-deazaadenosine, 3-deazaneplanocin A, Desciclovir, Edoxudine, Enocitabine, Fiacitabine, Fialuridine, Floxuridine, Ganciclovir, Lagociclovir, Lodenosine, Maribavir, Mizoribine, Netivudine, Penciclovir, Raluridine, Synguanol, Sorivudine, Trifluridine, Vidarabine, Valganciclovir, Nebularine, Azacitidine, Emtricitabine, Telbivudine, Fludarabine, Flucytosine, Tezacitabine, Apricitabine, Triciribine, Adenosine, Cytidine, Thymidine, Uridine, Guanosine, Inosine, Xanthosine, Oxanosine, Sangyvamycin, Allopurinol riboside, Cyclopropavir, Synadenol, MBX 1616, MBX 2168, A-5021, N6-methyladenosine, Viramidine, Forodesine, 3'-deoxyguanosine, 5-methyl-2'-deoxypseudouridine, Pseudouridine, LNA nucleosides, (1'R,2'S)-9-(2-hydroxy-3'-keto-cyclopenten-1-yl)adenine, Isatoribine, Galidesivir, Tetrahydrouridine, Zebularine, Elvucitabine, Valopicitabine, Censavudine, Dexelvucitabine, Methylthioinosine, Buciclovir, Aristeromycin, Neoplacin A, Psicofuranine, 3-(2-deoxy-j-D-erythro-pentofuranosyl)-6-(4-pentylphenyl)-furo[2,3-d]pyrimidin-2(3H)-one, guanosine-2',3'-O-ethylidenephosphonate, guanosine-2',3'-O-methylidenephosphonate, Acadesine (AICA-riboside), EICAR, Bredinin, Pyrazofurin, Binodenoson, 5-Fluorouridine, Riboprine, Tecadenoson, 2-Fluoroadenosine, 2-(beta-D-glucopyranosyl)-5-methyl-1,3,4-benzothiazole, (South)-methanocarba-thymidine, KP-1461, OSI-7836, TAS-106, GS-441524, Amdoxovir, Loxoribine, ANA975, RG-7795 (ANA773), 9-(6-deoxy-alpha-L-talofuranosyl)-6-methylpurine, (1'R,2'S)-9-(2-hydroxy-3'-keto-cyclopenten-1-yl)adenine, Racivir, 7-Methylguanosine, Queuine, Toyocamycin, Tubercidin and Thiazofurin.

Clause 23: Compound (IIA) according to any one of clauses 19 to 22 wherein the nucleoside moiety is of formula (IIB1):

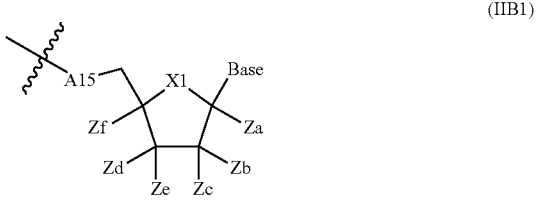

(IIB1)

wherein
A15 represents O or $(CH_2)_{q3}$,
q3 represent an integer chosen from 0 or 1
X1 represents O, S, $CH_2$, CH(A16), $C(A16)_2$, C=$CH_2$, C=CH(A16), or C=$C(A16)_2$, NR20
A16 represents a halogen atom, such as F or Cl,
R20 represents H or an optionally substituted $C_1$-$C_8$ alkyl, a $C_1$-$C_8$ haloalkyl, or a $C_1$-$C_8$ hydroxyalkyl,
Za represents H, CN, C≡CH, $N_3$, $CH_2$(A17), CH(A17)$_2$, C(A17)$_3$, or a halogen atom such as F or Cl,
Zb represents H, $C_1$-$C_6$ alkyl such as $CH_3$, CN, C≡CH, OR21, or a halogen atom such as F, Cl or Br,
Zc represents H, $N_3$, C≡CH, $NH_2$, CN, OR21, or a halogen atom such as F, Cl or Br,
Zb and Zc can optionally be linked together with the carbon atom to which they are attached to form a 3- to 6-membered cyclic optionally substituted oxo-cycloalkyl fragment,
Zd represents H, $C_1$-$C_6$ alkyl such as $CH_3$, C≡CH, OR21, or a halogen atom such as F or Cl,
Ze represents OR21, $NH_2$, H, or a halogen atom such as F or Cl,
Zf represents H, $C_1$-$C_6$ alkyl such as $CH_3$, $CH_2$(A17), CH(A17)$_2$, C(A17)$_3$, C≡CH, CH=$CH_2$, $C_3H_5$, CH=C=$CH_2$, $N_3$, CN or a halogen atom such as F, Cl or Br,
A17 represents a halogen atom, such as F, Cl or Br,
R21 represents H or an optionally substituted $C_1$-$C_8$ alkyl, a $C_1$-$C_8$ haloalkyl, or a $C_1$-$C_8$ hydroxyalkyl,
and
Base represents a chemical moiety chosen from adenine, cytosine, guanine, thymine, uracil, purine, hypoxanthine, xanthine, 5-fluorouracil, 7-deazaadenine, 7-fluoro-7-deazaadenine, N4-hydroxycytosine, 2-fluoroadenine, 2-chloroadenine, 2,6-diaminopurine, 2-aminopurine, 6-ethoxy-2-aminopurine, 6-methylamino-2-aminopurine, 4-aminoimidazo[2,1-f][1,2,4]triazine (7-C-linked) and 4-aminopyrrolo[2,1-f][1,2,4]triazine (7-C-linked).

Clause 24: Compound (IIA) according to clause 23 wherein the chemical moiety (IIB1) is of the following formula (IIC):

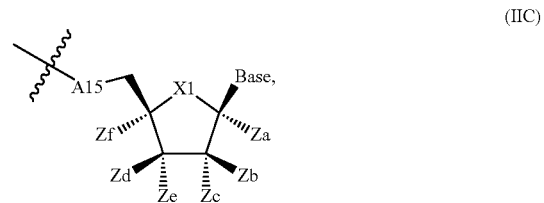

(IIC)

or its enantiomer,
wherein A15, X1, base, Za, Zb, Zc, Zd, Ze and Zf are as defined in clause 23.

Clause 25: Compound (IIA) according to clause 23 or 24 wherein the chemical moiety (IIB1) is a D nucleoside.

Clause 26: Compound according to any one of clauses 19 to 25 for its use as a medicament.

Clause 27: Compound according to any one of clauses 19 to 25 for its use as an antiviral drug and/or as a hepatic-targeting drug, such as for the treatment of HBV, HDV and/or HIV infections.

Clause 28: Compound according to any one of clauses 19 to 25 for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti-HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist

EXAMPLES

1. Chemistry

For the purposes of the experimental part hereunder, the labeling of the chemicals has been altered and does not use the same labelling as found above. However, the reader will easily make the correspondence of the formulas above and the hereunder labeling in the following examples.

General conditions: reactions sensitive to moisture or air were performed under argon atmosphere (Ar) using anhydrous solvents and reagents. Used abbreviations for reagents and/or protective groups are listed pages xvii-xxviii in "*Protective Groups in Organic Synthesis*", Theodora W. Greene, Peter G. M. Wuts, 4*th* Edition, 2006, ISBN-13: 978-0-471-69754-1. The progress of reactions was determined using either analytical thin layer chromatography (TLC) usually performed with E. Merck pre-coated TLC plates, silica gel 60F-254, layer thickness 0.25 mm or liquid chromatography-mass spectrometry (LC-MS). Flash chromatography was usually performed using a Biotage® Flash Chromatography apparatus (Isolera) on silica gel (15-45 µm or 40-63 µm) in pre-packed cartridges. $^1$H NMR, $^{13}$C NMR and $^{31}$P NMR spectra were recorded on a Brucker Advance II spectrometer at 400, 162 and 101 MHz respectively, in deuterated chloroform (CDCl$_3$) or deuterated dimethyl sulfoxide (DMSO-d$_6$) or deuterated acetone (acetone-d$_6$) solutions unless otherwise noted. Chemical shifts (δ) were reported in parts per million (ppm) and reported multiplicity abbreviated as: s, singlet; d, doublet; t, triplet; q, quartet; m, multiplet; br, broad and any combinations of these. Tetramethylsilane (TMS) was used as internal reference in CDCl$_3$ solutions, and residual CH$_3$OH peak or TMS was used as internal reference in CD$_3$OD solutions. Residual DMSO was used as internal reference in DMSO-d$_6$ solutions. Coupling constants (J) were reported in hertz (Hz).

The analytical LC-MS system consisted of a Shimadzu Mass spectrometer LCMS-2020 platform with electrospray ionization in positive and negative detection mode with a Nexeria-i LC-2040C system and UV detector. The column for standard method was Shim-pack GISS C18 5 µm, 4.0×100 mm, the column temperature was 30° C., the flow rate was 1 mL/min, and injection volume was 5-10 µL. UV detection was recorded at two wavelengths 220/254 nm. The mobile phase consisted of solvent A (water plus 0.05% formic acid) and solvent B (acetonitrile plus 0.05% formic acid) with the following gradient 95% solvent A changing to 100% solvent B over 11 minutes.

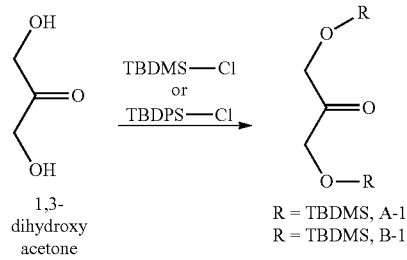

1,3-dihydroxy acetone

R = TBDMS, A-1
R = TBDMS, B-1

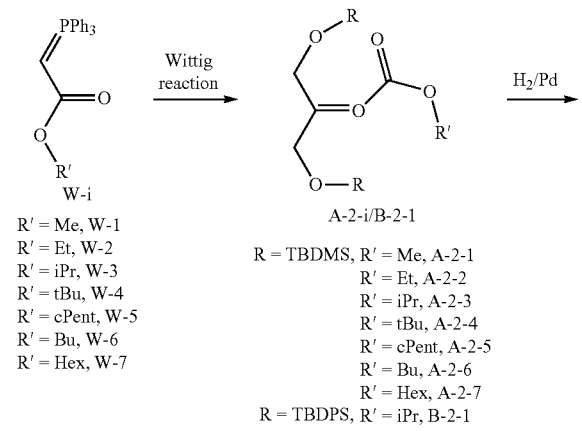

W-i
R' = Me, W-1
R' = Et, W-2
R' = iPr, W-3
R' = tBu, W-4
R' = cPent, W-5
R' = Bu, W-6
R' = Hex, W-7

A-2-i/B-2-1
R = TBDMS, R' = Me, A-2-1
R' = Et, A-2-2
R' = iPr, A-2-3
R' = tBu, A-2-4
R' = cPent, A-2-5
R' = Bu, A-2-6
R' = Hex, A-2-7
R = TBDPS, R' = iPr, B-2-1

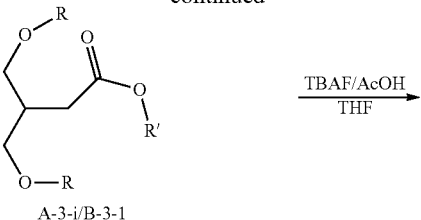

A-3-i/B-3-1
R = TBDMS, R' = Me, A-3-1
R' = Et, A-3-2
R' = iPr, A-3-3
R' = tBu, A-3-4
R' = cPent, A-3-5
R' = Bu, A-3-6
R' = Hex, A-3-7
R = TBDPS, R' = iPr, B-3-1

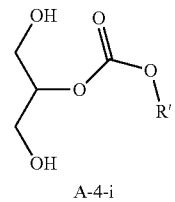

A-4-i
R = TBDMS, R' = Me, A-4-1
R' = Et, A-4-2
R' = iPr, A-4-3
R' = tBu, A-4-4
R' = cPent, A-4-5
R' = Bu, A-4-6
R = TBDPS, R' = Hex, A-4-7

Preparation of A-1 and B-1. To a suspension of 1,3-dihydroxyacetone (CAS 96-26-4, 18 g, 200 mmol, 1 equivalent (eq.)) in dichloromethane (DCM) was added triethylamine (NEt$_3$, 55 mL, 2 eq.), DMAP (0.19 g) and tert-butyldimethylsilyl chloride (TBDMS-Cl, 61.7 g, 2.05 eq.) or tert-butyldiphenylsilyl chloride (TBDPS-Cl, 2.1 eq.). The reaction was stirred overnight at RT. The mixture was diluted with ethyl acetate (EtOAc, 400 mL) and the organic layer was washed with aq. HCl 1N (90 mL), twice with a saturated NaHCO$_3$ aqueous (aq.) solution (135 mL), and twice with brine (2×90 mL). The organic layer was dried (Na$_2$SO$_4$), filtered, concentrated under reduced pressure and purified with flash chromatography using petroleum ether 40-60° C. (PE)/EtOAc (0 to 10% volume/volume (v/v)) to afford 1,3-bis[[tert-butyl(dimethyl)silyl]oxy]propan-2-one A-1, MW 318.60, oil, 58.59 g, yield 92% or 1,3-bis[[tert-butyl(diphenyl)silyl]oxy]propan-2-one B-1, MW 566.88, white solid, 12.17 g, yield 63%. $^1$H NMR (CDCl$_3$) δ 7.60-7.32 (m, 20H, H-aromatic (Haro)), 4.40 (s, 4H, (O—CH$_2$)$_2$); 1.02 (s, 18H, 2×tBu-Si).

Preparation of intermediates A-2-i (i=1 to 7) and B-2-1. General procedure: to a solution of A-1 or B-1 (reaction scale: 1 eq.) in DCM (1.6 mL/mmol) was added the phosphonium ylide W-i (i=1 to 7) (1.8 eq.). The mixture was stirred at RT for 2 days, then concentrated under reduced pressure. Excess of triphenylphosphine oxide was filtered and discarded. The filtrate was concentrated under reduced pressure and purified using flash chromatography (PE/EtOAc (0 to 20%)) to afford A-2-1 to 7 or B-2-1.

A-2-1: reaction between A-1 and W-1 at 27 mmol reaction scale to afford methyl 4-[tert-butyl(dimethyl)silyl]oxy-3-[[tert-butyl(dimethyl)silyl]oxymethyl]but-2-enoate A-2-1, MW 374.66, oil, 6.09 g, yield 60%. $^1$H NMR (CDCl$_3$) δ 5.93 (m, 1H, —CH═C), 4.80 (m, 2H, CH$_2$—O—Si), 4.37 (m, 2H, C$\underline{H_2}$—O—Si), 3.63 (s, 3H, C$\underline{H_3}$—O), 0.87 (s, 9H, t$\underline{Bu}$—Si), 0.83 (s, 9H, t$\underline{Bu}$—Si), 0.02 (s, 6H, 2×C$\underline{H_3}$), 0.00 (s, 6H, 2×C$\underline{H_3}$).

A-2-2: reaction between A-1 and W-2 at 38 mmol reaction scale to afford ethyl 4-[tert-butyl(dimethyl)silyl]oxy-3-[[tert-butyl(dimethyl)silyl]oxymethyl]but-2-enoate A-2-2; MW 388.69, oil, 14.6 g, yield 99%. $^1$H NMR (CDCl$_3$) δ 5.88 (m, 1H, C$\underline{H}$=C), 4.77 (m, 2H, C$\underline{H_2}$—O—Si), 4.34 (m, 2H, C$\underline{H_2}$—O—Si), 4.06 (q, J=7.1, 2H, O—C$\underline{H_2}$—CH$_3$), 1.19 (t, J=7.1, 3H, O—CH$_2$—C$\underline{H_3}$); 0.84 (s, 9H, t$\underline{Bu}$—Si), 0.80 (s, 9H, t$\underline{Bu}$-Si), 0.00 (s, 6H, 2×C$\underline{H_3}$—Si), −0.03 (s, 6H, 2×C$\underline{H_3}$—Si).

A-2-3: reaction between A-1 and W-3 at 21.7 mmol reaction scale to afford isopropyl 4-[tert-butyl(dimethyl)silyl]oxy-3-[[tert-butyl(dimethyl)silyl]oxy methyl]but-2-enoate A-2-3, MW 402.72, oil, 7.1 g, yield 81%. $^1$H NMR (CDCl$_3$) δ 5.87 (m, 1H, C$\underline{H}$=C), 4.96 (hept, J=7.1 Hz, 1H, CO$_2$—C$\underline{H}$—(CH$_3$)$_2$), 4.80 (m, 2H, C$\underline{H_2}$—O—Si), 4.36 (m, 2H, C$\underline{H_2}$—O—Si), 1.20 (d, J=7.1 Hz, 6H, CO$_2$—CH—(C$\underline{H_3}$)$_2$), 0.85 (s, 9H, t$\underline{Bu}$-Si), 0.82 (s, 9H, t$\underline{Bu}$-Si), 0.03 (s, 6H, 2×C$\underline{H_3}$—Si), 0.00 (s, 6H, 2×C$\underline{H_3}$—Si).

A-2-4: reaction between A-1 and W-4 was carried out on 57.8 mmol reaction scale to afford tert-butyl 4-[tert-butyl(dimethyl)silyl]oxy-3-[[tert-butyl(dimethyl)silyl]oxymethyl]but-2-enoate A-2-4, MW 416.74, oil, 10.8 g, yield 45%. $^1$H NMR (CDCl$_3$) δ 5.82 (s, 1H, C$\underline{H}$=C), 4.77 (m, 2H, C$\underline{H_2}$—O—Si), 4.34 (m, 2H, C$\underline{H_2}$—O—Si), 1.41 (s, 9H, CO$_2$—C(C$\underline{H_3}$)$_3$), 0.87 (s, 9H, t$\underline{Bu}$-Si), 0.83 (s, 9H, t$\underline{Bu}$-Si), 0.03 (s, 6H, 2×C$\underline{H_3}$—Si), 0.00 (s, 6H, 2×C$\underline{H_3}$—Si).

A-2-5: reaction between A-1 and W-5 was carried out on 26.7 mmol reaction scale to afford cyclopentyl 4-[tert-butyl(dimethyl)silyl]oxy-3-[[tert-butyl(dimethyl)silyl]oxymethyl] but-2-enoate A-2-5, MW 428.75, oil, 8.85 g, yield 77%. $^1$H NMR (CDCl$_3$) δ 5.87 (m, 1H, C$\underline{H}$=C), 5.11 (m, 1H, O—C$\underline{H}$ cPent), 4.79 (m, 2H, C$\underline{H_2}$—O—Si), 4.36 (m, 2H, C$\underline{H_2}$—O—Si), 1.80 (m, 2H, cPent), 1.65 (m, 3H, cPent), 1.53 (m, 3H, cPent), 0.87 (s, 9H, t$\underline{Bu}$-Si), 0.84 (s, 9H, t$\underline{Bu}$-Si), 0.03 (s, 6H, 2×C$\underline{H_3}$—Si), 0.00 (s, 6H, 2×C$\underline{H_3}$—Si).

A-2-6: reaction between A-1 and W-6 was carried out on 15.7 mmol reaction scale to afford butyl 4-[tert-butyl(dimethyl)silyl]oxy-3-[[tert-butyl(dimethyl)silyl]oxymethyl]but-2-enoate A-2-6, MW 416.74, 4.1 g, yield 64%.

A-2-7: reaction between A-1 and W-7 was carried out on 22 mmol reaction scale to afford hexyl 4-[tert-butyl(dimethyl)silyl]oxy-3-[[tert-butyl(dimethyl)silyl]oxymethyl]but-2-enoate A-2-7, MW 444.8, 7.9 g, yield 81%.

B-2-1: reaction between B-1 and W-3 was carried out on 6.2 mmol reaction scale to afford isopropyl 4-[tert-butyl(diphenyl)silyl]oxy-3-[[tert-butyl(diphenyl)silyl]oxymethyl]but-2-enoate B-2-1, MW 650.99, white solid, 3.15 g, yield 80%. $^1$H NMR (CDCl$_3$) δ 7.65 (m, 4H, Haro), 7.48 (m, 4H, Haro), 7.38 (m, 8H, Haro), 7.28 (m, 4H, Haro), 6.15 (m, 1H, C$\underline{H}$=C), 4.92 (hept, J=6.3 Hz, 1H, O—C$\underline{H}$—(CH$_3$)$_2$), 4.86 (m, 2H, C$\underline{H_2}$—O—Si), 4.56 (m, 2H, C$\underline{H_2}$—O—Si), 1.17 (d, J=6.3 Hz, 6H, —CH—(C$\underline{H_3}$)$_2$), 1.11 (s, 9H, t$\underline{Bu}$-Si), 0.87 (s, 9H, t$\underline{Bu}$-Si).

Preparation of intermediates A-3-1 to 7/B-3-1. General procedure: Pd/C 10% (30% w/w) was added to a solution of starting material A-2-i (i=1 to 7 or B-2-1 (1 eq., reaction scale) in ethanol (EtOH, 8.5 mL/mmol). NEt$_3$ (0.2 eq.) was added and the reaction was vigorously stirred under hydrogen balloon (H$_2$) for 24 hours. After filtration, the filtrates were concentrated under reduced pressure and purified by flash chromatography (PE/EtOAc (0 to 30%)) to afford A-3-i (i=1 to 7) or B-3-1.

A-3-1: starting material A-2-1, reaction scale: 16.2 mmol to afford methyl 4-[tert-butyl(dimethyl)silyl]oxy-3-[[tert-butyl(dimethyl)silyl]oxymethyl] butanoate A-3-1, MW 376.68, oil, 5.57 g, yield 94%. $^1$H NMR (CDCl$_3$) δ 3.63 (s, 3H, C$\underline{H_3}$—O), 3.56 (m, 4H, 2×C$\underline{H_2}$—O—Si), 2.32 (d, J=6.1 Hz, 2H, C$\underline{H_2}$—C=O), 2.14 (m, 1H, C$\underline{H}$—(CH$_2$—O—Si)$_2$), 0.85 (s, 18H, 2×t$\underline{Bu}$-Si), 0.0 (s, 12H, 4×C$\underline{H_3}$—Si).

A-3-2: starting material A-2-2, reaction scale: 38 mmol to afford ethyl 4-[tert-butyl(dimethyl)silyl]oxy-3-[[tert-butyl(dimethyl)silyl]oxymethyl]butanoate A-3-2, MW 390.70, oil, 7.29 g, yield 49%. $^1$H NMR (CDCl$_3$) δ 4.09 (q, J=7.1 Hz, 2H, O—C$\underline{H_2}$—CH$_3$), 3.57 (m, 4H, 2×C$\underline{H_2}$—O—Si), 2.30 (d, J=7.0 Hz, 2H, C$\underline{H_2}$—CO$_2$Et), 2.13 (m, 1H, C$\underline{H}$—(CH$_2$—O—Si)$_2$), 1.22 (t, J=7.2 Hz, 3H, C$\underline{H_3}$—CH$_2$—O), 0.85 (s, 18H, 2×t$\underline{Bu}$-Si), 0.0 (s, 12H, 4×C$\underline{H_3}$—Si).

A-3-3: starting material A-2-3, reaction scale: 17.6 mmol to afford isopropyl 4-[tert-butyl(dimethyl)silyl]oxy-3-[[tert-butyl(dimethyl)silyl]oxymethyl]butanoate A-3-3, MW 404.73, oil, 5.31 g, yield 74%. $^1$H NMR (CDCl$_3$) δ 4.97 (m, 1H, O—C$\underline{H}$—(CH$_3$)$_2$), 3.57 (m, 4H, 2×C$\underline{H_2}$—O—Si), 2.27 (d, J=7.0 Hz, 2H, CH—C$\underline{H_2}$—C=O), 2.11 (m, 1H, C$\underline{H}$—CH$_2$—C=O), 1.29 (d, J=6.3 Hz, 6H, CH—(C$\underline{H_3}$)$_2$), 0.85 (s, 18H, 2×t$\underline{Bu}$-Si), 0.01 (s, 12H, 4×C$\underline{H_3}$—Si). $^{13}$C NMR (acetone-d$_6$) δ 171.60 (s, 1C, $\underline{C}$O$_2$iPr), 66.86 (s, 1C, O—$\underline{C}$H(CH$_3$)$_2$), 62.04 (s, 2C, —CH($\underline{C}$H$_2$OH)$_2$), 40.53 (s, 1C, $\underline{C}$H(CH$_2$OH)$_2$), 32.57 (s, 1C, —$\underline{C}$H$_2$—CO$_2$iPr), 25.44 (s, 18C, 2×$\underline{C}$(CH$_3$)$_3$), 21.24 (s, 2C, O—CH($\underline{C}$H$_3$)$_2$), 17.97 (s, 2C, $\underline{C}$(CH$_3$)$_3$), −6.09/−6.14 (2s, 4C, 2×Si—$\underline{C}$H$_3$)$_2$).

A-3-4: starting material A-2-4, reaction scale: 16.8 mmol to afford tert-butyl 4-[tert-butyl(dimethyl)silyl]oxy-3-[[tert-butyl(dimethyl)silyl]oxymethyl] butanoate A-3-4, MW 418.76, oil, 7.3 g, yield 98%. $^1$H NMR (CDCl$_3$) δ 3.55 (d, J=5.4 Hz, 4H, 2×C$\underline{H_2}$—O—Si), 2.21 (d, J=7 Hz, 2H, C$\underline{H_2}$—C=O), 2.06 (m, 1H, C$\underline{H}$—(CH$_2$—O—Si)$_2$), 1.41 (s, 9H, O—C(C$\underline{H_3}$)$_3$), 0.85 (s, 18H, 2×t$\underline{Bu}$-Si), 0.00 (s, 12H, 4×C$\underline{H_3}$—Si).

A-3-5: starting material A-2-5, reaction scale: 20.6 mmol to afford cyclopentyl 4-[tert-butyl(dimethyl)silyl]oxy-3-[[tert-butyl(dimethyl)silyl]oxymethyl] butanoate A-3-5, MW 430.77, oil, 8.23 g, yield 93%. $^1$H NMR (CDCl$_3$) δ 5.15-5.10 (m, 1H, O—C$\underline{H}$ cPent), 3.56 (m, 4H, 2×C$\underline{H_2}$—O—Si), 2.26 (d, J=7.0 Hz, 2H, CH—C$\underline{H_2}$—CO$_2$cPent), 2.10 (m, 1H, C$\underline{H}$—(CH$_2$—O—Si)$_2$), 1.87-1.77 (m, 2H, cPent), 1.77-1.60 (m, 4H, cPent), 1.58-1.49 (m, 2H, cPent), 0.85 (s, 18H, 2×t$\underline{Bu}$-Si), 0.0 (s, 12H, 4×C$\underline{H_3}$—Si).

A-3-6: starting material A-2-6, reaction scale: 9.8 mmol to afford butyl 4-[tert-butyl(dimethyl)silyl]oxy-3-[[tert-butyl(dimethyl)silyl]oxymethyl]butanoate A-3-6, MW 418.75, 3.22 g, yield 78%. $^1$H NMR (CDCl$_3$) δ 4.03 (t, J=6.7 Hz, 2H, O—C$\underline{H_2}$—(CH$_2$)$_2$—CH$_3$), 3.56 (m, 4H, 2×C$\underline{H_2}$—O—Si), 2.30 (d, J=7.0 Hz, 2H, CH—C$\underline{H_2}$—CO$_2$Bu), 2.10 (m, 1H, C$\underline{H}$—(CH$_2$—O—Si)$_2$), 1.58 (m, 2H, Bu), 1.35 (m, 2H, Bu), 0.90 (t, J=7.3 Hz, 3H, O—CH$_2$—(CH$_2$)$_2$—C$\underline{H_3}$), 0.85 (s, 18H, 2×t$\underline{Bu}$-Si), 0.0 (s, 12H, 4×C$\underline{H_3}$—Si).

A-3-7: starting material A-2-7, reaction scale: 17.8 mmol to afford hexyl 4-[tert-butyl(dimethyl)silyl]oxy-3-[[tert-butyl(dimethyl)silyl]oxymethyl]butanoate A-3-7, MW, 446.81, 7.9 g, yield 98%. $^1$H NMR (CDCl$_3$) δ 4.03 (t, J=6.8 Hz, 2H, O—C$\underline{H_2}$—(CH$_2$)$_4$—CH$_3$), 3.56 (m, 4H, 2×C$\underline{H_2}$—O—Si), 2.30 (d, J=6.9 Hz, 2H, CH—C$\underline{H_2}$—CO$_2$Hex), 2.10 (m, 1H, C$\underline{H}$—(CH$_2$—O—Si)$_2$), 1.58 (m, 2H, O—(CH$_2$)—(C$\underline{H_2}$)—), 1.27 (m, 6H, O—(CH$_2$)$_2$—(C$\underline{H_2}$)$_3$—CH$_3$), 0.85 (m, 21H, 2×t$\underline{Bu}$-Si/O—CH$_2$—(CH$_2$)$_4$—C$\underline{H_3}$), 0.0 (s, 12H, 4×C$\underline{H_3}$—Si).

B-3-1: starting material B-2-1, reaction scale: 4.07 mmol to afford isopropyl 4-[tert-butyl(diphenyl)silyl]oxy-3-[[tert-butyl(diphenyl)silyl]oxymethyl] butanoate B-3-1, MW 653.01, white solid, 2.54 g, yield 98%. $^1$H NMR (CDCl$_3$) δ 7.63 (m, 8H, Haro); 7.36 (m, 12H, Haro), 4.93 (m, 1H, O—CH—(CH$_3$)$_2$), 3.73 (m, 4H, 2×CH$_2$—O—Si), 2.41 (d, J=7 Hz, 2H, CH$_2$—C=O), 2.32 (m, 1H, CH—(CH$_2$—O—Si)$_2$), 1.14 (d, J=8 Hz, 6H, O—CH—(CH$_3$)$_2$), 1.02 (s, 18H, 2×tBu-Si).

Preparation of intermediates A-4-1 to A-4-7. General procedure: starting material A-3-i or B-3-1 (reaction scale, 1 eq.) was dissolved in tetrahydrofuran (THF, 0.5 mL/mmol). Acetic acid (AcOH, 4.5 eq.) and tetra-n-butylammonium fluoride (TBAF)/THF 1M (3.6 eq.) were added. The reaction mixture was stirred overnight at RT, concentrated under reduced pressure, purified by flash chromatography (PE/EtOAc (0 to 100%)) to afford A-4-i (i=1 to 7).

A-4-1: starting material A-3-1, reaction scale: 4.4 mmol to afford methyl 4-hydroxy-3-(hydroxymethyl)butanoate A-4-1, MW 148.15, oil, 545 mg, yield 84%. $^1$H NMR (DMSO-d$_6$) δ 4.46 (brs, 2H, 2×-OH), 3.57 (s, 3H, CH$_3$—O), 3.37 (m, 4H, 2×CH$_2$—CH), 2.25 (d, J=7.35 Hz, 2H, CH$_2$—CO), 1.95 (m, 1H, CH—(CH$_2$—OH)$_2$).

A-4-2: starting material: A-3-2, reaction scale: 31.1 mmol to afford ethyl 4-hydroxy-3-(hydroxymethyl)butanoate A-4-2, MW 162.18, oil, 3.94 g, yield 83%. $^1$H NMR (DMSO-d$_6$) δ 4.46 (t, J=5.1 Hz, 2H, 2×HO), 4.04 (q, J=7.2 Hz, 2H, O—CH$_2$—CH$_3$), 3.40 (m, 2H, HO—CH$_2$), 3.32 (m, 2H, HO—CH$_2$), 2.25 (d, J=8 Hz, 2H, CH$_2$—C=O), 1.95 (m, 1H, CH—(CH$_2$—OH)$_2$), 1.17 (t, J=7.2 Hz, 3H, CH$_3$—CH$_2$).

A-4-3: starting material A-3-3 (or B-3-1), reaction scale: 19.1 mmol to afford isopropyl 4-hydroxy-3-(hydroxymethyl)butanoate A-4-3, MW 176.21, oil, 3.36 g, yield 89%. $^1$H NMR (DMSO-d$_6$) δ 4.87 (m, 1H, O—CH—(CH$_3$)$_2$), 4.45 (t, J=5.2 Hz, 2H, 2×HO), 3.35 (m, 4H, 2×HO—CH$_2$), 2.21 (d, J=6.4 Hz, 2H, CH$_2$—C=O), 1.94 (m, 1H, CH—(CH$_2$—OH)$_2$), 1.17 (d, J=8 Hz, 6H, (CH$_3$)$_2$—CH); $^{13}$C NMR (acetone-d$_6$) δ 172.20 (s, 1C, CO$_2$iPr), 66.96 (s, 1C, O—CH(CH$_3$)$_2$), 62.46 (s, 2C, —CH(CH$_2$OH)$_2$), 40.44 (s, 1C, CH(CH$_2$OH)$_2$), 33.18 (s, 1C, —CH$_2$—CO$_2$iPr), 21.18 (s, 2C, O—CH(CH$_3$)$_2$).

A-4-4: starting material A-3-4, reaction scale: 6.1 mmol to afford tert-butyl 4-hydroxy-3-(hydroxymethyl)butanoate A-4-4, MW 190.23, oil, 928 mg, yield 81%. $^1$H NMR (DMSO-d$_6$) δ 4.43 (t, J=5.1 Hz, 2H, 2×HO), 3.35 (m, 4H, 2×HO—CH$_2$), 2.15 (d, J=8 Hz, 2H, CH$_2$—C=O), 1.92 (m, 1H, CH—(CH$_2$—OH)$_2$), 1.39 (s, 9H, O—C(CH$_3$)$_3$).

A-4-5: starting material, A-3-5, reaction scale: 19.1 mmol to afford cyclopentyl 4-hydroxy-3-(hydroxymethyl)butanoate A-4-5, MW 202.25, oil, 3.39 g, yield 88%. $^1$H NMR (DMSO-d$_6$) δ 5.05 (m, 1H, O—CH cPent), 4.45 (t, J=5.5 Hz, 2H, 2×-OH), 3.35 (m, 4H, 2×HO—CH$_2$), 2.21 (d, J=7.3 Hz, 2H, CH$_2$—C=O), 1.99-1.89 (m, 1H, CH—(CH$_2$—OH)$_2$), 1.85-1.72 (m, 2H, cPent), 1.70-1.40 (m, 6H, cPent).

A-4-6: starting material, A-3-6, reaction scale: 4.8 mmol to afford butyl 4-hydroxy-3-(hydroxymethyl)butanoate A-4-6, MW 190.23, 840 mg, yield 92%.

A-4-7: starting material, A-3-7, reaction scale: 4.5 mmol to afford hexyl 4-hydroxy-3-(hydroxymethyl)butanoate A-4-7, MW 218.29, 653 mg, yield 66%.

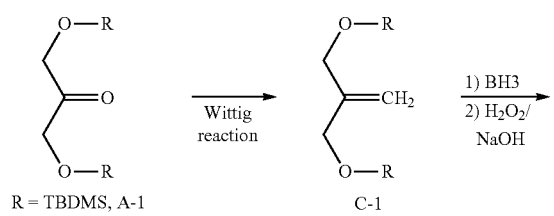

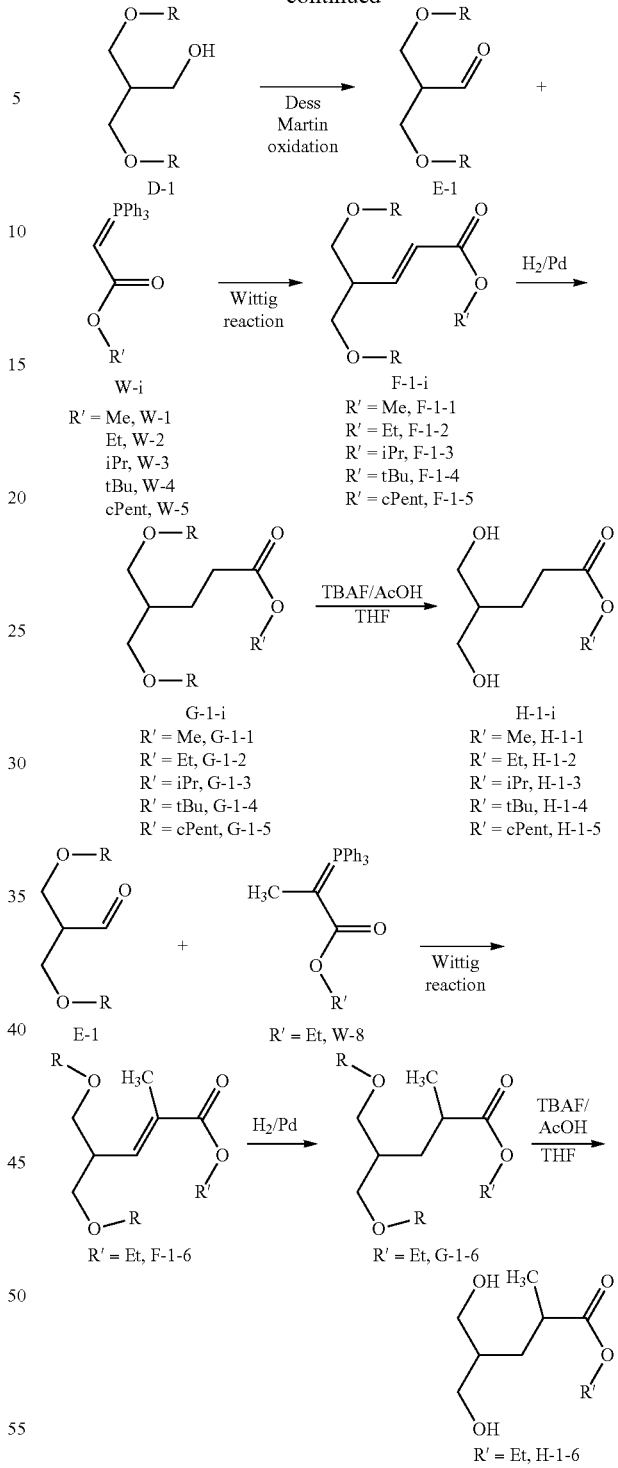

Preparation of intermediate C-1. A suspension of methyltriphenylphosphonium bromide (46.75 g; 1 eq.) and sodium hydride 60% (NaH, 5.23 g, 131 mmol, 1 eq.) in THF (175 mL) was heated to reflux under Ar for 2 hours. A solution of A-1 (41.7 g, 131 mmol, 1 eq.) in THF (44 mL) was added to the reaction mixture at 10° C. and stirred at 25° C. for 1 hour. The reaction mixture was then diluted with PE (200 mL) and stored at −20° C. overnight. The reaction mixture was filtered through a silica pad and washed with PE. The filtrates were concentrated under reduced pressure, purified over silica gel column chromatography (Hexane/EtOAc (0 to 5%)) to afford tert-butyl-[2-[[tert-butyl(dimethyl)silyl]oxymethyl]allyloxy]-dimethyl-silane C-1, MW 316.63, oil, 41.5 g, yield 48%. $^1$H NMR (CDCl$_3$) δ 5.01 (s, 2H, C$\underline{H}_2$=C), 4.09 (s, 4H, 2×C$\underline{H}_2$—OSi), 0.82 (s, 18H, 2×t$\underline{Bu}$-Si), 0.00 (s, 12H, 4×C$\underline{H}_3$—Si).

Preparation of intermediate D-1. To a BH$_3$ complexed solution (2M in SMe$_2$) (25.6 mmol, 0.45 eq.) was added under Ar at 0° C. a solution of C-1 (18 g, 56.8 mmol, 1 eq.) in anhydrous THF (126 mL). The reaction mixture was stirred at RT (28° C.) for 3 hours. To the reaction were successively added a solution of THF/Water 1:1 v/v (91 mL), a 2N solution of NaOH (119 mL, 239 mmol, 4.2 eq.) and H$_2$O$_2$ (30%) (1.6 mL/mmol, 91 mL). The reaction mixture was stirred for 2 hours and then extracted twice with diethyl ether. The combined organic layers were dried over Na$_2$SO$_4$, filtered, concentrated under reduced pressure and purified by flash chromatography (PE/EtOAc (0 to 40%)) to afford 3-[tert-butyl(dimethyl)silyl]oxy-2-[[tert-butyl(dimethyl)silyl]oxymethyl]propan-1-ol D-1, MW 334.63, oil, 14.15 g, yield 90%. $^1$H NMR (CDCl$_3$) δ 4.36 (t, J=5.2 Hz, 1H, CH—C$\underline{H}_2$—O$\underline{H}$), 3.56 (m, 4H, 2×C$\underline{H}_2$—OSi), 3.34 (m, 2H, C$\underline{H}_2$—OH), 1.71 (m, 1H, C$\underline{H}$—CH$_2$—OH), 0.81 (s, 18H, 2×t$\underline{Bu}$-Si), 0.00 (s, 12H, 4×C$\underline{H}_3$—Si).

Preparation of intermediate E-1. To a solution of D-1 (7 g, 21 mmol, 1 eq.) in DCM (52 mL) was added Dess-Martin reagent (14.2 g, 1.6 eq.). After 3 hours of stirring, the reaction mixture was poured onto EtOAc (140 mL) and a saturated NaHCO$_3$ aq. solution (140 mL) was added. The mixture was filtered, the organic layer was washed with Na$_2$S$_2$O$_3$ (140 mL), dried over MgSO$_4$, filtered and concentrated under reduced pressure to give 3-[tert-butyl(dimethyl)silyl]oxy-2-[[tert-butyl (dimethyl)silyl]oxymethyl]propanal E-1, MW 332.63, oil, 6.60 g, yield 94%, (was used without purification).

Preparation of intermediates F-1-1 to F-1-6. General procedure: to a solution of E-1 (reaction scale: 1 eq.) in DCM (1.6 mL/mmol) was added the phosphonium ylide W-i (i=1 to 6) (1.8 eq.). The mixture was stirred at RT for 1 day, then concentrated under reduced pressure. Excess of triphenylphosphine oxide was discarded by filtration. Filtrates were concentrated under reduced pressure and purified by flash chromatography (PE/EtOAc (0 to 20%)) to afford F-1-1 to F-1-6.

F-1-1: reaction between E-1 and W-1, reaction scale: 14.2 mmol to afford methyl (E)-5-[tert-butyl(dimethyl)silyl]oxy-4-[[tert-butyl(dimethyl)silyl]oxymethyl] pent-2-enoate F-1-1, MW 388.24, oil, 2.3 g, yield 41%. $^1$H NMR (CDCl$_3$) δ 6.83 (dd, J=15.6 Hz, J=8.6 Hz, 1H, C$\underline{H}$=CH—CO$_2$Me), 5.80 (d, J=15.7 Hz, 1H, CH=C$\underline{H}$—CO$_2$Me), 3.69 (s, 3H, C$\underline{H}_3$—O), 3.64 (m, 4H, 2×C$\underline{H}_2$—O—Si), 2.44 (m, 1H, C$\underline{H}$—CH=CH), 0.81 (s, 18H, 2×t$\underline{Bu}$-Si), 0.0 (s, 12H, 4×C$\underline{H}_3$—Si).

F-1-2: reaction between E-1 and W-2, reaction scale: 19.1 mmol to afford ethyl (E)-5-[tert-butyl(dimethyl)silyl]oxy-4-[[tert-butyl(dimethyl)silyl]oxymethyl] pent-2-enoate F-1-2, MW 402.72, oil, 7.11 g, yield 86%. $^1$H NMR (CDCl$_3$) δ 6.87 (dd, J=15.9 Hz, J=8.2 Hz, 1H, C$\underline{H}$=CH—CO$_2$Et), 5.84 (dd, J=15.9 Hz, J=1.1 Hz, 1H, CH=C$\underline{H}$—CO$_2$Et), 4.13 (d, J=7.1 Hz, 2H, CH$_3$—C$\underline{H}_2$—O), 3.73 (m, 4H, 2×C$\underline{H}_2$—O—Si), 2.46 (m, 1H, C$\underline{H}$—CH=CH), 1.24 (t, J=7.2 Hz, 3H, C$\underline{H}_3$—CH$_2$—O), 0.84 (s, 18H, 2×t$\underline{Bu}$-Si), 0.00 (s, 12H, 4×C$\underline{H}_3$—Si).

F-1-3: reaction between E-1 and W-3; reaction scale: 14.2 mmol to afford isopropyl (E)-5-[tert-butyl(dimethyl)silyl]oxy-4-[[tert-butyl(dimethyl)silyl]oxymethyl] pent-2-enoate F1-3, MW 416.74, oil, 4.36 g, yield 85%.

F-1-4: reaction between E-1 and W-4; reaction scale: 14.2 mmol to afford tert-butyl (E)-5-[tert-butyl(dimethyl)silyl]oxy-4-[[tert-butyl(dimethyl)silyl]oxymethyl]pent-2-enoate F-1-4, MW 430.77, oil, 3.48 g, yield 52%.

F-1-5: reaction between E-1 and W-5; reaction scale: 14.6 mmol to afford cyclopentyl (E)-5-[tert-butyl(dimethyl)silyl]oxy-4-[[tert-butyl(dimethyl)silyl]oxymethyl] pent-2-enoate F-1-5, MW 442.78, oil, 4.77 g, yield 76%. $^1$H NMR (CDCl$_3$) δ 6.83 (dd, J=14.8 Hz, J=8.4 Hz, 1H, C$\underline{H}$=CH—CO$_2$cPent), 5.80 (d, J=14.8 Hz, 1H, CH=C$\underline{H}$—CO$_2$cPent), 5.19 (m, 1H, O—C$\underline{H}$-cPent), 3.64 (m, 4H, 2×C$\underline{H}_2$—O—Si), 2.44 (m, 1H, C$\underline{H}$—CH=CH), 1.48-2.0 (m, 8H, 4×(C$\underline{H}_2$) cPent), 0.86 (s, 18H, 2×t$\underline{Bu}$-Si), 0.0 (s, 12H, 4×C$\underline{H}_3$—Si).

F-1-6: reaction between E-1 and W-8; reaction scale 3.0 mmol to afford ethyl (E)-5-[tert-butyl(dimethyl)silyl]oxy-4-[[tert-butyl(dimethyl)silyl]oxymethyl]-2-methyl-pent-2-enoate F-1-6, MW 416.74, 910 mg, yield 76%. $^1$H NMR (CDCl$_3$) δ 6.64 (d, J=9.4 Hz, 1H, C$\underline{H}$=CMe), 4.18 (m, 2H, CH$_3$—C$\underline{H}_2$—O), 3.66-3.56 (m, 4H, 2×C$\underline{H}_2$—O—Si), 2.68 (m, 1H, C$\underline{H}$— CH=CMe), 1.85 (s, 3H, CH=C-C$\underline{H}_3$), 1.30-1.19 (t, J=7.1 Hz, 3H, C$\underline{H}_3$—CH$_2$-0), 0.85 (s, 18H, 2×t$\underline{Bu}$-Si), 0.00 (s, 12H, 4×C$\underline{H}_3$—Si).

Preparation of intermediates G-1-1 to G-1-6. General procedure: Pd/C 10% (190 mg/mmol, 30% w/w) was added to a solution of starting material F-1-i (i=1 to 6) (reaction scale: 1 eq.) in EtOH (8.5 mL/mmol). NEt$_3$ (0.2 eq.) was added and the reaction was vigorously stirred under hydrogen balloon (H$_2$) for 24 hours. After filtration, the filtrates were concentrated under reduced pressure and purified by flash chromatography (PE/EtOAc (0 to 30%)) to afford G-1-i (i=1 to 6).

G-1-1: starting material: F-1-1, reaction scale: 11.8 mmol to afford methyl 5-[tert-butyl(dimethyl)silyl]oxy-4-[[tert-butyl(dimethyl)silyl]oxymethyl] pentanoate G-1-1, MW 390.70, oil, 4.03 g, yield 87%. $^1$H NMR (CDCl$_3$) δ 3.63 (s, 3H, O—C$\underline{H}_3$), 3.48 (d, J=4.9 Hz, 4H, 2×C$\underline{H}_2$—O—Si), 2.32 (m, 2H, C$\underline{H}_2$—C=O), 1.60 (m, 3H, C$\underline{H}_2$—CH$_2$—C=O/ CH—(CH$_2$—O—Si)$_2$), 0.85 (m, 18H, 2×t$\underline{Bu}$-Si), 0.01 (m, 12H, 4×C$\underline{H}_3$—Si).

G-1-2: starting material: F-1-2, reaction scale: 18.2 mmol to afford ethyl 5-[tert-butyl(dimethyl)silyl]oxy-4-[[tert-butyl (dimethyl)silyl]oxymethyl] pentanoate G-1-2, MW 404.73, oil, 7.26 g, yield 84%. $^1$H NMR (CDCl$_3$) δ 4.09 (q, J=7.1 Hz, 2H, CH$_3$—C$\underline{H}_2$—O), 3.52 (d, J=4.9 Hz, 4H, 2×C$\underline{H}_2$—O—Si), 2.32 (m, 2H, C$\underline{H}_2$—C=O), 1.59 (m, 3H, C$\underline{H}_2$—CH$_2$—C=O/CH—(CH$_2$—O—Si)$_2$), 1.22 (t, 3H, C$\underline{H}_3$—CH$_2$—O), 0.85 (s, 18H, 2×t$\underline{Bu}$-Si), 0.00 (s, 12H, 4×C$\underline{H}_3$—Si).

G-1-3: starting material F-1-3, reaction scale: 10.8 mmol to afford isopropyl 5-[tert-butyl(dimethyl)silyl]oxy-4-[[tert-butyl(dimethyl)silyl]oxymethyl] pentanoate G-1-3, MW 418.73, oil, 3.88 g, yield 88%.

G-1-4: starting material: F-1-4, reaction scale: 14.2 mmol to afford tert-butyl 5-[tert-butyl(dimethyl)silyl]oxy-4-[[tert-butyl(dimethyl)silyl]oxymethyl] pentanoate G-1-4, MW 432.78, oil, 3.17 g, yield 91%.

G-1-5: starting material: F-1-5, reaction scale: 10.8 mmol to afford cyclopentyl 5-[tert-butyl(dimethyl)silyl]oxy-4-[[tert-butyl(dimethyl)silyl]oxymethyl] pentanoate G-1-5, MW 444.80, oil, 2.38 g, yield 50%.

G-1-6: starting material: F-1-6, reaction scale: 5.4 mmol to afford ethyl 5-((tert-butyldimethylsilyl)oxy)-4-(((tert-butyldimethylsilyl)oxy)methyl)-2-methylpentanoate G-1-6, MW 416.74, oil, 1.2 g, yield 45%. $^1$H NMR (CDCl$_3$) δ 4.08 (q, J=7.8 Hz, 2H, CH$_3$—C$\underline{H}_2$—O), 3.51 (m, 4H, 2×C$\underline{H}_2$—

O—Si), 2.52 (m, 1H, C<u>H</u>(CH₃)—C=O), 1.60-1.56 (m, 2H, C<u>H</u>₂—CH(CH₃)), 1.37-1.30 (m, 1H, C<u>H</u>—(CH₂—O—Si)₂), 1.20 (t, J=7.0 Hz, 3H, C<u>H</u>₃—CH₂—O), 1.10 (d, J=7.1 Hz, 3H, CH—C<u>H</u>₃), 0.85 (s, 18H, 2×t<u>Bu</u>-Si), 0.00 (s, 12H, 4×C<u>H</u>₃—Si).

Preparation of intermediates H-1-1 to H-1-6. General procedure: starting material G-1-i (i=1 to 6) (reaction scale, 1 eq.) was dissolved in THF (0.5 mL/mmol). AcOH (4.5 eq.) and 1M TBAF in THE (3.6 eq.) were added. The reaction mixture was stirred overnight at RT, concentrated under reduced pressure, purified by flash chromatography (PE/EtOAc 0 to 100%) to afford H-1-i (i=1 to 6).

H-1-1: starting material: G-1-1, reaction scale: 10.3 mmol to afford methyl 5-hydroxy-4-(hydroxymethyl)pentanoate H-1-1, MW 162.18, oil, 690 mg, yield 41%.

H-1-2: starting material: G-1-2, reaction scale: 15.4 mmol to afford ethyl 5-hydroxy-4-(hydroxymethyl)pentanoate H-1-2, MW 176.21, oil, 1.71 g, yield 69%.

H-1-3: starting material: G-1-3, reaction scale: 9.5 mmol to afford isopropyl 5-hydroxy-4-(hydroxymethyl)pentanoate H-1-3, MW 190.23, oil, 1.57 g, yield 87%. ¹H NMR (CDCl₃) δ 4.87 (m, 1H, O—C<u>H</u>(CH₃)₂), 4.34 (m, 2H, 2×<u>H</u>O—CH₂), 3.31-3.41 (m, 4H, 2×HO—C<u>H</u>₂), 2.28 (m, 2H, C<u>H</u>₂—C=O), 1.41-1.54 (m, 3H, C<u>H</u>—C<u>H</u>₂—CH₂—C=O), 1.17 (d, J=6.2 Hz, 6H, —CH(C<u>H</u>₃)₂).

H-1-4: starting material: G-1-4, reaction scale: 7.3 mmol to afford tert-butyl 5-hydroxy-4-(hydroxymethyl)pentanoate H-1-4, MW 204.26, oil, 1.42 g, yield 95%.

H-1-5: starting material: G-1-5, reaction scale: 5.2 mmol to afford cyclopentyl 5-hydroxy-4-(hydroxymethyl)pentanoate H-1-5, MW 216.27, oil, 720 mg, yield 63%.

H-1-6: starting material: G-1-6, reaction scale: 1.7 mmol to afford ethyl 5-hydroxy-4-(hydroxymethyl)-2-methylpentanoate H-1-6, MW 190.24, oil, 250 mg, yield 77%.

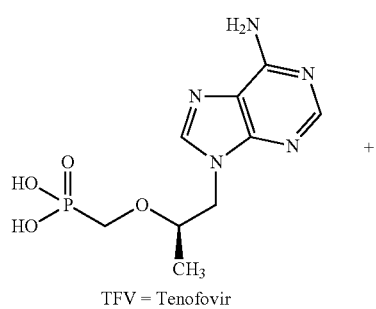

TFV = Tenofovir

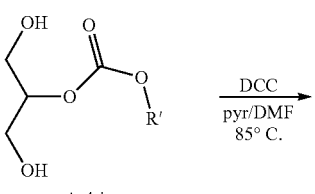

A-4-i

R' = Me, A-4-1
R' = Et, A-4-2
R' = iPr, A-4-3
R' = tBu, A-4-4
R' = cPent, A-4-5
R' = Bu, A-4-6
R' = Hex, A-4-7

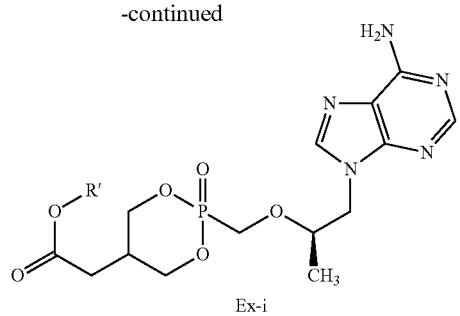

Ex-i

Ex-1, R' = Me, Example 1
Ex-2, R' = Et, Example 2
Ex-3, R' = iPr, Example 3,
separation of dias cis/trans
Example 3a/3b
Ex-4, R' = tBu, Example 4
Ex-5, R' = cPent, Example 5
Ex-5a, R' = Bu, Example 5a
Ex-5b, R' = Hex, Example 5b Synthesis of Example 1 to 5b. General procedure: To a solution of TFV (reaction scale, 1 eq.) in DMF (8 mL/mmol) and pyridine (2 mL/mmol) was added 1,3-dicyclohexylcarbodiimide (DCC) (3 eq.) followed by A-4-i (i=1 to 7) (1.05 eq.). The reaction mixture was heated 5 hours at 85° C. The reaction mixture was concentrated under reduced pressure and purified by flash chromatography (DCM/methanol (MeOH, 0 to 20%)) to afford Ex-i (i=1 to 5b).

Example 1: starting material: TFV and A-4-1, reaction scale: 9.2 mmol to afford (R)-methyl 2-(2-(((1-(6-amino-9H-purin-9-yl)propan-2-yl)oxy)methyl)-2-oxo-1,3,2-dioxaphosphinan-5-yl)acetate Ex-1, MW 399.34, foam, 690 mg, yield 19%. ¹H NMR (DMSO-d₆) δ 8.13 (s, 1H, H8), 8.10/8.09 (2s, 1H, H2), 7.23 (brs, 2H, N<u>H</u>₂), 4.54-3.84 (brm, 9H, N—C<u>H</u>₂—CH/O—C<u>H</u>₂—P/CH(O—C<u>H</u>₂)₂), 3.61/3.63 (2s, 3H, O—C<u>H</u>₃), 2.56-2.24 (m, 3H, C<u>H</u>—C<u>H</u>₂—C=O), 1.13/1.11 (2d, J=6.2 Hz, 3H, C<u>H</u>₃—C(H)—O); ³¹P NMR (DMSO-d₆) δ 13.68 (s); LCMS m/z 400.1 (M+H)⁺.

Example 2: starting material: TFV and A-4-2, reaction scale: 23.1 mmol to afford (R)-ethyl 2-(2-(((1-(6-amino-9H-purin-9-yl)propan-2-yl)oxy)methyl)-2-oxo-1,3,2-dioxaphosphinan-5-yl)acetate Ex-2, MW 413.37, foam, 4.55 g, yield 48%. ¹H NMR (DMSO-d₆) δ 8.12 (s, 1H, H8), 8.10/8.09 (2s, 1H, H2), 7.21 (brs, 2H, N<u>H</u>₂), 4.48-3.83 (brm, 11H, N—C<u>H</u>₂—CH/O—C<u>H</u>₂—P/C<u>H</u>(O—C<u>H</u>₂)₂/O—C<u>H</u>₂—CH₃), 2.56-2.26 (m, 3H, C<u>H</u>—C<u>H</u>₂—C=O), 1.19/1.18 (2t, J=7.1 Hz, 3H, O—CH₂—C<u>H</u>₃), 1.14/1.12 (2d, J=6.2 Hz, 3H, C<u>H</u>₃—C(H)—O); ³¹P NMR (DMSO-d₆) δ 13.69 (s), 13.68 (s); LCMS m/z 414.20 (M+H)⁺.

Example 3: starting material: TFV and A-4-3, reaction scale: 6.2 mmol to afford (R)-isopropyl 2-(2-(((1-(6-amino-9H-purin-9-yl)propan-2-yl)oxy)methyl)-2-oxo-1,3,2-dioxaphosphinan-5-yl)acetate Ex-3, MW 427.39, solid, 1.35 g, yield 51%. ¹H NMR (DMSO-d₆) δ 8.24 (s, 1H, H8), 8.13/8.12 (2s, 1H, H2), 7.19 (brs, 2H, N<u>H</u>₂), 4.91 (m, 1H, O—C<u>H</u>—(CH₃)₂), 4.51-3.87 (brm, 9H, N—C<u>H</u>₂—CH/O—C<u>H</u>₂—P/CH(C<u>H</u>₂—O)₂), 2.51-2.24 (m, 3H, C<u>H</u>—C<u>H</u>₂—C=O), 1.19/1.18 (2d, J=6.3 Hz, 6H, O—CH—(C<u>H</u>₃)₂), 1.13/1.12 (2d, J=6.2 Hz, 3H, C<u>H</u>₃—C(H)—O); ³¹P NMR (DMSO-d₆) δ 13.68 (s), 13.63 (s); ¹³C NMR (acetone-d₆) δ 170.65/170.09 (2s, 1C, <u>C</u>O₂iPr), 156.23 (s, 1C, <u>C</u>-base), 152.68 (s, 1C, <u>C</u>-base), 150.41 (s, 1C, <u>C</u>-base), 141.45 (s, 1C, <u>C</u>-base), 119.04 (s, 1C, <u>C</u>-base), 76.54/76.40 (2s, 1C, O—<u>C</u>H(CH₃)—CH₂—N), 71.46-71.12 (m, 2C, CH(<u>C</u>H₂—O)₂), 67.90/67.78 (2s, 1C, O—<u>C</u>H—(CH₃)₂), 63.46 and 63.33 (2d superimposed, J($^{13}$C—P)=161.3 Hz, 1C, O—$\underline{C}$H$_2$—P), 47.26/47.23 (2s, 1C, N—$\underline{C}$H$_2$—CH(CH$_3$)—O), $\overline{3}$2.53/32.09 (2d, J($^{13}$C—P)=7.7 Hz, $\overline{1}$C, —$\underline{C}$H(CH$_2$—O)$_2$), 32.53/31.30 (2s, 1C, —$\underline{C}$H$_2$—CO$_2$iPr), 2$\overline{1}$.12/21.09 (2s, 2C, O—$\underline{C}$H(CH$_3$)$_2$), 16.2$\overline{8}$/16.20 (2s, 1C, N—CH$_2$—CH($\underline{C}$H$_3$)—O); LCMS m/z 428.1 (M+H)$^+$. Separation by Preparative chromatography (column Waters XBridge BEH-prep ODB Amide 5 µm, 19×150 mm, solvent A: water/NH$_4$HCO$_3$ 5 mmol; solvent B: acetonitrile; isocratic 27% of B for 50 min) afforded the first eluted diastereomer 1 (cis or trans) Ex-3a, $^1$H NMR (DMSO-d$_6$) δ 8.13 (s, 1H, H8), 8.10 (s, 1H, H2), 7.20 (brs, 2H, N$\underline{H}_2$), 4.92 (hept, J=6.3 Hz, 1H), 4.48 (ddd, J=11.0, 5.1, 3.1 $\overline{H}$z, 1H), 4.30-3.87 (brm, 8H), 2.55 (m, 2H), 2.19 (brs, 1H), 1.19 (d, J=6.3 Hz, 6H, O—CH—(C$\underline{H}_3$)$_2$), 1.13 (d, J=6.2 Hz, 3H, $\underline{CH_3}$—C(H)—O); $^{31}$P NMR (D$\overline{MSO}$-d$_6$) δ 13.63 (s); LCMS m/$\overline{z}$ 428.1 (M+H)$^+$ and the second eluted diastereomer 2 (cis or trans) Ex-3b, $^{31}$P NMR (DMSO-d$_6$) δ 13.68 (s).

Example 4: starting material: TFV and A-4-4, reaction scale: 12.7 mmol to afford (R)-tert-butyl 2-(2-(((1-(6-amino-9H-purin-9-yl)propan-2-yl)oxy)methyl)-2-oxo-1,3,2-dioxaphosphinan-5-yl)acetate Ex-4, MW 441.42, foam, 2.67 g, yield 47%. $^1$H NMR (DMSO-d$_6$) δ 8.13 (s, 1H, H8), 8.10/8.09 (2s, 1H, H2), 7.19 (brs, 2H, N$\underline{H}_2$), 4.51-3.84 (brm, 9H, N—$\underline{C}$H$_2$—CH/O—$\underline{C}$H$_2$—P/CH(C$\underline{H}_2$—O)$_2$), 2.49-2.17 (m, 3H, $\overline{C}$H—$\underline{C}$H$_2$—C=O), 1.41/1.$\overline{4}$0 (2s, 9H, O—C ($\underline{CH_3})_3$), 1.1$\overline{3}$/1.12 (2d, J=6.2 Hz, 3H, $\underline{CH_3}$—C(H)—O); $^{31}$P NMR (DMSO-d$_6$) δ 13.75 (s), 13.70 (s); LCMS m/z 442.25 (M+H)$^+$.

Example 5: starting material: TFV and A-4-5, reaction scale: 16 mmol to afford (R)-cyclopentyl 2-(2-(((1-(6-amino-9H-purin-9-yl)propan-2-yl)oxy)methyl)-2-oxo-1,3,2-dioxaphosphinan-5-yl)acetate Ex-5, MW 453.43, foam, 4.85 g, yield 67%. $^1$H NMR (DMSO-d$_6$) δ 8.13 (s, 1H, H8), 8.10/8.09 (2s, 1H, H2), 7.20 (brs, 2H, N$\underline{H}_2$), 5.08 (m, 1H, O—C$\underline{H}$—(CH$_2$)$_2$ cPent), 4.52-3.85 (brm, 9H, N—$\underline{C}$H$_2$—CH/O—$\underline{C}$H$_2$—P/CH(C$\underline{H}_2$—O)$_2$), 2.53-2.23 (m, 3H, C$\overline{H}$—$\underline{C}$H$_2$—C=O), 1.81 (m, 2H, CH$_2$ cPent), 1.58 (m, 6H, 3×(C$\underline{H}_2$) cPent), 1.13/1.12 (2d, J=6.$\overline{2}$ Hz, 3H, $\underline{CH_3}$—C(H)—O); $^{31}$P NMR (DMSO-d$_6$) δ 13.71 (s), 13.66 (s); $^{13}$C NMR (acetone-d$_6$) δ 170.88/170.32 (2s, 1C, $\underline{C}$O$_2$iPr), 156.16 (s, 1C, $\underline{C}$-base), 152.61 (s, 1C, $\underline{C}$-base), 15$\overline{0}$.38 (s, 1C, $\underline{C}$-base), 141.$\overline{4}$6 (s, 1C, $\underline{C}$-base), 119.$\overline{0}$2 (s, 1C, $\underline{C}$-base), 77.$\overline{2}$1/77.12 (2s, 1C, O—$\underline{C}$H(CH$_3$)—CH$_2$—N), 7$\overline{6}$.53/76.39 (2s, 1C, O—$\underline{C}$H(cPent)), 71.46-71.03 (m, 2C, CH($\underline{C}$H$_2$—O)$_2$), 63.43 and $\overline{6}$3.32 (2d superimposed, J($^{13}$C—P)=161.2 Hz, 1C, O—$\underline{C}$H$_2$—P), 47.27/47.22 (2s, 1C, N—CH$_2$—CH(CH$_3$)—O), $\overline{3}$2.51/32.08 (2d, J($^{13}$C—P)=7.9 Hz, 1C, —$\underline{C}$H(CH$_2$—O)$_2$), 32.48/31.26 (2s, 1C, —$\underline{C}$H$_2$—CO$_2$ cPent), 3$\overline{2}$.32/32.30 (2s, 2C, ($\underline{C}$H$_2$)-cPent), 23.3$\overline{9}$ (s, 2C, ($\underline{C}$H$_2$)-cPent), 16.26/ 16.18 (2s, 1C, N—CH$_2$—CH($\underline{C}$H$_3$)—O); LCMS m/z 454.15 (M+H)$^+$.

Example 5a: starting material: TFV and A-4-6, reaction scale: 4.2 mmol to afford (R)-butyl 2-(2-(((1-(6-amino-9H-purin-9-yl)propan-2-yl)oxy)methyl)-2-oxo-1,3,2-dioxaphosphinan-5-yl)acetate Ex-5a, MW 441.42, foam, 1.07 g, yield 58%. $^1$H NMR (DMSO-d$_6$) δ 8.13 (s, 1H, H8), 8.11/8.10 (2s, 1H, H2), 7.20 (brs, 2H, N$\underline{H}_2$), 4.51-3.88 (brm, 9H, N—$\underline{C}$H$_2$—CH/O—$\underline{C}$H$_2$—P/CH(C$\underline{H}_2$—O)$_2$/O—$\underline{C}$H$_2$—(CH$_2$)$_2$—CH$_3$), 2.57-2.22 (m, 3H, CH—$\underline{C}$H$_2$—C=O), 1.56 (m, 2H, O—CH$_2$—(C$\underline{H}_2$)$_2$—CH$_3$), 1.26 (m, 2H, O—CH$_2$—(C$\underline{H}_2$)$_2$—CH$_3$), 1.13/1.12 (2d, J=6.2 Hz, 3H, $\underline{CH_3}$—C(H)—O), 0.89/0.88 (2t, J=7.4 Hz, 3H, O—(CH$_2$)$_3$—$\underline{C}$H$_3$); $^{31}$P NMR (DMSO-d$_6$) δ 13.74 (s), 13.68 (s); $^{13}$C NMR (CD$_3$OD) δ 171.46/170.97 (2s, 1C, $\underline{C}$O$_2$iPr), 155.93 (s, 1C, $\underline{C}$-base), 152.42 (s, 1C, $\underline{C}$-base), 1$\overline{4}$9.62 (s, 1C, $\underline{C}$-base), 141.98 (s, 1C, $\underline{C}$-base), 11$\overline{8}$.36 (s, 1C, $\underline{C}$-base), 76.5$\overline{5}$/76.41 (2s, 1C, O—$\underline{C}$H(CH$_3$)—CH$_2$—N), 71.71-71.32 (m, 2C, CH($\underline{C}$H$_2$—O)$_2$), 64.43/67.37 (2s, 1C, O—$\underline{C}$H$_2$—(CH$_2$)$_2$—CH$_3$), 62.35 and 62.27 (2d superimposed, J($^{13}$C—P)=164.0 Hz, 1C, O—$\underline{C}$H$_2$—P), 47.55/47.43 (2s, 1C, N—$\underline{C}$H$_2$—CH (CH$_3$)—O), $\overline{3}$2.33/32.04 (2d, J($^{13}$C—P)=8.8 Hz, $\overline{1}$C, —$\underline{C}$H (CH$_2$—O)$_2$), 31.67/30.10 (2s, 1C, —$\underline{C}$H$_2$—CO$_2$Bu), 30.$\overline{3}$6/ 30.33 (2s, 1C, O—CH$_2$—CH$_2$—CH$_2$—CH$_3$), 18.76 (1s, 1C, O—(CH$_2$)$_2$—$\underline{C}$H$_2$—CH$_3$), 15.54/15.44 (2s, 1C, N—CH$_2$—CH($\underline{C}$H$_3$)—O), 12.62 (1s, 1C, O—(CH$_2$)$_3$—$\underline{C}$H$_3$); LCMS m/z 442.15 (M+H)$^+$ Example 5b: starting material: TFV and A-4-7, reaction scale: 2.87 mmol to afford (R)-hexyl 2-(2-(((1-(6-amino-9H-purin-9-yl)propan-2-yl)oxy)methyl)-2-oxo-1,3,2-dioxaphosphinan-5-yl)acetate Ex-5b, MW 469.47, foam, 870 mg, yield 64%. $^1$H NMR (DMSO-d$_6$) δ 8.13 (s, 1H, H8), 8.10/8.09 (2s, 1H, H2), 7.20 (brs, 2H, N$\underline{H}_2$), 4.52-3.85 (brm, 9H, N—$\underline{C}$H$_2$—CH/O—$\underline{C}$H$_2$—P/CH(C$\underline{H}_2$—O)$_2$/O—$\underline{C}$H$_2$—(CH$_2$)$_4$—$\underline{C}$H$_3$), 2.$\overline{5}$7-2.21 (m, 3H, C$\underline{H}$—$\underline{C}$H$_2$—C=O), 1.56 (m, 2H, O—CH$_2$—(C$\underline{H}_2$)$_4$—CH$_3$), 1.26 (m, 8H, O—CH$_2$—(C$\underline{H}_2$)$_4$—CH$_3$), 1.13/1.12 (2d, J=6.2 Hz, 3H, $\underline{CH_3}$—C(H)—O), 0.85 (m, 3H, O—(CH$_2$)$_5$—$\underline{C}$H$_3$); $^{31}$P NMR (DMSO-d$_6$) δ 13.77 (s), 13.70 (s); LCMS m/z 470.15 (M+H)$^+$.

Synthesis of Examples 5c and 5d

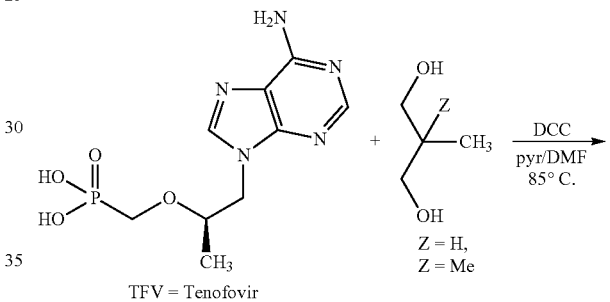

TFV = Tenofovir

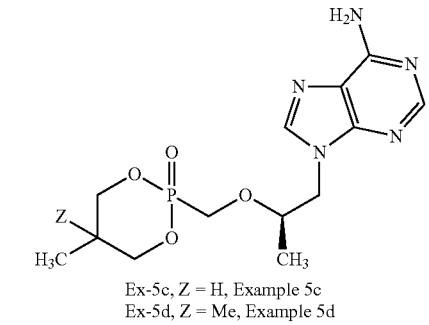

Ex-5c, Z = H, Example 5c
Ex-5d, Z = Me, Example 5d

Example 5c: Same general procedure as Example 1 to 5b. Starting material: TFV and 2-methyl-propan-1,3-diol, reaction scale: 3.48 mmol to afford (R)-2-(((1-(6-amino-9H-purin-9-yl)propan-2-yl)oxy)methyl)-5-methyl-1,3,2-dioxaphosphinane 2-oxide Ex-5c, MW 341.31, foam, 642 mg, yield 54%. $^1$H NMR (DMSO-d$_6$) δ 8.14 (s, 1H, H8), 8.10-8.09 (2s, 1H, H2), 7.20 (brs, 2H, N$\underline{H}_2$), 4.46-3.81 (brm, 9H), 2.21 (m, 1H), 1.75 (m, 1H), 1.14/1.13 (2d, J=6.2 Hz, 3H, $\underline{CH_3}$—C(H)—O), 096 (d, J=7.0 Hz, 3H(cis or trans)), 0.66 ($\overline{d}$, J=6.8 Hz, 3H(cis or trans)); $^{31}$P NMR (DMSO-d$_6$)

δ 13.75 (s), 12.45 (s); $^{13}$C NMR (acetone-d$_6$) δ 156.25 (s, 1C, C-base), 152.73 (s, 1C, C-base), 150.45 (s, 1C, C-base), 141.44/141.35 (2s, 1C, C-base), 119.06 (s, 1C, C-base), 76.36/76.18 (2d, J($^{13}$C—P)=14.6 Hz, 1C, O—CH(CH$_3$)—CH$_2$—N), 73.54/73.37/72.49/72.34 (4×d, J($^{13}$C—P)=7.0 Hz, 2C, CH(CH$_2$—O)$_2$), 63.51 and 63.04 (2d superimposed, J($^{13}$C—P)=160.2 Hz, 1C, O—CH$_2$—P), 47.32/47.20 (2s, 1C, N—CH$_2$—CH(CH$_3$)—O), 30.64/29.99 (2d, J($^{13}$C—P)=8.0 Hz, 1C, —CH(CH$_2$—O)$_2$), 16.28/16.17 (2s, 1C, N—CH$_2$—CH(CH$_3$)—O), 12.31/10.15 (2s, 1C, CH—CH$_3$); LCMS m z 342.1 (M+H)$^+$.

Example 5d: Same general procedure as Example 1 to 5b. Starting material: TFV and 2,2-dimethyl-propan-1,3-diol, reaction scale: 8.7 mmol to afford (R)-2-(((1-(6-amino-9H-purin-9-yl)propan-2-yl)oxy)methyl)-5,5-dimethyl-1,3,2-dioxaphosphinane 2-oxide Ex-5d, MW 355.33, 800 mg, yield 26%, $^1$H NMR (DMSO-d$_6$) δ 8.14 (s, 1H, H8), 8.09 (s, 1H, H2), 7.20 (brs, 2H, NH$_2$), 4.29-4.18 (m, 2H), 4.09-3.75 (brm, 7H), 1.13 (d, J=6.2 Hz, 3H, CH$_3$—C(H)—O), 1.09 (s, 3H, C(CH$_3$)—CH$_3$)) –0.74 (s, 3H, C(CH$_3$)—CH$_3$); $^{31}$P NMR (DMSO-d$_6$) δ 12.89 (s); $^{13}$C NMR (CD$_3$OD) δ 155.95 (s, 1C, C-base), 152.43 (s, 1C, C-base), 149.64 (s, 1C, C-base), 141.92 (s, 1C, C-base), 118.36 (s, 1C, C-base), 77.54 (t, J($^{13}$C—P)=6.9 Hz, CH(CH$_2$—O)$_2$), 76.49/76.35 (2s, 1C, O—CH(CH$_3$)—CH$_2$—N), 62.39 (d, J($^{13}$C—P)=163.2 Hz, 1C, O—CH$_2$—P), 47.45 (s, 1C, N—CH$_2$—CH(CH$_3$)—O), 31.94 (d, J($^{13}$C—P)=7.9 Hz, 1C, —CH(CH$_2$—O)$_2$), 20.35 (s, 1C, 15.55 (s, 1C, C(CH$_3$)—CH$_3$), 19.10 (s, 1C, C(CH$_3$)—CH$_3$), 15.58 (s, 1C, N—CH$_2$—CH(CH$_3$)—O). LCMS m/z 356.1 (M+H)$^+$.

Syntheses of Example 6 to 10. Same general procedure as Example 1 to 5b

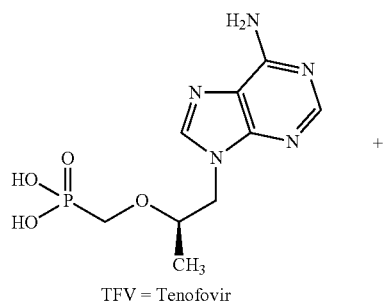

TFV = Tenofovir

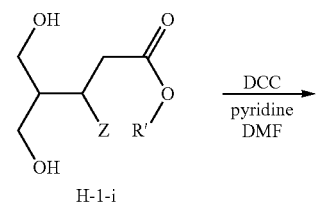

H-1-i
R' = Me, X = H, H-1-1
R' = Et, X = H, H-1-2
R' = Et, X = H, H-1-6
R' = iPr, X = H, H-1-3
R' = tBu, X = H, H-1-4
R' = cPent, X = H, H-1-5

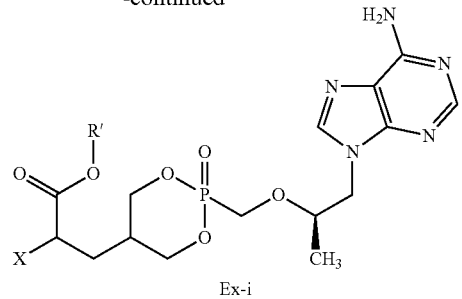

Ex-i
Ex-6, R' = Me, Example 6 (X = H)
Ex-7, R' = Et, Example 7 (X = H)
Ex-7a, R' = Et, Example 7a (X = Me)
Ex-8, R' = iPr, Example 8 (X = H)
Ex-9, R' = tBu, Example 9 (X = H)
Ex-10, R' = cPent, Example 10 (X = H)

Example 6: starting material: TFV and H-1-1, reaction scale: 4 mmol to afford (R)-methyl 3-(2-(((1-(6-amino-9H-purin-9-yl)propan-2-yl)oxy)methyl)-2-oxido-1,3,2-dioxaphosphinan-5-yl)propanoate Ex-6, MW 413.37, foam, 803 mg, yield 48%. $^1$H NMR (DMSO-d$_6$) δ 8.13 (s, 1H, H8), 8.10/8.09 (2s, 1H, H2), 7.23 (brs, 2H, NH$_2$), 4.46-3.82 (brm, 9H, N—CH$_2$—CH/O—CH$_2$—P/CH(CH$_2$—O)$_2$), 3.60 (2s, 3H, O—CH$_3$), 2.30-2.44 (m, 3H, CH—CH$_2$—CH$_2$—C=O), 1.68 (m, 2H, CH—CH$_2$—CH$_2$—C=O), 1.12/1.11 (2d, J=6.2 Hz, 3H, CH$_3$—C(H)—O); $^{31}$P NMR (DMSO-d$_6$) δ 13.82 (s), 13.40 (s); LCMS m/z 414.1 (M+H)$^+$.

Example 7: starting material: TFV and H-1-2, reaction scale: 10 mmol to afford (R)-ethyl 3-(2-(((1-(6-amino-9H-purin-9-yl)propan-2-yl)oxy)methyl)-2-oxo-1,3,2-dioxaphosphinan-5-yl)propanoate Ex-7, MW 427.39, foam, 1.34 g, yield 31%. $^1$H NMR (DMSO-d$_6$) δ 8.13 (s, 1H, H8), 8.10/8.09 (2s, 1H, H2), 7.23 (brs, 2H, NH$_2$), 4.48-3.80 (brm, 11H, N—CH$_2$—CH/O—CH$_2$—P/CH(CH$_2$—O)$_2$/O—CH$_2$—CH$_3$), 2.35 (m, 3H, CH—CH$_2$—CH$_2$—C=O), 1.70 (m, 2H, CH—CH$_2$—CH$_2$—C=O), 1.18/1.17 (2t, J=7.1 Hz, 3H, CH$_3$—CH$_2$O), 1.12/1.11 (2d, J=6.2 Hz, 3H, CH$_3$—C(H)—O); $^{31}$P NMR (DMSO-d$_6$) δ 13.81 (s), 13.40 (s); LCMS m/z 428.1 (M+H)$^+$.

Example 7a: starting material: TFV and H-1-6, reaction scale: 1.35 mmol to afford ethyl 3-(2-((((R)-1-(6-amino-9H-purin-9-yl)propan-2-yl)oxy)methyl)-2-oxo-1,3,2-dioxaphosphinan-5-yl)-2-methylpropanoate Ex-7a, MW 441.42, foam, 175 mg, yield 28%. $^1$H NMR (DMSO-d$_6$) δ 8.14/8.13 (2s, 1H, H8), 8.10-8.09 (m, 1H, H2), 7.20 (brs, 2H, NH$_2$), 4.46-3.81 (brm, 11H, N—CH$_2$—CH/O—CH$_2$—P/CH(CH$_2$—O)$_2$/O—CH$_2$—CH$_3$), 2.43 (m, 1H), 2.09 (m, 1H), 1.75 (m, 2H), 1.50 (m, 1H), 1.34 (m, 1H), 1.20-1.05 (m, 9H, CH$_3$—CH$_2$—CO/CH$_3$—C(H)—O/CH$_2$—CH(CH$_3$)); $^{31}$P NMR (DMSO-d$_6$) δ 13.67 (s), 13.66 (s), 13.36 (s), 13.31 (s); LCMS m/z 442.1 (M+H)$^+$.

Example 8: starting material: TFV and H-1-3, reaction scale: 8.2 mmol to afford (R)-isopropyl 3-(2-(((1-(6-amino-9H-purin-9-yl)propan-2-yl)oxy)methyl)-2-oxo-1,3,2-dioxaphosphinan-5-yl)propanoate Ex-8, MW 441.42, foam, 1.36 g, yield 37%. $^1$H NMR (DMSO-d$_6$) δ 8.13 (s, 1H, H8), 8.10/8.09 (2s, 1H, H2), 7.22 (brs, 2H, NH$_2$), 4.89 (m, 1H, O—CH—(CH$_3$)$_2$), 4.49-3.80 (brm, 9H, N—CH$_2$—CH/O—CH$_2$—P/CH(CH$_2$—O)$_2$), 2.32 (m, 3H, CH—CH$_2$—CH$_2$—C=O), 1.69 (m, 2H, CH—CH$_2$—CO), 1.18 (m, 6H, (CH$_3$)$_2$—CH), 1.12/1.11 (2d, J=6.2 Hz, 3H, CH$_3$—C(H)—O); $^{31}$P NMR (DMSO-d$_6$) δ 13.82 (s), 13.43 (s); $^{13}$C NMR (acetone-d$_6$) δ 171.90/171.81 (2s, 1C, CO$_2$iPr), 156.24 (s, 1C, C-base), 152.78/152.75 (2s, 1C, C-base), 150.41 (s, 1C, C-base), 141.47/141.41 (2s, 1C, C-base), 119.01 (s, 1C, C-base), 76.41/76.35 (2d superimposed, J($^{13}$C—P)=14.5 Hz, 1C, O—CH(CH$_3$)—CH$_2$—N), 72.08/71.90/71.17/71.00 (4×d, J($^{13}$C—P)=7.05 Hz, 2C, CH(CH$_2$—O)$_2$), 67.33/67.14 (2s, 1C, O—CH—(CH$_3$)$_2$), 63.47 and 63.26 (2d superimposed, J($^{13}$C—P)=161.6 Hz, 1C, O—CH$_2$—P), 47.27 (s, 1C, N—CH$_2$—CH(CH$_3$)—O), 35.03/34.52 (2d, J($^{13}$C—P)=8.2 Hz, 1C, —CH(CH$_2$—O)$_2$), 31.30/31.03 (2s, 1C, —CH$_2$—CH$_2$—CO$_2$iPr), 22.89/21.60 (2s, 1C, —CH$_2$—CH$_2$—CO$_2$iPr), 21.15 (s, 2C, O—CH(CH$_3$)$_2$), 16.27/16.20 (2s, 1C, N—CH$_2$—CH(CH$_3$)—O); LCMS m/z 442.1 (M+H)$^+$.

Example 9: starting material: TFV and H-1-4, reaction scale: 6.6 mmol to afford (R)-tert-butyl 3-(2-(((1-(6-amino-9H-purin-9-yl)propan-2-yl)oxy)methyl)-2-oxo-1,3,2-dioxaphosphinan-5-yl)propanoate Ex-9, MW 455.45, foam, 1.65 g, yield 55%. $^1$H NMR (DMSO-d$_6$) δ 8.14 (s, 1H, H8), 8.10/8.09 (2s, 1H, H2), 7.22 (brs, 2H, NH$_2$), 4.49-3.80 (brm, 9H, N—CH$_2$—CH/O—CH$_2$—P/CH(CH$_2$—O)$_2$), 2.28 (m, 3H, CH—CH$_2$—CH$_2$—C=O), 1.67 (m, 2H, CH—CH$_2$—CH$_2$—C=O), 1.40/1.39 (2s, 9H, O—C(CH$_3$)$_3$), 1.12/1.11 (2d, J=6.2 Hz, 3H, CH$_3$—C(H)—O); $^{31}$P NMR (DMSO-d$_6$) δ 13.81 (s), 13.42 (s); LCMS m/z 456.1 (M+H)$^+$.

Example 10: starting material: TFV and H-1-5, reaction scale: 3.2 mmol to afford (R)-cyclopentyl 3-(2-(((1-(6-amino-9H-purin-9-yl)propan-2-yl)oxy)methyl)-2-oxo-1,3,2-dioxaphosphinan-5-yl)propanoate Ex-10, MW 467.46, foam, 470 mg, 31%, $^1$H NMR (DMSO-d$_6$) δ 8.13 (s, 1H, H8), 8.10/8.09 (2s, 1H, H2), 7.19 (brs, 2H, NH$_2$), 5.06 (m, 1H, O—CH-cPent), 4.48-3.81 (brm, 9H, N—CH$_2$/O—CH$_2$—P/CH(CH$_2$—O)$_2$—CH), 2.32 (m, 3H, CH—CH$_2$—CH$_2$—CO), 1.80 (m, 2H, CH—CH$_2$—CH$_2$—CO), 1.60 (m, 8H, 4×(CH$_2$-cPent)), 1.13/1.12 (2d, J=6.2 Hz, 3H, CH$_3$—C(H)—O); $^{31}$P NMR (DMSO-d$_6$) δ 13.84 (s), 13.41 (s); LCMS m/z 468.1 (M+H)$^+$.

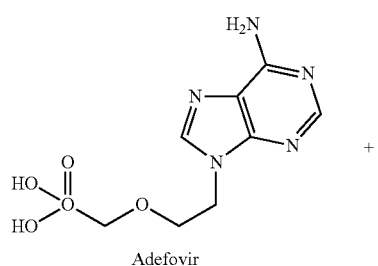

Adefovir

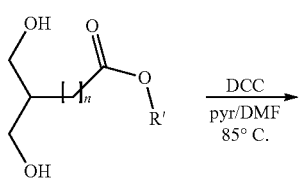

n = 1, R' = iPr, A-4-3
n = 2, R' = tBu, A-1-3

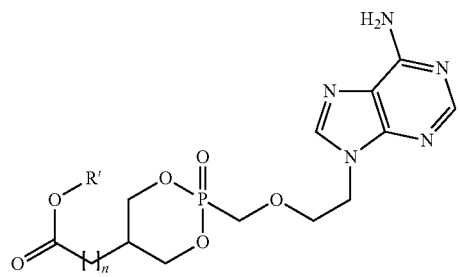

Ex-11, n = 1, R' = iPr, Example 11
Ex-12, n = 2, R' = iPr, Example 12

Example 11: starting material: Adefovir and A-4-3, reaction scale: 1.4 mmol to afford isopropyl 2-(2-((2-(6-amino-9H-purin-9-yl)ethoxy)methyl)-2-oxo-1,3,2-dioxaphosphinan-5-yl)acetate Ex-11, MW 413.37, white solid, 251 mg, yield 45%. $^1$H NMR (DMSO-d$_6$) δ 8.13 (m, 2H, H2 and H8), 7.19 (brs, 2H, NH$_2$), 4.91 (m, 1H, O—CH—(CH$_3$)$_2$), 4.30-3.84 (brm, 10H, N—CH$_2$—CH$_2$—O/O—CH$_2$—P/CH(CH$_2$—O)$_2$), 2.54-2.20 (m, 3H, CH—CH$_2$—C=O), 1.20/1.19 (2d, J=6.3 Hz, 6H, O—CH—(CH$_3$)$_2$); $^{31}$P NMR (DMSO-d$_6$) δ 13.32 (s), 13.25 (s). $^{13}$C NMR (acetone-d$_6$) δ 170.91/170.35 (2s, 1C, CO$_2$iPr), 155.93 (s, 1C, C-base), 152.43 (s, 1C, C-base), 149.42 (s, 1C, C-base), 141.71/141.68 (2s, 1C, C-base), 118.52 (s, 1C, C-base), 71.74-71.07 (m, 3C, O—CH$_2$—CH$_2$—N/CH(CH$_2$—O)$_2$), 68.40/68.27 (2s, 1C, O—CH—(CH$_3$)$_2$), 64.90 (d, J($^{13}$C—P)=162.7 Hz, 1C, O—CH$_2$—P), 43.02/42.99 (2s, 1C, N—CH$_2$—CH(CH$_3$)—O), 32.38/32.07 (2d, J($^{13}$C—P)=8.8 Hz, 1C, —CH(CH$_2$—O)$_2$), 32.06/30.97 (2s, 1C, —CH$_2$—CO$_2$iPr), 20.62 (s, 2C, O—CH(CH$_3$)$_2$); LCMS m/z 414.20 (M+H)$^+$.

Example 12: starting material: Adefovir and H-1-3, reaction scale: 1.6 mmol to afford isopropyl 3-(2-((2-(6-amino-9H-purin-9-yl)ethoxy)methyl)-2-oxo-1,3,2-dioxaphosphinan-5-yl)propanoate Ex-12, MW 427.39, white solid, 576 mg, yield 36%. $^1$H NMR (DMSO-d$_6$) δ 8.13 (m, 2H, H8, H2), 7.19 (brs, 2H, NH$_2$), 4.89 (m, 1H, O—CH—(CH$_3$)$_2$), 4.40-3.84 (brm, 10H, N—CH$_2$—CH$_2$—O/O—CH$_2$—P/CH(CH$_2$—O)$_2$), 2.36-2.27 (m, 2H, CH—CH$_2$—CH$_2$—C=O), 1.68-1.31 (m, 3H, CH—CH$_2$—CH$_2$—CO), 1.18/1.17 (2d, J=6.3 Hz, 6H, CH—(CH$_3$)$_2$); $^{31}$P NMR (DMSO-d$_6$) δ 13.33 (s), 12.99 (s); LCMS m/z 428.25 (M+H)$^+$.

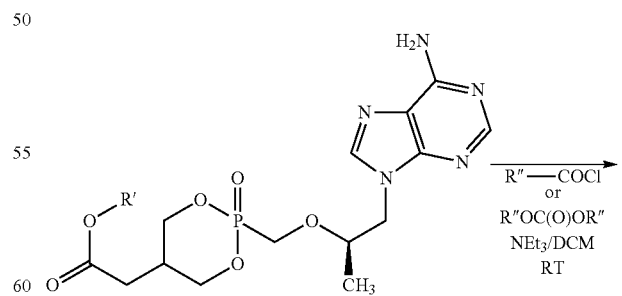

Ex-1, R' = Me, Example 1
Ex-2, R' = Et, Example 2
Ex-3, R' = iPr, Example 3
Ex-4, R' = tBu, Example 4
Ex-5, R' = cPent, Example 5

-continued

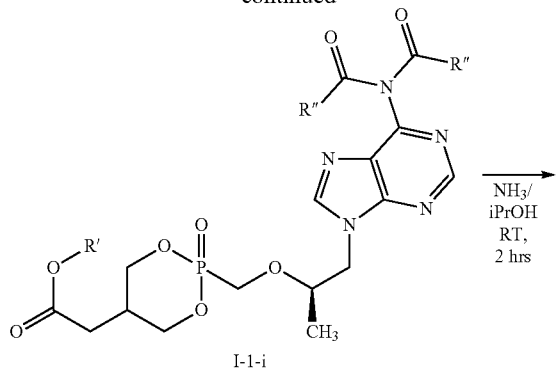

I-1-i

Ex-14, R' = Et, R" = Me, I-1-1 Example 14
R' = Et, R" = Et, I-1-2
R' = Et, R" = iPr, I-1-3
R' = Et, R" = iBu, I-1-4
R' = Et, R" = O—iBu, I-1-5
R' = Et, R" = Bz, I-1-6
Ex-20, R' = iPr, R" = Ph, I-1-7, Example 20
R' = iPr, R" = iPr, I-1-8
R' = tBu, R" = Ph, I-1-9
R' = cPent, R" = Me, I-1-10
R' = iPr, R" = 4-F—Ph, I-1-11
R' = iPr, R" = 3-F—Ph, I-1-12
R' = iPr, R" = 4-MeO—Ph, I-1-13

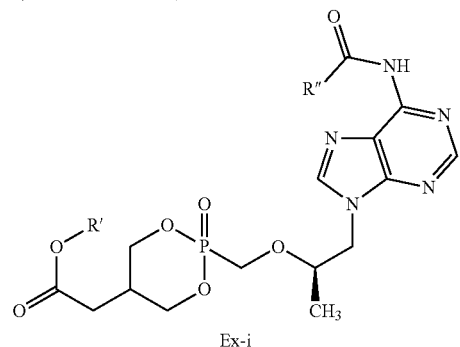

Ex-i

Ex-13, R' = Et, R" = Me, Example 13
Ex-15, R' = Et, R" = Et, Example 15
Ex-16, R' = Et, R" = iPr, Example 16
Ex-17, R' = Et, R" = iBu, Example 17
Ex-18, R' = Et, R" = O—iBu, Example 18
Ex-19, R' = Et, R" = Ph, Example 19
Ex-21, R' = iPr, R" = Ph, Example 21
Ex-21a, R' = iPr, R" = iPr, Example 21a
Ex-22, R' = tBu, R" = Ph, Example 22
Ex-22a, R' = cPent, R" = Me, Example 22a
Ex-22b, R' = iPr, R" = 4-F—Ph, Example 22b
Ex-22c, R' = iPr, R" = 3-F—Ph, Example 22c
Ex-22d, R' = iPr, R" = 4-MeOH—Ph, Example 22d Syntheses of Examples Ex-13 to -22d. General procedure: To a solution of starting material Ex-i (i=1 to 5) (reaction scale, 1 eq.) in DCM (3.5 mL/mmol) was added NEt$_3$ (6 eq.) and anhydride (at RT) or acyl chloride (at 0° C.) (4 eq.) was added dropwise. The reaction mixture was stirred at 10° C. for 3 hours, washed with a saturated NaHCO$_3$ aq. solution (10 mL), aq. HCl 1N (10 mL), and brine (10 mL). The organic layer was dried over Na$_2$SO$_4$, filtered, concentrated under reduced pressure and purified by column chromatography (EtOAc/MeOH, 0 to 20%) afforded the 6-N-(acyl)$_2$ di-protected compound I-1-i (i=1 to 13). This latter was dissolved in a solution of ammonia 1.5N in iso-propanol (iPrOH, 20 mL/mmol, 31 eq.) and stirred at RT for 2 hours. The solvent was removed under reduced pressure and the residue was purified by flash chromatography (EtOAc/MeOH, (0 to 20%)) to afford Example 13 to 22d.

Example 13/14: starting material: Ex-2 and Ac$_2$O, reaction scale: 1.9 mmol to afford the 6-N-(acyl)$_2$ di-protected compound (R)-ethyl 2-(2-(((1-(6-(N-acetylacetamido)-9H-purin-9-yl)propan-2-yl)oxy)methyl)-2-oxo-1,3,2-dioxaphosphinan-5-yl)acetate Ex-14, MW 497.44, foam, 300 mg, yield 31%. $^1$H NMR (DMSO-d$_6$) δ 8.97 (s, 1H, H8), 8.64/8.63 (2s, 1H, H2), 4.53-3.80 (brm, 11H, N—C$\underline{H}_2$—C$\underline{H}$/O—C$\underline{H}_2$—P/CH(C$\underline{H}_2$—O)$_2$/O—C$\underline{H}_2$—CH$_3$), 2.22 (m, 6H, (C$\underline{H}_3$)$_2$—C=O), 2.45-2.19 (m, 3H, C$\underline{H}$—C$\underline{H}_2$—C=O), 1.19 (m, 6H, C$\underline{H}_3$—C(H)—O, O—C$\underline{H}_2$—C$\underline{H}_3$); LCMS m/z 498.1 (M+H)$^+$; $^{31}$P NMR (DMSO-d$_6$) δ 13.82 (s), 13.70 (s). Partial deprotection of Ex-14 (0.28 mmol) gave (R)-ethyl 2-(2-(((1-(6-acetamido-9H-purin-9-yl)propan-2-yl)oxy)methyl)-2-oxo-1,3,2-dioxaphosphinan-5-yl)acetate Ex-13, MW 455.40, foam, 41 mg, yield 32%. $^1$H NMR (DMSO-d$_6$) δ 10.63 (s, 1H, N$\underline{H}$—CO(CH$_3$)), 8.63 (s, 1H, H8), 8.42/8.41 (2s, 1H, H2), 4.46-3.87 (brm, 1H, N—C$\underline{H}_2$—C$\underline{H}$/O—C$\underline{H}_2$—P/CH(C$\underline{H}_2$—O)$_2$/O—C$\underline{H}_2$—CH$_3$), 2.24 (m, 3H, C$\underline{H}_3$—C=O), 2.52-2.15 (m, 3H, C$\underline{H}$—C$\underline{H}_2$—C=O), 1.17 (m, 6H, C$\underline{H}_3$—C(H)—O, O—C$\underline{H}_2$—C$\underline{H}_3$); $^{31}$P NMR (DMSO-d$_6$) δ 13.82 (s), 13.73 (s); LCMS m/z 456.15 (M+H)$^+$.

Example 15: starting material: Ex-2 and CH$_3$—CH$_2$—COCl, reaction scale: 0.96 mmol to afford (R)-ethyl 2-(2-oxo-2-(((1-(6-propionamido-9H-purin-9-yl)propan-2-yl)oxy)methyl)-1,3,2-dioxaphosphinan-5-yl)acetate Ex-15, MW 469.43, foam, 40 mg, yield 10%. $^1$H NMR (DMSO-d$_6$) δ 10.57 (s, 1H, N$\underline{H}$—CO), 8.63 (s, 1H, H8), 8.41/8.40 (2s, 1H, H2), 4.48-3.86 (brm, 11H, N—C$\underline{H}_2$—C$\underline{H}$/O—C$\underline{H}_2$—P/CH(C$\underline{H}_2$—O)$_2$/O—C$\underline{H}_2$—CH$_3$), 2.60 (q, J=7.54 Hz, 2H, O=C-C$\underline{H}_2$—CH$_3$); 2.54-2.14 (m, 3H, C$\underline{H}$—C$\underline{H}_2$—C=O), 1.17 (m, 6H, C$\underline{H}_3$—C(H)—O/O=C—C$\underline{H}_2$—C$\underline{H}_3$), 1.09 (m, 3H, O—CH$_2$—C$\underline{H}_3$); $^{31}$P NMR (DMSO-d$_6$) δ 13.84 (s), 13.74 (s).

Example 16: starting material: Ex-2 and (CH$_3$)$_2$—CH—COCl, reaction scale: 0.97 mmol to afford (R)-ethyl 2-(2-(((1-(6-isobutyramido-9H-purin-9-yl)propan-2-yl)oxy)methyl)-2-oxo-1,3,2-dioxaphosphinan-5-yl)acetate Ex-16, MW 483.46, foam, 125 mg, yield 27%. $^1$H NMR (DMSO-d$_6$) δ 10.58 (s, 1H, NH—CO), 8.63 (s, 1H, H8), 8.41/8.40 (2s, 1H, H2), 4.50-3.85 (brm, 11H, N—C$\underline{H}_2$—C$\underline{H}$/O—C$\underline{H}_2$—P/CH(C$\underline{H}_2$—O)$_2$/O—C$\underline{H}_2$—CH$_3$), 2.96 (m, 1H, CO—C$\underline{H}$—(C$\underline{H}_3$)$_2$), 2.52-2.18 (m, 3H, C$\underline{H}$—C$\underline{H}_2$—CO), 1.16 (m, 12H, C$\underline{H}_3$—C(H)—O/CO—C$\underline{H}_2$—C$\underline{H}_3$/CO—CH—(C$\underline{H}_3$)$_2$); $^{31}$P NMR (DMSO-d$_6$) δ 13.84 (s), 13.72 (s); LCMS m/z 484.20 (M+H)$^+$.

Example 17: starting material: Ex-2 and (CH$_3$)$_2$—CH—CH$_2$—COCl, reaction scale: 0.97 mmol to afford (R)-ethyl 2-(2-(((1-(6-(3-methylbutanamido)-9H-purin-9-yl)propan-2-yl)oxy)methyl)-2-oxo-1,3,2-dioxaphosphinan-5-yl)acetate Ex-17, MW 497.49, foam, 140 mg, yield 29%. $^1$H NMR (DMSO-d$_6$) δ 10.59 (s, 1H, N$\underline{H}$—CO), 8.64 (s, 1H, H8), 8.41/8.40 (2s, 1H, H2), 4.43-3.88 (brm, 1H, N—C$\underline{H}_2$—C$\underline{H}$/O—C$\underline{H}_2$—P/CH(C$\underline{H}_2$—O)$_2$/O—C$\underline{H}_2$—CH$_3$), 2.60 (q, J=7.54 Hz, 2H, O=C-C$\underline{H}_2$—CH$_3$), 2.54-2.17 (m, 3H, C$\underline{H}$—C$\underline{H}_2$—C=O), 2.11 (m, 1H, (CH$_3$)$_2$—C$\underline{H}$—CH$_2$—C=O), 1.17 (m, 6H, C$\underline{H}_3$—C(H)—O/O=C—O—CH$_2$—C$\underline{H}_3$), 0.97 (d, J=6.7 Hz, 3H, O—CH$_2$—CH—(C$\underline{H}_3$)$_2$); $^{31}$P NMR (DMSO-d$_6$) δ 13.85 (s), 13.74 (s). LCMS m/z 498.25 (M+H)$^+$.

Example 18: starting material: Ex-2 and (CH$_3$)$_2$—CH—CH$_2$—O—COCl, reaction scale: 0.85 mmol to afford (R)-ethyl 2-(2-(((1-(6-((isobutoxycarbonyl)amino)-9H-purin-9-yl)propan-2-yl)oxy)methyl)-2-oxo-1,3,2-dioxaphosphinan-5-yl)acetate Ex-18, MW 513.48, foam, 63 mg, yield 13%.

¹H NMR (DMSO-d₆) δ 10.42 (brs, 1H, NH—CO₂), 8.61 (s, 1H, H8), 8.40/8.39 (2s, 1H, H2), 4.47-3.85 (brm, 13H, N—C<u>H</u>₂—CH/O—C<u>H</u>₂—P/CH(C<u>H</u>₂—O)₂/O—C<u>H</u>₂—CH₃/O—C<u>H</u>₂—CH—(CH₃)₂), 2.53-2.21 (m, 3H, (O—CH₂)₂—C<u>H</u>—C<u>H</u>₂—C=O), 1.93 (m, 1H, O—CH₂—C<u>H</u>—(CH₃)₂), 1.17 (m, 6H, C<u>H</u>₃—C(H)—O/O—CH₂—C<u>H</u>₃), 0.94 (d, J=6.7 Hz, 6H, CH—(C<u>H</u>₃)₂); ³¹P NMR (DMSO-d₆) δ 13.81 (s), 13.72 (s); LCMS m/z 514.1 (M+H)⁺.

Example 19: starting material: Ex-2 and BzCl, reaction scale: 3.2 mmol to afford (R)-ethyl 2-(2-(((1-(6-benzamido-9H-purin-9-yl)propan-2-yl)oxy)methyl)-2-oxo-1,3,2-dioxaphosphinan-5-yl)acetate Ex-19, MW 517.47, foam, 260 mg, yield 15%. ¹H NMR (DMSO-d₆) δ 11.08 (brs, 1H, CO—N<u>H</u>), 8.74 (s, 1H, H8), 8.44/8.43 (2s, 1H, H2), 8.05 (m, 2H, Haro), 7.64 (m, 1H, Haro), 7.55 (m, 2H, Haro), 4.49-3.88 (brm, 11H, N—C<u>H</u>₂—CH/O—C<u>H</u>₂—P/(O—C<u>H</u>₂—CH)₂/O—C<u>H</u>₂—CH₃), 2.52-2.23 (m, 3H, C<u>H</u>—C<u>H</u>₂—C=O), 1.21-1.12 (m, 6H, C<u>H</u>₃—C(H)—O/O—CH₂—C<u>H</u>₃); ³¹P NMR (DMSO-d₆) δ 13.83 (s), 13.67 (s). LCMS m/z 518.25 (M+H)⁺.

Example 20/21: starting material: Ex-3 and BzCl, reaction scale: 4.6 mmol to afford the 6-N-(acyl)₂ di-protected compound (R)-isopropyl 2-(2-(((1-(6-(N-benzoylbenzamido)-9H-purin-9-yl)propan-2-yl)oxy)methyl)-2-oxido-1,3,2-dioxaphosphinan-5-yl)acetate Ex-20, MW 635.60, foam, 2.89 g, yield 89%. ¹H NMR (DMSO-d₆) δ 8.67 (s, 1H, H8), 8.56/8.55 (2s, 1H, H2), 7.76 (m, 4H, Haro), 7.59 (m, 2H, Haro), 7.46 (m, 4H, Haro), 4.91 (m, 1H, O—C<u>H</u>—(CH₃)₂), 4.48-3.85 (brm, 9H, N—C<u>H</u>₂—CH/O—C<u>H</u>₂—P/CH(C<u>H</u>₂—O)₂), 2.49-2.17 (m, 3H, C<u>H</u>—C<u>H</u>₂—C=O), 1.19-1.13 (m, 9H, C<u>H</u>₃—C(H)—O/O—CH—(C<u>H</u>₃)₂); ³¹P NMR (DMSO-d₆) δ 13.66 (s), 13.60 (s); ³¹P NMR (CDCl₃) δ 13.66 (s), 13.60 (s); LCMS m/z 636.45 (M+H)⁺. Treatment of Ex-20 (1.5 g, 2.36 mmol) with diluted ammonia in iPrOH afforded (R)-isopropyl 2-(2-(((1-(6-benzamido-9H-purin-9-yl)propan-2-yl)oxy)methyl)-2-oxo-1,3,2-dioxaphosphinan-5-yl)acetate Ex-21, MW 531.50, foam, 1.06 g, yield 82%. ¹H NMR (DMSO-d₆) δ 11.14 (brs, 1H, CO—N<u>H</u>), 8.74 (s, 1H, H8), 8.45/8.44 (2s, 1H, H2), 8.05 (m, 2H, Haro), 7.64 (m, 1H, Haro), 7.55 (m, 2H, Haro), 4.87 (m, 1H, O—C<u>H</u>—(CH₃)₂), 4.47-3.85 (brm, 9H, N—C<u>H</u>₂—CH/O—C<u>H</u>₂—P/CH(C<u>H</u>₂—O)₂), 2.49-2.17 (m, 3H, C<u>H</u>—C<u>H</u>₂—C=O), 1.17 (m, 9H, C<u>H</u>₃—C(H)—O/O—CH—(C<u>H</u>₃)₂); ³¹P NMR (DMSO-d₆) δ 13.79 (s), 13.67 (s); ¹³C NMR (acetone-d₆) δ 170.66/170.15 (2s, 1C, 2s, 1C, CO₂iPr), 165.24 (s, 1C, NH—CO—Ph), 152.92 (s, 1C, C-base), 151.70 (s, 1C, C-base), 150.15 (s, 1C, C-base), 144.70 (s, 1C, C(Ph)), 134.25 (s, 1C, C-Base), 132.26 (s, 1C, C(Ph)), 128.47 (s, 1C, C(Ph)), 128.36 (s, 1C, C(Ph)), 124.48 (s, 1C, C-base), 76.31/76.17 (2s, 1C, 2s, 1C, O—<u>C</u>H(CH₃)—CH₂—N), 71.36-71.15 (m, 2C, CH(<u>C</u>H₂—O)₂), 67.87/67.76 (2s, 1C, O—<u>C</u>H—(CH₃)₂), 63.19/63.06 (2d superimposed, J(¹³C—P)=161.2 Hz, 1C, O—<u>C</u>H₂—P), 47.54/47.50 (2s, 1C, N—<u>C</u>H₂—CH(CH₃)—O), 32.53/32.04 (2d, J(¹³C—P)=7.7 Hz, 1C, —<u>C</u>H(CH₂—O)₂), 32.49/31.27 (2s, 1C, —<u>C</u>H₂—CO₂iPr), 21.14/21.11 (2s, 2C, O—CH(<u>C</u>H₃)₂), 16.29/16.21 (2s, 1C, N—CH₂—CH(<u>C</u>H₃)—O; LCMS m/z 532.25 (M+H)⁺.

Example 21a: starting material: Ex-3 and (CH₃)₂—CH—COCl, reaction scale: 0.7 mmol to afford (R)-isopropyl 2-(2-(((1-(6-isobutyramido-9H-purin-9-yl)propan-2-yl)oxy)methyl)-2-oxido-1,3,2-dioxaphosphinan-5-yl)acetate Ex-21a, MW 497.48, foam, 137 mg, yield 36%. ³¹P NMR (CDCl₃) δ 15.00 (s), 15.07 (s); LCMS m/z 498.40 (M+H)⁺.

Example 22: starting material: Ex-4 and BzCl, reaction scale: 3.35 mmol to afford (R)-tert-butyl 2-(2-(((1-(6-benzamido-9H-purin-9-yl)propan-2-yl)oxy)methyl)-2-oxo-1,3, 2-dioxaphosphinan-5-yl)acetate Ex-22, MW 545.52, foam, 758 mg, yield 36%. ¹H NMR (DMSO-d₆) δ 11.16 (brs, 1H, CO—N<u>H</u>), 8.73 (s, 1H, H8), 8.45/8.44 (2s, 1H, H2), 8.05 (m, 2H, Haro), 7.65 (m, 1H, Haro), 7.55 (m, 2H, Haro), 4.47-3.85 (brm, 9H, N—C<u>H</u>₂—CH/O—C<u>H</u>₂—P/(O—C<u>H</u>₂—CH)₂), 2.49-2.17 (m, 3H, C<u>H</u>—C<u>H</u>₂—C=O), 1.39/1.37 (2s, 9H, O—C(C<u>H</u>₃)₃), 1.18/1.17 (2d, J=6.1 Hz, 3H, C<u>H</u>₃—C(H)—O; ³¹P NMR (DMSO-d₆) δ 13.74 (s), 13.67 (s); LCMS m/z 546.30 (M+H)⁺.

Example 22a: starting material: Ex-5 and Ac₂O, reaction scale: 0.91 mmol to afford (R)-cyclopentyl 2-(2-(((1-(6-acetamido-9H-purin-9-yl)propan-2-yl)oxy)methyl)-2-oxo-1,3,2-dioxaphosphinan-5-yl)acetate Ex-22a, MW 495.47, foam, 140 mg, yield 31%. ³¹P NMR (DMSO-d₆) δ 13.80 (s), 13.75 (s); LCMS m/z 496.30 (M+H)⁺.

Example 22b: starting material: Ex-3 and 4-fluorobenzoyl chloride, reaction scale: 0.7 mmol to afford (R)-isopropyl 2-(2-(((1-(6-(4-fluorobenzamido)-9H-purin-9-yl)propan-2-yl)oxy)methyl)-2-oxo-1,3,2-dioxaphosphinan-5-yl)acetate Ex-22b, MW 549.49, foam, 162 mg, yield 42%. ¹H NMR (CDCl₃) δ 9.20 (brs, 1H, CO—N<u>H</u>), 8.78 (s, 1H, H8), 8.17/8.16 (2s, 1H, H2), 8.08 (m, 2H, Haro), 7.20 (m, 2H, Haro), 5.03-4.93 (m, 1H), 4.56-3.97 (m, 8H), 3.85-3.76 (m, 1H), 2.62-2.39 (m, 3H, C<u>H</u>—C<u>H</u>₂—C=O), 1.30/1.29 (2d, J=6.2 Hz, 3H, C<u>H</u>₃—C(H)—O), 1.23-1.20 (m, 6H, —O—CH(C<u>H</u>₃)₂); ³¹P NMR (CDCl₃) δ 15.37 (s), 15.06 (s); LCMS m/z 550.30 (M+H)⁺.

Example 22c: starting material: Ex-3 and 3-fluorobenzoyl chloride, reaction scale: 0.7 mmol to afford (R)-isopropyl 2-(2-(((1-(6-(3-fluorobenzamido)-9H-purin-9-yl)propan-2-yl)oxy)methyl)-2-oxo-1,3,2-dioxaphosphinan-5-yl)acetate Ex-22c, MW 549.49, foam, 134 mg, yield 35%. ¹H NMR (CDCl₃) δ 9.14 (brs, 1H, CO—N<u>H</u>), 8.79 (s, 1H, H8), 8.18/8.17 (2s, 1H, H2), 7.78 (m, 2H, Haro), 7.51 (m, 1H, Haro), 7.31 (m, 1H, Haro), 5.09-4.96 (m, 1H), 4.56-3.97 (m, 8H), 3.85-3.75 (m, 1H), 2.63-2.38 (m, 3H, C<u>H</u>—C<u>H</u>₂—C=O), 1.30/1.29 (2d, J=6.2 Hz, 3H, C<u>H</u>₃—C(H)—O), 1.23-1.20 (m, 6H, —O—CH(C<u>H</u>₃)₂); ³¹P NMR (CDCl₃) δ 15.41 (s), 15.03 (s); LCMS m/z 550.30 (M+H)⁺.

Example 22d: starting material: Ex-3 and 4-methoxybenzoyl chloride, reaction scale: 0.7 mmol to afford (R)-isopropyl 2-(2-(((1-(6-(4-methoxybenzamido)-9H-purin-9-yl)propan-2-yl)oxy)methyl)-2-oxo-1,3,2-dioxaphosphinan-5-yl)acetate Ex-22d, MW 561.52, foam, 116 mg, yield 32%. ¹H NMR (CDCl₃) δ 8.98 (brs, 1H, CO—N<u>H</u>), 8.79 (s, 1H, H8), 8.15/8.14 (2s, 1H, H2), 8.01 (m, 2H, Haro), 7.01 (m, 2H, Haro), 5.00-4.93 (m, 1H), 4.56-3.96 (m, 8H), 3.90 (s, 3H, C<u>H</u>₃—O-Ph), 3.85-3.76 (m, 1H), 2.63-2.38 (m, 3H, C<u>H</u>—C<u>H</u>₂—C=O), 1.301/1.29 (2d, J=6.2 Hz, 3H, C<u>H</u>₃—C(H)—O), 1.23-1.20 (m, 6H, —O—CH(C<u>H</u>₃)₂); ³¹P NMR (CDCl₃) δ 15.23 (s), 15.01 (s); LCMS m/z 562.35 (M+H)⁺.

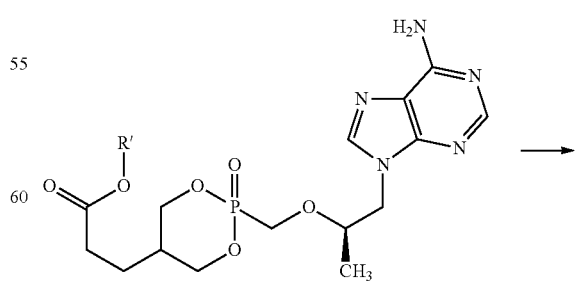

R' = Et, Example 7
R' = iPr, Example 8
R' = tBu, Example 9

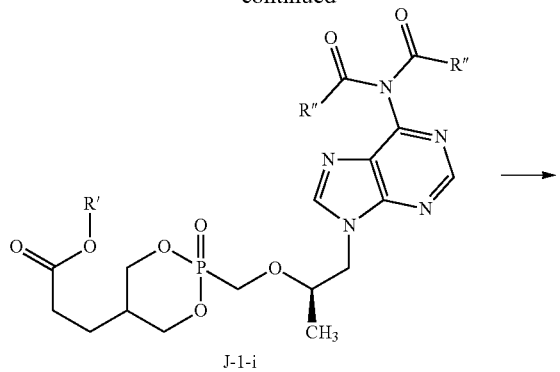

J-1-i
R' = Et, R'' = Ph, J-1-1
R' = Et, R'' = Me, J-1-2
R' = iPr, R'' = Ph, J-1-3
R' = tBu, R'' = Ph, J-1-4

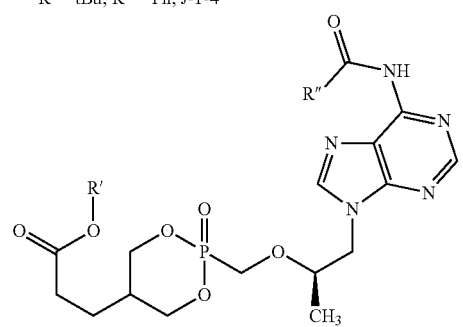

Ex-23, R' = Et, R'' = Ph, Example 23
Ex-24, R' = Et, R'' = Me, Example 24
Ex-25, R' = iPr, R'' = Ph, Example 25
Ex-26, R' = tBu, R'' = Ph, Example 26

Syntheses of Examples Ex-23 to -26. General Procedure as Described for Ex-13 to -22d (Using J-1-i as Intermediates)

Example 23: starting material: Ex-7 and BzCl, reaction scale: 0.93 mmol to afford (R)-ethyl 3-(2-(((1-(6-benzamido-9H-purin-9-yl)propan-2-yl)oxy)methyl)-2-oxo-1,3,2-dioxaphosphinan-5-yl)propanoate Ex-23, MW 531.50, foam, 230 mg, yield 52%. $^1$H NMR (DMSO-$d_6$) δ 11.08 (brs, 1H, CO—NH), 8.74 (2s, 1H, H8), 8.45/8.44 (s, 1H, H2), 8.05 (m, 2H, Haro), 7.65 (m, 1H, Haro), 7.56 (m, 2H, Haro), 4.46-3.77 (brm, 11H, N—C$\underline{H}_2$—CH/O—C$\underline{H}_2$—P/CH(CH—O)$_2$/O—C$\underline{H}_2$—CH$_3$), 2.35 (m, 3H, C$\underline{H}$—C$\underline{H}_2$—C$\underline{H}_2$—C=O), 1.66 (m, 2H, CH—C$\underline{H}_2$—CH$_2$—C=O), 1.16 (m, 6H, C$\underline{H}_3$—C(H)—O/O—CH$_2$—C$\underline{H}_3$); $^{31}$P NMR (DMSO-$d_6$) δ 13.99 (s), 13.50 (s); LCMS m/z 532.25 (M+H)$^+$.

Example 24: starting material: Ex-7 and Ac$_2$O, reaction scale: 0.93 mmol to afford (R)-ethyl 3-(2-(((1-(6-acetamido-9H-purin-9-yl)propan-2-yl)oxy)methyl)-2-oxo-1,3,2-dioxaphosphinan-5-yl)propanoate Ex-24, MW 469.43, foam, 58 mg, yield 21%. $^1$H NMR (DMSO-$d_6$) δ 10.67 (brs, 1H, CO—N$\underline{H}$), 8.64/8.63 (2s, 1H, H8), 8.42/8.41 (2s, 1H, H2), 4.43-3.76 (brm, 11H, N—C$\underline{H}_2$—CH/O—C$\underline{H}_2$—P/CH(C$\underline{H}_2$—O)$_2$/O—C$\underline{H}_2$—CH$_3$), 2.33 (m, 3H, C$\underline{H}$—C$\underline{H}_2$—C$\underline{H}_2$—C=O), 2.25 (s, 3H, O=C-C$\underline{H}_3$), 1.65 (m, 2H, CH—C$\underline{H}_2$—CH$_2$—C=O), 1.17 (m, 6H, C$\underline{H}_3$—C(H)—O/O—CH$_2$—C$\underline{H}_3$); $^{31}$P NMR (DMSO-$d_6$) δ 13.95 (s), 13.46 (s); LCMS m/z 470.1 (M+H)$^+$.

Example 25: starting material: Ex-8 and BzCl, reaction scale: 0.91 mmol to afford (R)-isopropyl 3-(2-(((1-(6-benzamido-9H-purin-9-yl)propan-2-yl)oxy)methyl)-2-oxo-1,3,2-dioxaphosphinan-5-yl)propanoate Ex-25, MW 545.52, foam, 210 mg, yield 43%. $^1$H NMR (DMSO-$d_6$) δ 11.15 (brs, 1H, N$\underline{H}$—CO), 8.74/8.73 (2s, 1H, H8), 8.44 (s, 1H, H2), 8.05 (m, 2H, Haro), 7.65 (m, 1H, Haro), 7.55 (m, 2H, Haro), 4.87 (m, 1H, O—C$\underline{H}$—(CH$_3$)$_2$), 4.47-3.79 (brm, 9H, N—C$\underline{H}_2$—CH/O—C$\underline{H}_2$—P/CH(C$\underline{H}_2$—O)$_2$), 2.36-2.27 (m, 3H, C$\underline{H}$—C$\underline{H}_2$—C$\underline{H}_2$—C=O), 1.67 (m, 2H, CH—C$\underline{H}_2$—CH$_2$—C=O), 1.16 (m, 9H, CH$_3$—C(H)—O, O—CH—(C$\underline{H}_3$)$_2$); $^{31}$P NMR (DMSO-$d_6$) δ 13.92 (s), 13.43 (s); LCMS m/z 546.1 (M+H)$^+$.

Example 26: starting material: Ex-9 and BzCl, reaction scale: 1.1 mmol to afford (R)-tert-butyl 3-(2-(((1-(6-benzamido-9H-purin-9-yl)propan-2-yl)oxy)methyl)-2-oxo-1,3,2-dioxaphosphinan-5-yl)propanoate Ex-26, MW 559.55, foam, 520 mg, yield 84%. $^1$H NMR (DMSO-$d_6$) δ 11.15 (brs, 1H, NH—CO), 8.74/8.73 (2s, 1H, H8), 8.44 (s, 1H, H2), 8.06 (m, 2H, Haro), 7.65 (m, 1H, Haro), 7.55 (t, J=7.8 Hz, 2H, Haro), 4.48-3.78 (brm, 9H, N—C$\underline{H}_2$—CH/O—C$\underline{H}_2$—P/CH(C$\underline{H}_2$—O)$_2$), 2.28 (m, 3H, C$\underline{H}$—C$\underline{H}_2$—C$\underline{H}_2$—C=O), 1.66 (m, 2H, CH—C$\underline{H}_2$—CH$_2$—C=O), 1.38/1.37 (2s, 9H, O—C(CH$_3$)$_3$), 1.18 (d, J=6.0 Hz, 3H, C$\underline{H}_3$—C(H)—O); $^{31}$P NMR (DMSO-$d_6$) δ 13.88 (s), 13.41 (s).

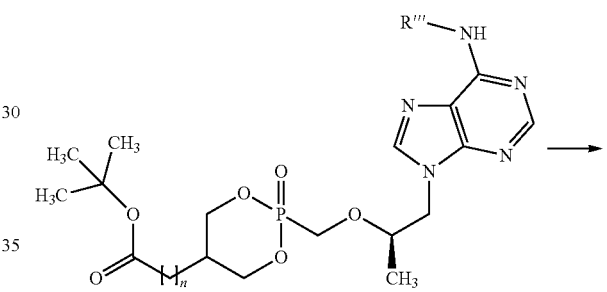

n = 1, R''' = H, Example 4
n = 1, R''' = CO—Ph, Example 22
n = 2, R''' = H, Example 9

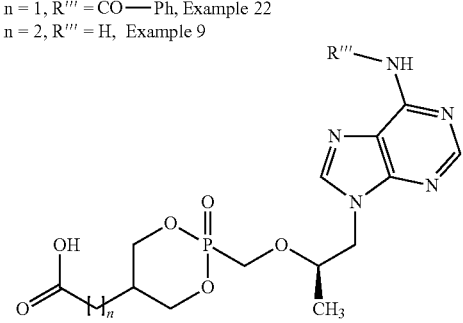

Ex-27, n = 1, R''' = H, Example 27
Ex-28, n = 1, R''' = CO—Ph, Example 28
Ex-29, n = 2, R''' = H, Example 29

Synthesis of Example 27 to 29. General procedure: starting material (Ex-4, Ex-22 or Ex-9) (1 eq.) was dissolved in DCM (3 mL/mmol). Trifluoroacetic acid (TFA, 10 eq.) was added and the reaction was stirred at RT overnight. The crude was purified over silica gel column chromatography (DCM/MeOH 0 to 25%) to afford the corresponding acid.

Example 27: starting material Ex-4: reaction scale: 0.95 mmol to afford (R)-2-(2-(((1-(6-amino-9H-purin-9-yl)propan-2-yl)oxy)methyl)-2-oxo-1,3,2-dioxaphosphinan-5-yl) acetic acid Ex-27, MW 385.31, foam, 305 mg, yield 82%. $^1$H NMR (DMSO-$d_6$) δ 12.45 (brs, 1H, CO$_2$H), 8.14 (s, 1H, H8), 8.10/8.09 (2s, 1H, H2), 7.21 (brs, 2H, N$\underline{H}_2$), 4.53-3.85

(brm, 9H, N—CH₂—CH/O—CH₂—P/CH(CH₂—O)₂), 2.50-2.18 (m, 3H, CH—CH₂—C=O), 1.13 (2d, J=6.2 Hz, 3H, CH₃—C(H)—O); ³¹P NMR (DMSO-d₆) δ 13.71 (s), 13.56 (s); LCMS m/z 386.1 (M+H)⁺.

Example 28: starting material Ex-22: reaction scale: 0.92 mmol to afford (R)-2-(2-(((1-(6-benzamido-9H-purin-9-yl)propan-2-yl)oxy)methyl)-2-oxo-1,3,2-dioxaphosphinan-5-yl)acetic acid Ex-28, MW 489.42, foam, 170 mg, yield 38%. ¹H NMR (DMSO-d₆) δ 12.41 (brs, 1H, CO₂H), 11.16 (s, 1H, NH—CO), 8.74 (s, 1H, H8), 8.45/8.44 (2s, 1H, H2), 8.05 (m, 2H, Haro), 7.65 (m, 1H, Haro), 7.55 (m, 2H, Haro), 4.50-3.88 (brm, 9H, N—CH₂—CH/O—CH₂—P/CH(CH₂—O)₂), 2.32-2.17 (m, 3H, CH—CH₂—CH₂—C=O), 1.16 (m, 3H, CH₃—C(H)—O); ³¹P NMR (DMSO-d₆) δ 13.81 (s), 13.58 (s). LCMS m/z 490.2 (M+H)⁺.

Example 29: starting material Ex-9: reaction scale: 0.88 mmol to afford (R)-3-(2-(((1-(6-amino-9H-purin-9-yl)propan-2-yl)oxy)methyl)-2-oxo-1,3,2-dioxaphosphinan-5-yl)propanoic acid Ex-29, MW 399.34, foam, 179 mg, yield 51%. ¹H NMR (DMSO-d₆) δ 12.21 (brs, 1H, CO₂H), 8.13 (s, 1H, H8), 8.10/8.09 (2s, 1H, H2), 7.23 (s, 2H, NH₂), 4.50-3.79 (brm, 9H, N—CH₂—CH/O—CH₂—P/CH(CH₂—O)₂), 2.35-2.10 (m, 3H, CH—CH₂—CH₂—C=O), 1.68 (m, 2H, CH—CH₂—CH₂—C=O), 1.13/1.12 (2d, J=6.2 Hz, 3H, CH₃—C(H)—O); ³¹P NMR (DMSO-d₆) δ 13.84 (s), 13.37 (s). LCMS m/z 400.2 (M+H)⁺.

LISTING OF EXAMPLES

Example 1

Example 2

Example 3

Example 3a

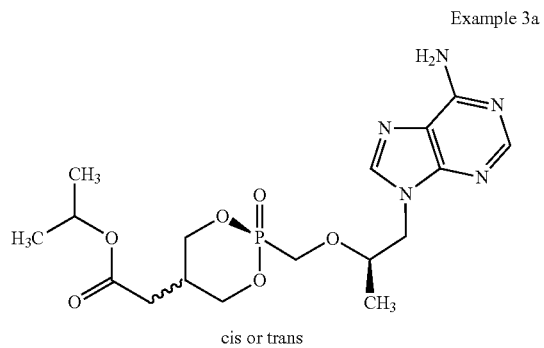

cis or trans

Example 3b

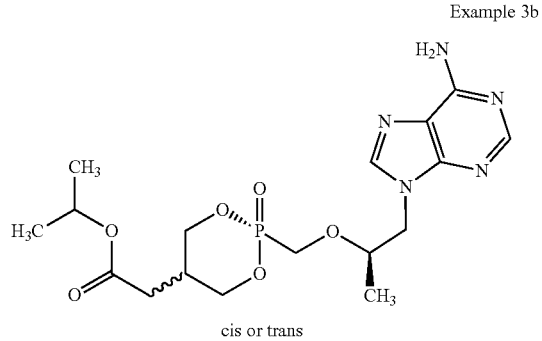

cis or trans

Example 4

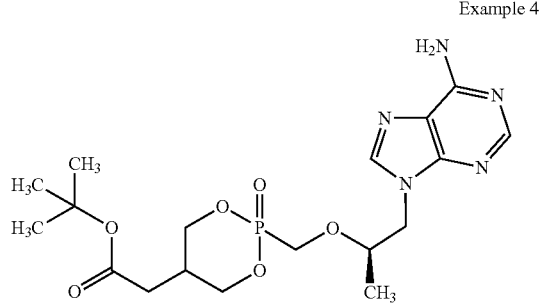

Example 5

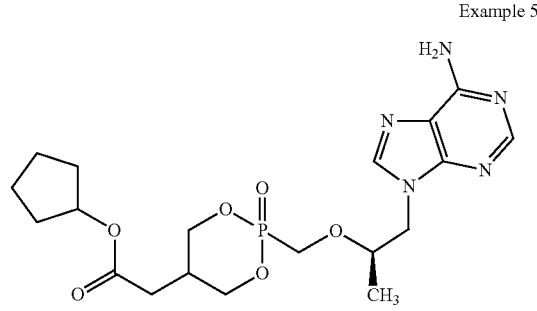

Example 5a

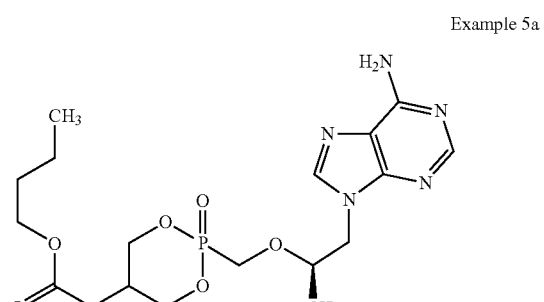

Example 5b
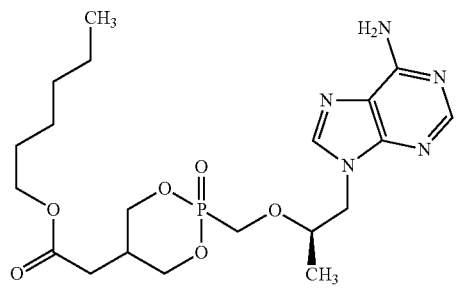
Example 5c
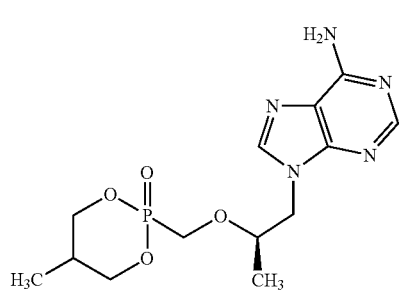
Example 5d
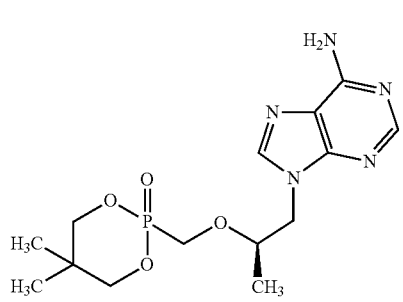
Example 6
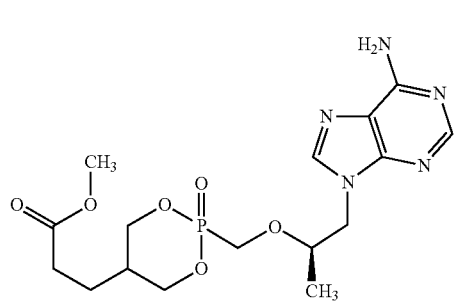
Example 7
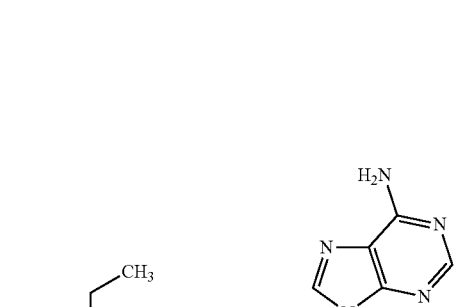
Example 7a
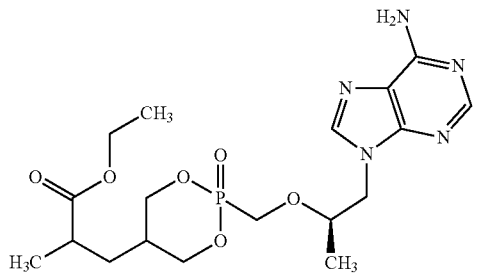
Example 8
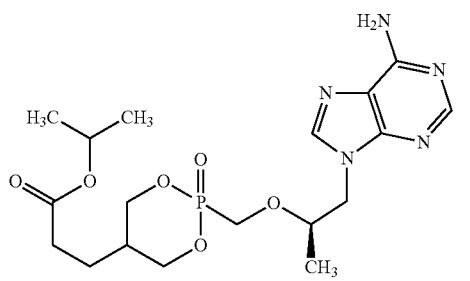
Example 9
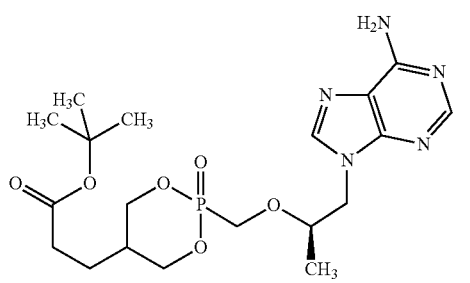
Example 10
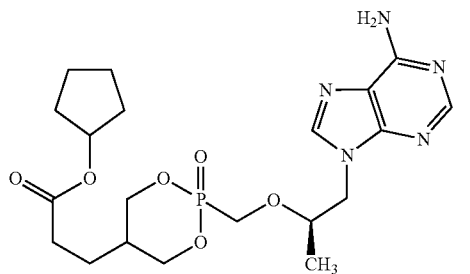
Example 11
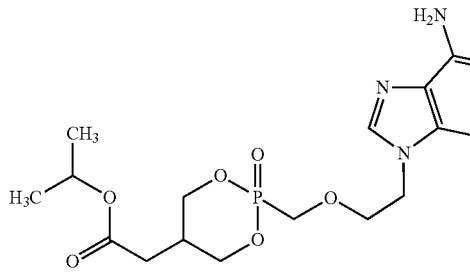

Example 12
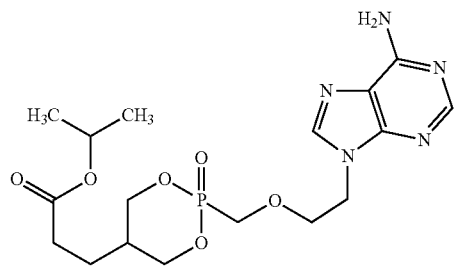
Example 13
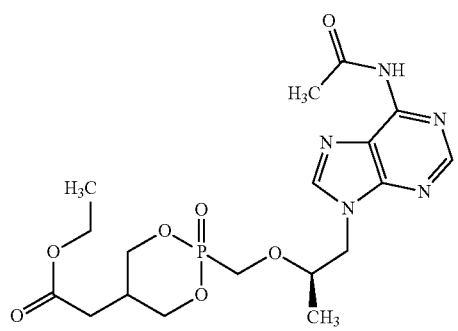
Example 14
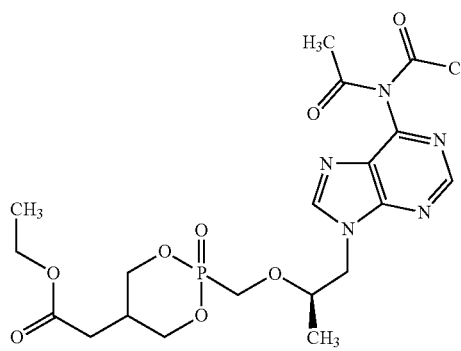
Example 15
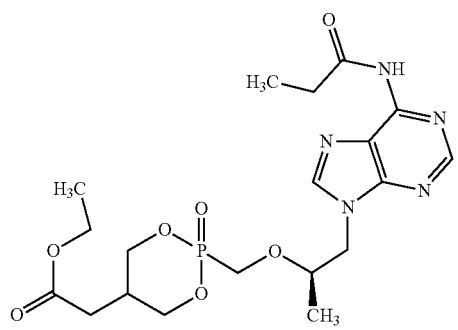
Example 16
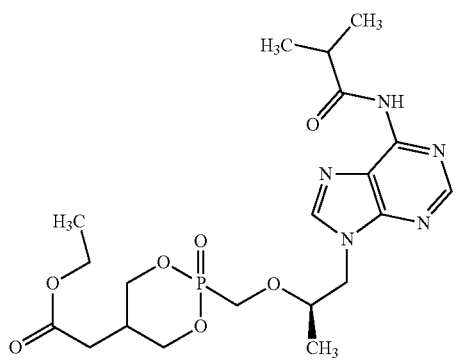
Example 17
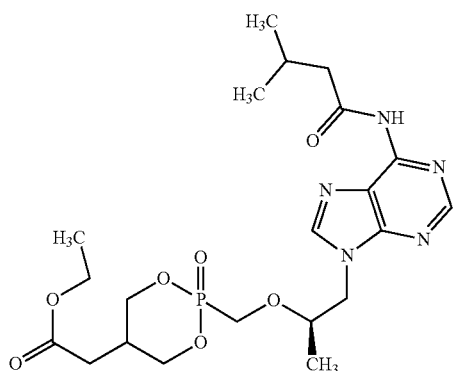
Example 18
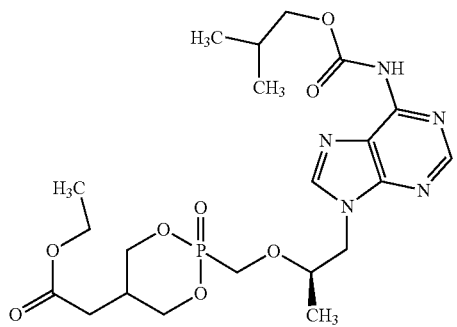
Example 19
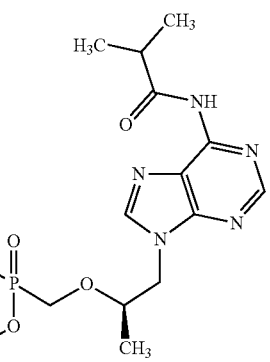

Example 20
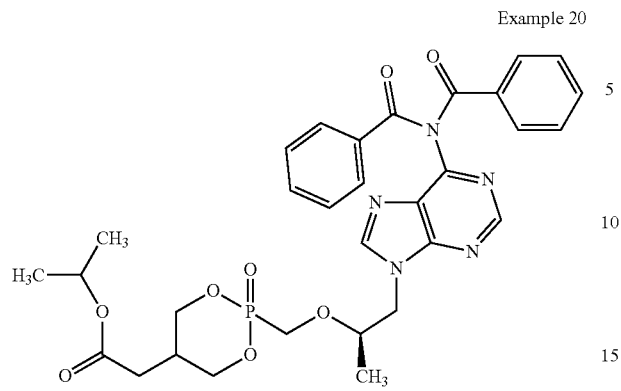
Example 21
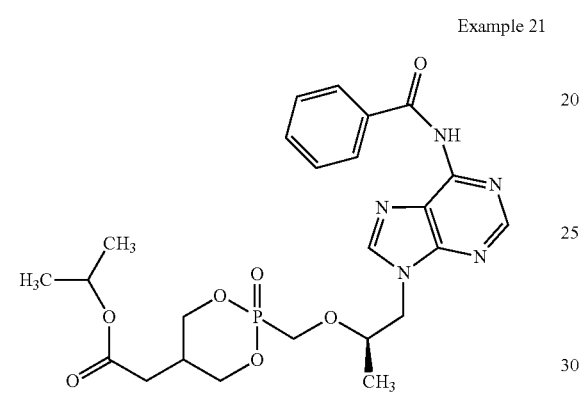
Example 21a
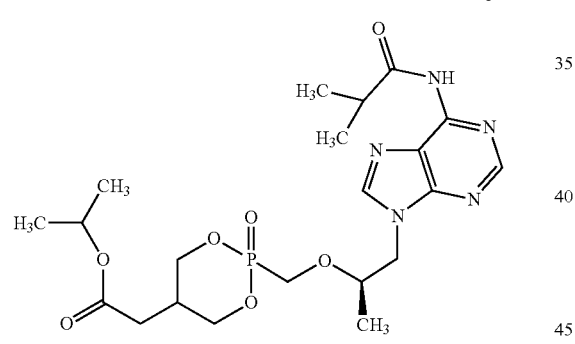
Example 22
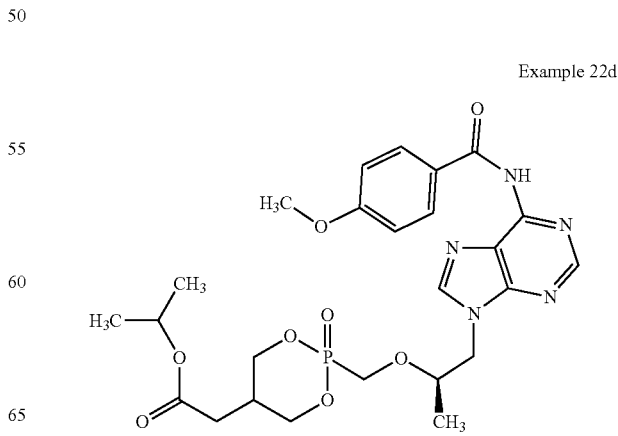
Example 22a
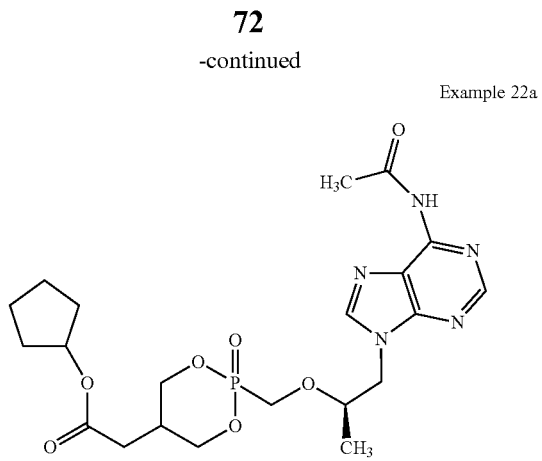
Example 22b
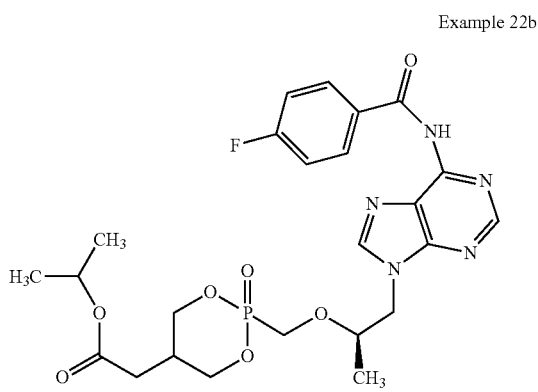
Example 22c
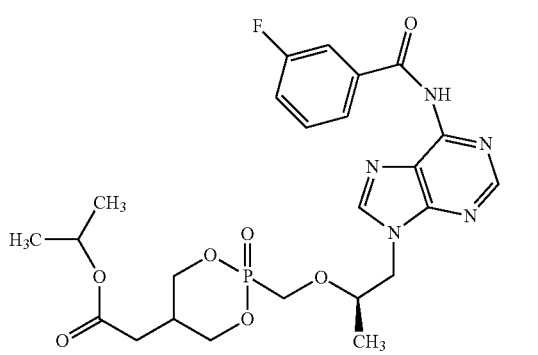
Example 22d
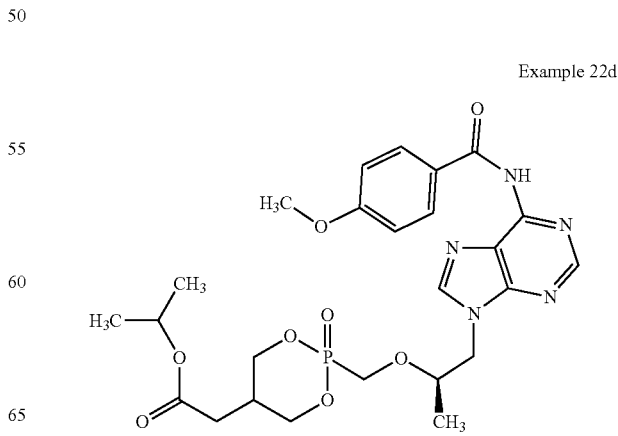

-continued
Example 23
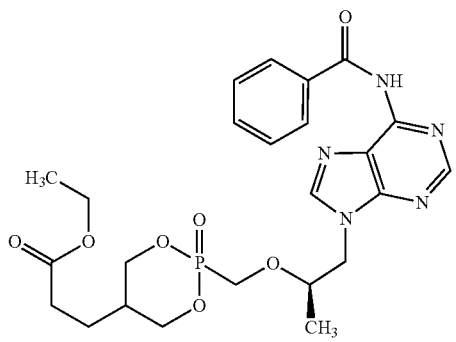
Example 24
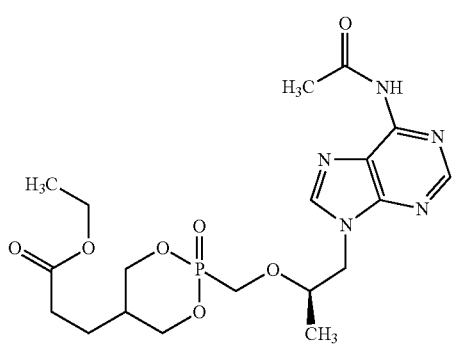
Example 25
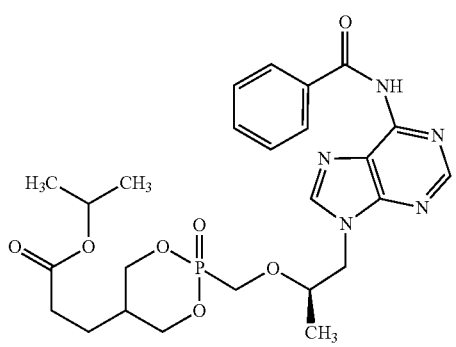
Example 26
-continued
Example 27
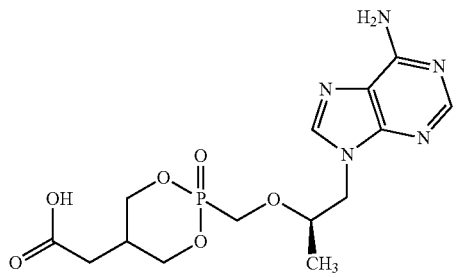
Example 28
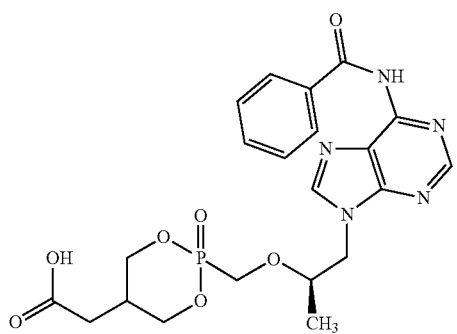
Example 29
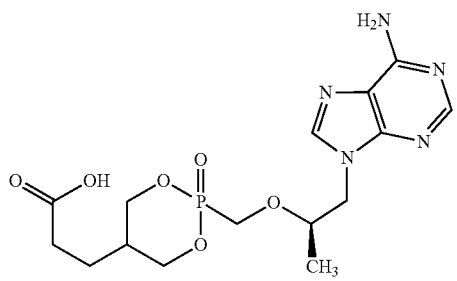
Additional Examples
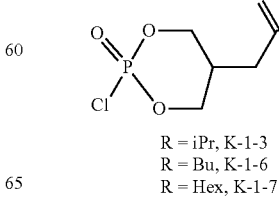
R = iPr, A-4-3
R = Bu, A-4-6
R = Hex, A-4-7
R = iPr, K-1-3
R = Bu, K-1-6
R = Hex, K-1-7

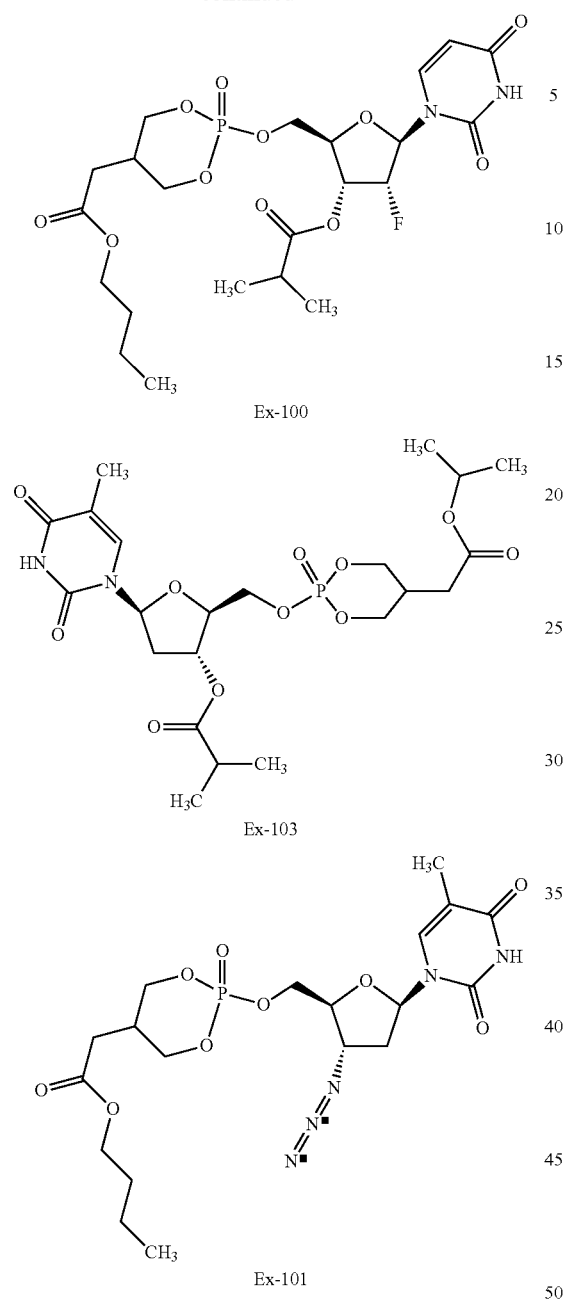
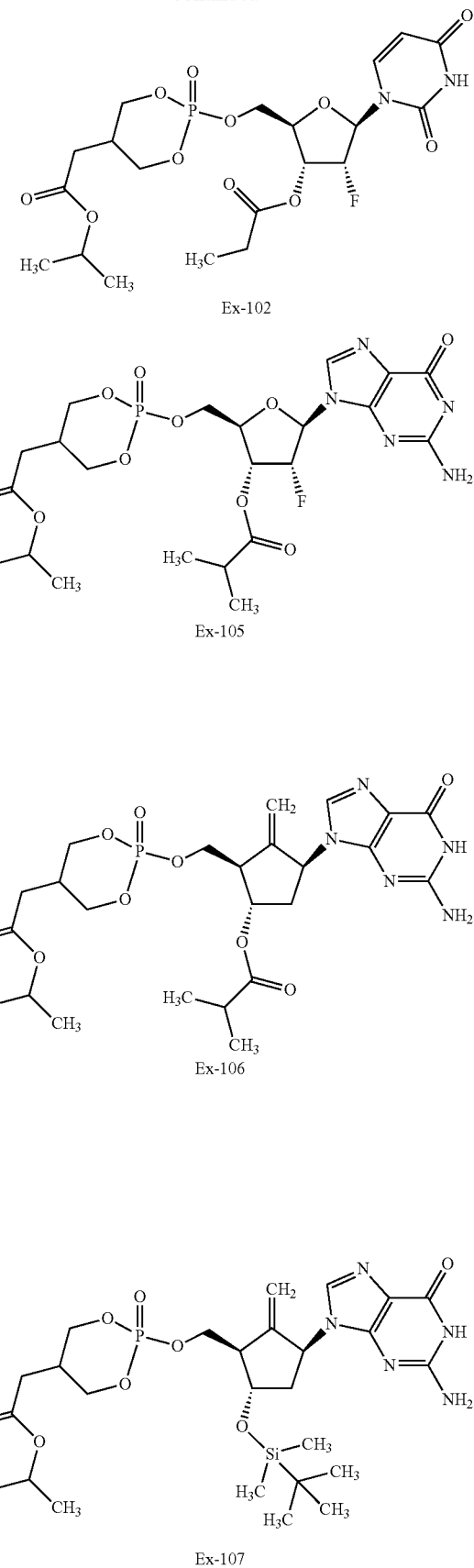

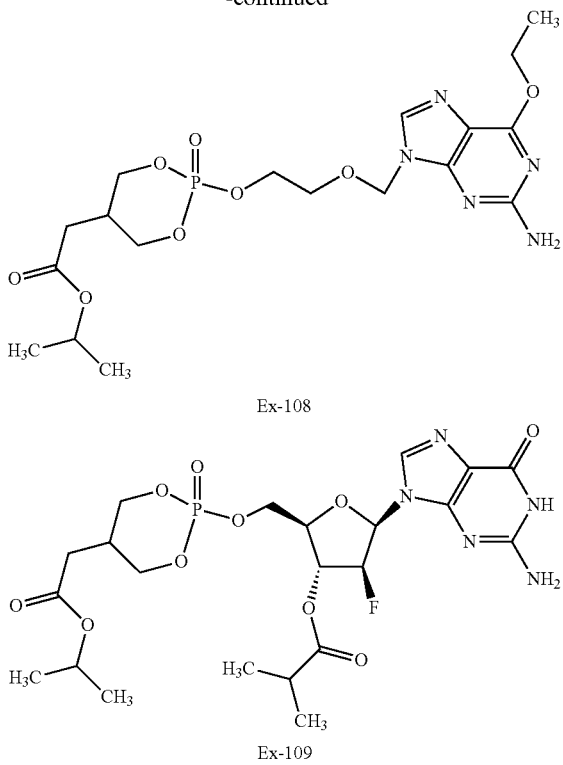

Ex-108

Ex-109

Preparation of intermediates K-1-3, 6, 7. General procedure: POCl$_3$ (1.2 eq.) was dissolved in DCM (0.5 ml/mmol), followed by addition of NEt$_3$ (2.4 eq.). Intermediate A-4-i (i=3, 6, 7) (reaction scale, 1 eq.) was added dropwise to the reaction mixture at 0° C. The reaction was stirred for 30 min. After filtration and concentration, the residue was purified by flash chromatography (Hexane/EtOAc 10 to 50%) to afford K-1-i (i=3, 6, 7).

K-1-3: starting material: A-4-3, reaction scale: 5.7 mmol to afford isopropyl 2-(2-chloro-2-oxido-1,3,2-dioxaphosphinan-5-yl)acetate K-1-3, MW 256.62, oil, 1050 mg, yield 72%. $^1$H NMR (CDCl$_3$) δ 5.10-4.95 (m, 1H), 4.70 (d, J=11.9 Hz, 1H), 4.61-4.38 (m, 2H), 4.35-4.22 (m, 1H), 2.93-2.80 (m, 0.5H), 2.76 (d, J=7.4 Hz, 1H), 2.49-2.41 (m, 0.5H), 2.27 (d, J=6.8 Hz, 1H), 1.26 (dd, J=6.3, 3.2 Hz, 6H). $^{31}$P NMR (CDCl$_3$) δ −2.38 (s), −2.54 (s).

K-1-6: starting material: A-4-6, reaction scale: 3.15 mmol to afford butyl 2-(2-chloro-2-oxido-1,3,2-dioxaphosphinan-5-yl)acetate K-1-6, MW 270.65, oil, 480 mg, yield 56%. $^1$H NMR (CDCl$_3$) δ 4.77-4.62 (m, 1H), 4.60-4.37 (m, 2H), 4.31-4.20 (m, 1H), 4.12 (dd, J=12.1, 6.7 Hz, 2H), 2.95-2.84 (m, 0.5H), 2.80 (d, J=7.3 Hz, 1H), 2.50-2.39 (m, 0.5H), 2.27 (d, J=6.8 Hz, 1H), 1.70-1.55 (m, 2H), 1.46-1.30 (m, 2H), 0.94 (td, J=7.4, 1.4 Hz, 3H). $^{31}$P NMR (CDCl$_3$) δ −2.43 (s), −2.57 (s).

K-1-7: starting material: A-4-7, reaction scale: 2.74 mmol to afford hexyl 2-(2-chloro-2-oxido-1,3,2-dioxaphosphinan-5-yl)acetate K-1-7, MW 298.70, oil, 300 mg, yield 37%. $^{31}$P NMR (CDCl$_3$) δ −2.36 (s), −2.51 (s).

Syntheses of Examples Ex-100 to 109. General procedure: To a solution of the appropriate nucleoside analog (reaction scale, 1 eq.) in THF/DMF (1/1: v/v, 0.6 mL/mmol) was added tBuMgCl 1M THF solution (2.5 eq.) at 0° C. After stirring for 30 min, intermediate K-1-i (i=3, 6, 7; 1.5 eq.) was added. The reaction mixture was stirred at room temperature overnight, then was diluted with EtOAc, washed with a saturated NaHCO$_3$ aq. solution (10 mL), aq. HCl 1N (10 mL), and brine (10 mL). The organic layer was dried over Na$_2$SO$_4$, filtered, concentrated under reduced pressure and purified by column chromatography (Hexane/EtOAc, 0 to 100%) to afford the phosphorylated nucleoside analogs Example 100 to 109.

Example 100: starting nucleoside analog: (2R,3R,4R,5R)-5-(2,4-dioxo-3,4-dihydropyrimidin-1(2H)-yl)-4-fluoro-2-(hydroxymethyl)tetrahydrofuran-3-yl isobutyrate (150 mg, 0.47 mmol, MW 316.29) and K-1-6 (0.71 mmol) to afford (2R,3R,4R,5R)-2-(((5-(2-butoxy-2-oxoethyl)-2-oxido-1,3,2-dioxaphosphinan-2-yl)oxy)methyl)-5-(2,4-dioxo-3,4-dihydropyrimidin-1(2H)-yl)-4-fluorotetrahydrofuran-3-yl isobutyrate Ex-100, MW 550.47, foam, 40 mg, yield 15%. $^1$H NMR (DMSO) δ 11.54 (s, 1H), 7.77 (d, J=8.1 Hz, 1H), 5.87 (dd, J=23.4, 2.0 Hz, 1H), 5.71-5.66 (m, 1H), 5.67-5.49 (m, J=52.8 Hz, 1H), 5.40-5.29 (m, 1H), 4.56-4.00 (m, 9H), 2.71-2.60 (m, 2.5H), 2.31-2.24 (m, 1.5H), 1.62-1.50 (m, 2H), 1.40-1.26 (m, 2H), 1.13 (d, J=7.0 Hz, 6H), 0.94-0.84 (m, 3H). $^{31}$P NMR (DMSO) δ −7.84 (s), −8.11 (s). LCMS m/z 551.2 (M+H)$^+$.

Example 101: starting nucleoside analog: AZT (150 mg, 0.56 mmol) and K-1-6 (0.84 mmol) to afford butyl 2-(2-(((2S,3S,5R)-3-azido-5-(5-methyl-2,4-dioxo-3,4-dihydropyrimidin-1(2H)-yl)tetrahydrofuran-2-yl)methoxy)-2-oxido-1,3,2-dioxaphosphinan-5-yl)acetate Ex-101, MW 501.43, foam, 50 mg, yield 10%. $^1$H NMR (DMSO) δ 11.40 (s, 1H), 7.51 (d, J=1.1 Hz, 1H), 6.15 (t, J=6.6 Hz, 1H), 4.61-4.54 (m, 1H), 4.53-4.46 (m, 1H), 4.41-3.97 (m, 8H), 2.65 (d, J=7.4 Hz, 1.5H), 2.47-2.40 (m, 1H), 2.39-2.33 (m, 1H), 2.33-2.25 (m, 1.5H), 1.79 (d, J=0.9 Hz, 3H), 1.63-1.51 (m, 2H), 1.39-1.28 (m, 2H), 0.93-0.85 (m, 3H). $^{31}$P NMR (DMSO) δ −7.69 (s), −7.94 (s). LCMS m/z 500.2 (M−H)$^-$.

Example 102: starting nucleoside analog: (2R,3R,4R,5R)-5-(2,4-dioxo-3,4-dihydropyrimidin-1(2H)-yl)-4-fluoro-2-(hydroxymethyl)tetrahydrofuran-3-yl propionate (150 mg, MW 302.26) and K-1-3 (1.5 eq.) to afford (2R,3R,4R,5R)-5-(2,4-dioxo-3,4-dihydropyrimidin-1(2H)-yl)-4-fluoro-2-(((5-(2-isopropoxy-2-oxoethyl)-2-oxido-1,3,2-dioxaphosphinan-2-yl)oxy)methyl)tetrahydrofuran-3-yl propionate Ex-102, MW 522.42, foam, 80 mg, yield 31%. $^1$H NMR (DMSO) δ 11.54 (s, 1H), 7.77 (d, J=8.1 Hz, 1H), 5.87 (d, J=23.4 Hz, 1H), 5.72-5.66 (m, 1H), 5.66-5.49 (m, J=52.8 Hz, 1H), 5.43-5.30 (m, 1H), 4.99-4.87 (m, 1H), 4.57-4.00 (m, 7H), 2.60 (d, J=7.4 Hz, 1.5H), 2.47-2.38 (m, 2H), 2.30-2.19 (m, 1.5H), 1.23-1.16 (m, 6H), 1.06 (t, J=7.5 Hz, 3H). $^{31}$P NMR (DMSO) δ −7.86 (s), −8.13 (s). LCMS m/z 523.1 (M+H)$^+$.

Example 103: starting nucleoside analog: (2S,3R,5S)-2-(hydroxymethyl)-5-(5-methyl-2,4-dioxo-3,4-dihydropyrimidin-1(2H)-yl)tetrahydrofuran-3-yl isobutyrate, (150 mg, MW 312.32) and K-1-3 (1.5 eq.) to afford (2S,3R,5S)-2-(((5-(2-isopropoxy-2-oxoethyl)-2-oxido-1,3,2-dioxaphosphinan-2-yl)oxy)methyl)-5-(5-methyl-2,4-dioxo-3,4-dihydropyrimidin-1(2H)-yl)tetrahydrofuran-3-yl isobutyrate Ex-103, MW 532.48, foam, 170 mg, yield 77%. $^1$H NMR (DMSO) δ 11.42 (s, 1H), 7.56 (d, J=1.2 Hz, 1H), 6.20 (dd, J=8.5, 6.1 Hz, 1H), 5.31-5.21 (m, 1H), 4.98-4.86 (m, 1H), 4.54-4.09 (m, 7H), 2.64-2.56 (m, J=13.9, 5.1 Hz, 2.5H), 2.45-2.35 (m, 1H), 2.33-2.23 (m, 2.5H), 1.78 (d, J=1.2 Hz, 3H), 1.21-1.19 (m, 6H), 1.12 (d, J=7.0 Hz, 6H). $^{31}$P NMR (DMSO) δ −7.71 (s), −7.95 (s). LCMS m/z 533.2 (M+H)$^+$.

Example 104: starting nucleoside analog: (2R,3R,4R,5R)-5-(2-amino-6-oxo-1H-purin-9(6H)-yl)-4-fluoro-2-(hydroxymethyl)tetrahydrofuran-3-yl isobutyrate, (150 mg, MW 355.32) and K-1-3 (1.5 eq.) to afford (2R,3R,4R,5R)-

5-(2-amino-6-oxo-1H-purin-9(6H)-yl)-4-fluoro-2-(((5-(2-isopropoxy-2-oxoethyl)-2-oxido-1,3,2-dioxaphosphinan-2-yl)oxy)methyl)tetrahydrofuran-3-yl isobutyrate Ex-104, MW 575.48, foam, 50 mg, yield 20%. $^1$H NMR (DMSO) δ 10.80 (s, 1H), 7.91 (s, 1H), 6.56 (s, 2H), 6.15 (dd, J=19.0, 3.0 Hz, 1H), 5.74 (m, J=51.4 Hz, 1H), 5.65-5.55 (m, 1H), 4.97-4.86 (m, 1H), 4.48-4.11 (m, 7H), 2.72-2.64 (m, 1H), 2.57 (d, J=7.4 Hz, 1.5H), 2.23-2.16 (m, 1.5H), 1.19 (d, J=6.3 Hz, 6H), 1.15 (d, J=7.0 Hz, 6H). $^{31}$P NMR (DMSO) δ −7.79 (s), −8.04 (s). LCMS m/z 576.2 (M+H)$^+$.

Example 105: starting nucleoside analog: (2R,3R,4R,5R)-5-(2-amino-6-ethoxy-9H-purin-9-yl)-4-fluoro-2-(hydroxymethyl)-4-methyltetrahydrofuran-3-yl isobutyrate, (150 mg, MW 397.40) and K-1-3 (1.5 eq.) to afford (2R, 3R,4R,5R)-5-(2-amino-6-ethoxy-9H-purin-9-yl)-4-fluoro-2-(((5-(2-isopropoxy-2-oxoethyl)-2-oxido-1,3,2-dioxaphosphinan-2-yl)oxy)methyl)-4-methyltetrahydrofuran-3-yl isobutyrate Ex-105, MW 617.56, foam, 110 mg, yield 47%. $^1$H NMR (DMSO) δ 8.08 (s, 1H), 6.61 (s, 2H), 6.23 (d, J=19.2 Hz, 1H), 5.95-5.83 (m, 1H), 4.98-4.87 (m, 1H), 4.50-4.08 (m, 9H), 2.73-2.64 (m, 1H), 2.58 (d, J=7.4 Hz, 1.5H), 2.30-2.21 (m, 1.5H), 1.36 (t, J=7.1 Hz, 3H), 1.21-1.15 (m, 15H). $^{31}$P NMR (DMSO) δ −7.78 (s), −8.02 (s). LCMS m/z 618.3 (M+H)$^+$.

Example 106: starting nucleoside analog: (1S,2R,4S)-4-(2-amino-6-oxo-1H-purin-9(6H)-yl)-2-(hydroxymethyl)-3-methylenecyclopentyl isobutyrate, (150 mg, MW 347.37) and K-1-3 (1.5 eq.) to afford (1S,2R,4S)-4-(2-amino-6-oxo-1H-purin-9(6H)-yl)-2-(((5-(2-isopropoxy-2-oxoethyl)-2-oxido-1,3,2-dioxaphosphinan-2-yl)oxy)methyl)-3-methylenecyclopentyl isobutyrate Ex-106, MW 567.53, foam, 143 mg, yield 58%. $^1$H NMR (DMSO) δ 10.64 (s, 1H), 7.76 (s, 1H), 6.43 (s, 2H), 5.45-5.22 (m, 3H), 4.92 (m, 1H), 4.70 (s, 1H), 4.54-4.08 (m, 7H), 3.02-2.94 (m, 1H), 2.70-2.59 (m, 2.5H), 2.36-2.21 (m, 2.5H), 1.21 (d, J=6.3 Hz, 6H), 1.11 (d, J=7.0 Hz, 6H). $^{31}$P NMR (DMSO) δ −7.74 (s), −7.97 (s). LCMS m/z 568.2 (M+H)$^+$.

Example 107: starting nucleoside analog: 2-amino-9-((1S,3R,4S)-4-((tert-butyldimethylsilyl)oxy)-3-(hydroxymethyl)-2-methylenecyclopentyl)-1H-purin-6(9H)-one (150 mg, MW 391.54) and K-1-3 (1.5 eq.) to afford isopropyl 2-(2-(((1R,3S,5S)-3-(2-amino-6-oxo-1H-purin-9(6H)-yl)-5-((tert-butyldimethylsilyl)oxy)-2-methylenecyclopentyl)methoxy)-2-oxido-1,3,2-dioxaphosphinan-5-yl)acetate Ex-107, MW 611.70, foam, 130 mg, yield 56%. $^1$H NMR (DMSO) δ 10.50 (s, 1H), 7.66 (s, 1H), 6.30 (s, 2H), 5.25 (dd, J=10.2, 8.0 Hz, 1H), 5.12 (s, 1H), 4.89-4.76 (m, 1H), 4.57-4.49 (m, 1H), 4.42-3.89 (m, 8H), 2.75-2.68 (m, 1H), 2.50 (d, J=7.4 Hz, 1.5H), 2.29-2.17 (m, 1.5H), 2.04-1.94 (m, 1H), 1.10 (d, J=6.3 Hz, 6H), 0.78 (s, 9H), −0.00 (s, 6H). $^{31}$P NMR (DMSO) δ −7.64 (s), −7.92 (s). LCMS m/z 612.3 (M+H)$^+$.

Example 108: starting nucleoside analog: 2-((2-amino-6-ethoxy-9H-purin-9-yl)methoxy)ethanol (100 mg, MW 253.26) and K-1-3 (1.5 eq.) to afford isopropyl 2-(2-(2-((2-amino-6-ethoxy-9H-purin-9-yl)methoxy)ethoxy)-2-oxido-1,3,2-dioxaphosphinan-5-yl)acetate Ex-108, MW 473.42, foam, 51 mg, yield 27%. $^1$H NMR (DMSO) δ 8.01 (s, 1H), 6.46 (s, 2H), 5.46 (s, 2H), 4.99-4.86 (m, 1H), 4.46 (q, J=7.1 Hz, 2H), 4.36-4.21 (m, 2H), 4.19-3.91 (m, 4H), 3.73-3.68 (m, 2H), 2.57 (d, J=7.4 Hz, 1.5H), 2.24-2.16 (m, 1.5H), 1.36 (t, J=7.1 Hz, 3H), 1.23-1.17 (m, 6H). $^{31}$P NMR (DMSO) δ −7.80 (s), −8.10 (s). LCMS m/z 474.2 (M+H)$^+$.

Example 109: starting nucleoside analog: (2R,3R,4S,5R)-5-(2-amino-6-oxo-1H-purin-9(6H)-yl)-4-fluoro-2-(hydroxymethyl)tetrahydrofuran-3-yl isobutyrate (150 mg, MW 355.32) and K-1-3 (1.5 eq.) to afford (2R,3R,4S,5R)-5-(2-amino-6-oxo-1H-purin-9(6H)-yl)-4-fluoro-2-(((5-(2-isopropoxy-2-oxoethyl)-2-oxido-1,3,2-dioxaphosphinan-2-yl)oxy)methyl)tetrahydrofuran-3-yl isobutyrate Ex-109, MW 575.48, solid, 97 mg, yield 40%. $^1$H NMR (DMSO) δ 10.74 (s, 1H), 7.77 (d, J=3.0 Hz, 1H), 6.59 (s, 2H), 6.19 (dd, J=19.8, 3.7 Hz, 1H), 5.57-5.36 (m, 2H), 5.00-4.85 (m, 1H), 4.62-4.07 (m, 7H), 2.71-2.63 (m, 1H), 2.62-2.57 (m, 1.5H), 2.34-2.22 (m, 1.5H), 1.22-1.18 (m, 6H), 1.17-1.12 (m, 6H). $^{31}$P NMR (DMSO) δ −7.78 (s), −8.04 (s). LCMS m/z 576.2 (M+H)$^+$.

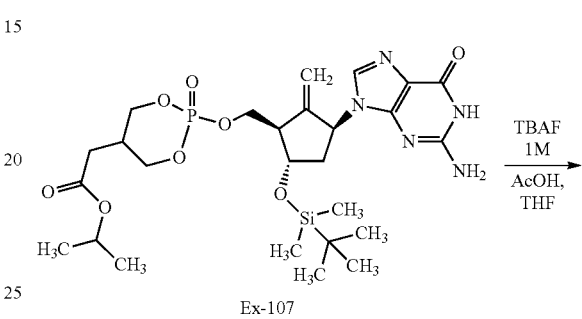

Ex-107

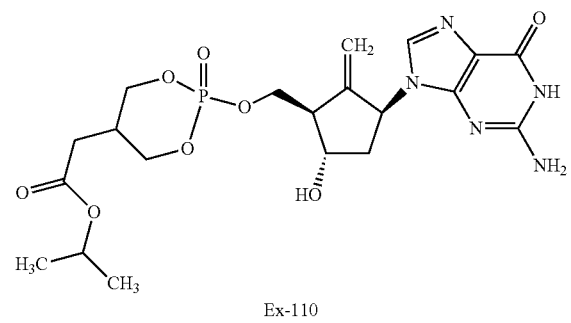

Ex-110

Example 110: starting nucleoside analog: Example 107 (120 mg, MW 611.70) in THF (1 ml) was treated with TBAF/THF 1M (1.6 eq.) and acetic acid (2.4 eq.) at RT. Purification on silica gel column afforded isopropyl 2-(2-(((1R,3S,5S)-3-(2-amino-6-oxo-1H-purin-9(6H)-yl)-5-hydroxy-2-methylenecyclopentyl)methoxy)-2-oxido-1,3,2-dioxaphosphinan-5-yl)acetate Ex-110, MW 497.44, foam, 50 mg, yield 50%. $^1$H NMR (DMSO) δ 10.61 (s, 1H), 7.72 (s, 1H), 6.43 (s, 2H), 5.39 (dd, J=10.1, 7.6 Hz, 1H), 5.21 (s, 1H), 5.16 (d, J=3.1 Hz, 1H), 4.98-4.86 (m, 1H), 4.64 (s, 1H), 4.41-4.06 (m, 8H), 2.84-2.75 (m, 1H), 2.61 (d, J=7.4 Hz, 1.5H), 2.41-2.26 (m, 1.5H), 2.14-2.07 (m, J=9.5 Hz, 1H), 1.21 (d, J=6.3 Hz, 6H). $^{31}$P NMR (DMSO) δ −7.64 (s), −7.89 (s). LCMS m/z 498.2 (M+H)$^+$.

Example 100
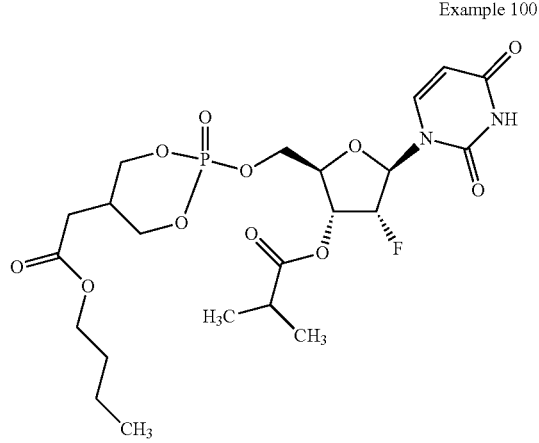
Example 104
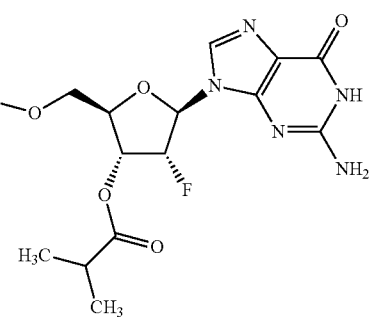
Example 101
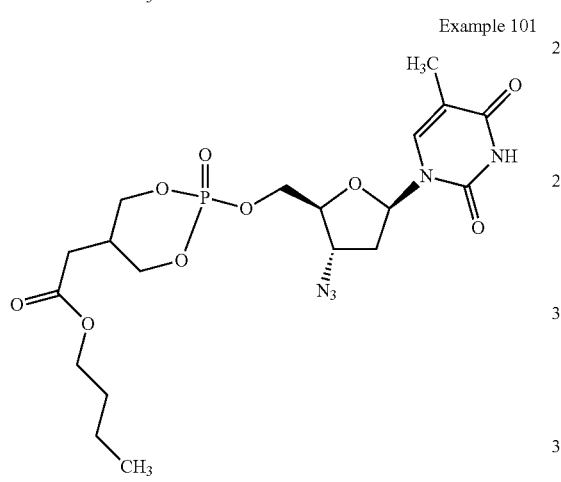
Example 105
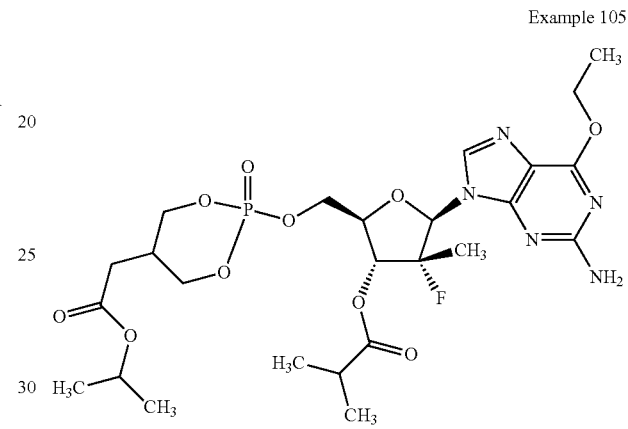
Example 102
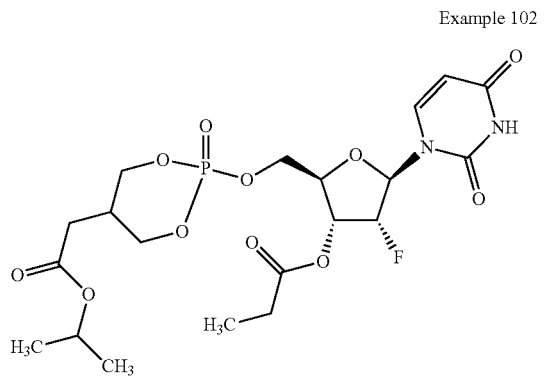
Example 106
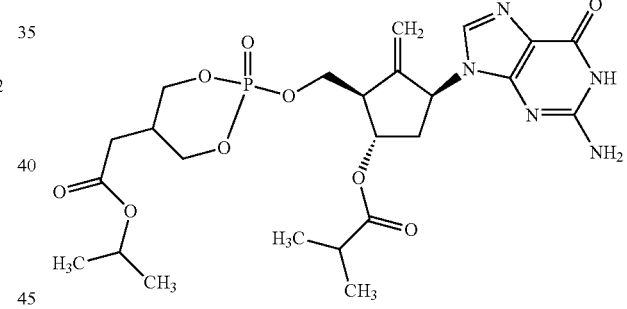
Example 103
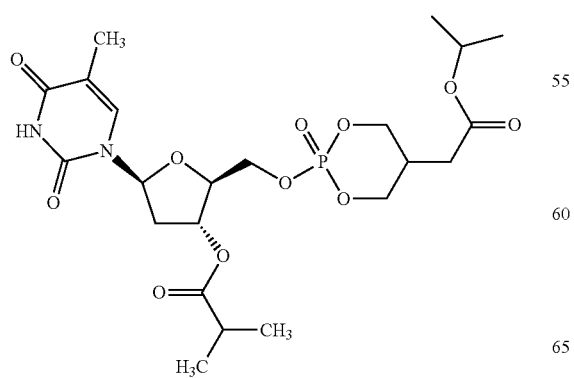
Example 107

-continued

Example 108

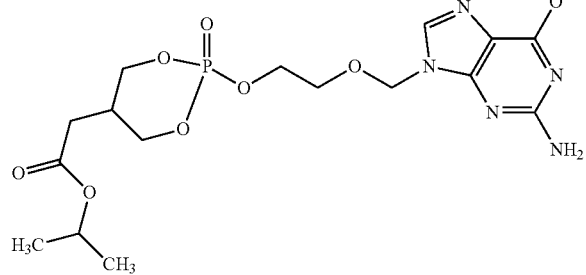

Example 109

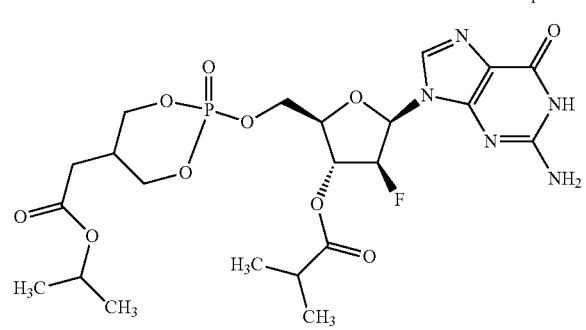

Example 110

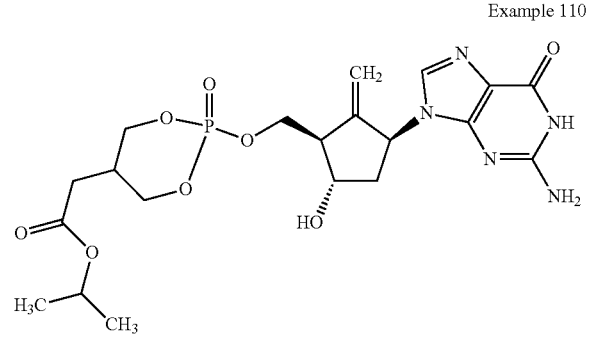

Abbreviations

The following abbreviations are used herein:
Ac acetyl
Ac$_2$O Acetic Anhydride
aq. aqueous
Bu butyl
BzCl benzoyl chloride
cPent cyclopentyl
DCC 1,3-dicyclohexylcarbodiimide
DCM dichloromethane
DMAP 4-dimethylaminopyridine
DMF N,N-dimethylformamide
DMSO dimethyl sulfoxide
Et ethyl
EtOH ethanol
EtOAc ethyl acetate
ESI electrospray ionization
Hex hexyl
HCl hydrochloric acid
iBu isobutyl
iPr isopropyl
iPrOH isopropanol
LC/MS liquid chromatography mass spectrometry
mg milligrams
min minute
µL microliters
mL milliliters
mmol millimoles
Me methyl
MeOH methanol
NMR nuclear magnetic resonance spectroscopy
PE petroleum ether
Ph phenyl
RT room temperature (25° C., ambient)
tBu tert-butyl
TBDMS tert-butyldimethylsilyl
TBDPS tert-butyldiphenylsilyl
TFA trifluoroacetic acid
THF tetrahydrofuran
TFV Tenofovir
TLC thin layer chromatography 2. Biology Tests Methods From Methods in Lucifora J. et al. (Direct antiviral properties of TLR ligands against HBV replication in immune-competent hepatocytes, *Science Scientific Reports*, 2018, 8:5390):

1) HepaRG cells were cultured, as described previously by Gripon P. et al. (Infection of a human hepatoma cell line by hepatitis B virus. *Proc Natl Acad Sci USA*, 2002, 99, p 15655-15660) on pages 15655 and 15656, in Williams E medium supplemented with 10% fetal calf serum, 50 U penicillin/streptomycin (Gibco-Invitrogen) ml$^{-1}$, 5 µg bovine insulin ml$^{-1}$ and 5×10$^{-7}$ M hydrocortisone hemisuccinate (Roche Diagnostics and Boehringer Mannheim, respectively). The cell cultures were maintained in a 5% CO$_2$ atmosphere at 37° C. During the proliferation phase, culture medium was renewed every 2 days. For differentiation and infection, cells were maintained for 2 weeks in standard medium and then for at least 2 more weeks in medium supplemented with 1.8-2.0% DMSO (Sigma).

2) Primary Human Hepatocytes (PHH) were freshly prepared from human liver resection as previously described by Lecluyse, E. L. & Alexandre, E. (Isolation and culture of primary hepatocytes from resected human liver tissue. *Methods Mol Biol*, 2010, 640, p 57-82, https://doi.org/10.1007/978-1-60761-688-7_3) on page 63 paragraph 3. "Methods" from section 3.1. through 3.6.2. page 77. All experimental procedures were conducted in conformity with French laws and regulations and were approved by the National Ethics Committee.

3) Cell viability was measured by both neutral red and MTS (CellTiter 96 Aqueous One Solution cell proliferation assay; Promega) tests.

4) HBV inoculum (genotype D, serotype ayw, Galibert's strain referred as NC_003977.2 at NCBI) was prepared from HepAD38 (see Ladner, S. K. et al., Inducible expression of human hepatitis B virus (HBV) in stably transfected hepatoblastoma cells: a novel system for screening potential inhibitors of HBV replication. *Antimicrob Agents Chemother*, 1997, 41, p 11715-1720) supernatants by polyethylene-glycol-MW-8000 (PEG8000, SIGMA) precipitation (8% final) as previously described by Luangsay, S. et al. (Early inhibition of hepatocyte innate responses by hepatitis B virus. J Hepatol, 2015, 63, p 1314-1322, https://doi.org/10.1016/j.jhep.2015.07.014).

Viral stocks with titer reaching at least 1×10$^{10}$ viral genome equivalent (vge)/mL were tested endotoxin free.

Differentiated HepaRG (dHepaRG) or PHH were infected by HBV at a multiplicity of infection of 100-200 vge/cell in culture medium containing 4% PEG 8000 (Sigma) for 16 h at 37° C. in 12- or six-well plates. At the end of the incubation period, cells were washed once with medium and then cultured in Williams E medium containing DMSO as indicated. In general infection was left for 7 days before any treatment was started, to allow replication reaching its maximum.

5) Infected cell treatment with compounds of interest:

5a: After 7 days of infection with the virus (day 0 to day 7), the dHepaRG cells were treated (3 treatments: day 7, day 10 and day 12) with a 1 µM solution of the tested compound (diluted with sterile water from a 10 mM stock DMSO solution) or DMSO as reference negative control for 7 more days.

5b: After 4 days of infection with the virus (day 0 to day 4), the PHH cells were treated (3 treatments: day 4, day 7 and day 9) with a 1 µM solution of the tested compound (diluted with sterile water from a 10 mM stock DMSO solution) for 7 more days.

6) Quantification of virion associated secreted HBV DNA in cell culture supernatant:

At the end of the experiment (7 days treatment) the supernatant of infected and treated cells (either dHepaRG or PHH or others) is collected. It is diluted 1/4 into sterile water (molecular biology quality) then treated for 30 minutes with RNAse (10 unit) and DNAse (10 unit) to remove non encapsidated material. Four microliters are used for qPCR analysis as described in Lucifora et al. (Direct antiviral properties of TLR ligands against HBV replication in immune-competent hepatocytes, *Science Scientific Reports*, 2018, 8:5390). For the standard curve a plasmid containing one genome unit of HBV (genotype D, serotype ayw, Galibert's strain) is diluted and use as qPCR template to cover concentration between 10 and $10^8$ vge/mL.

Results are reported as: mean % of replication compared to DMSO treated cells (100%) from at least 2 experiments (n≥2); with each experiment performed with 3 biological replicates (i.e. ≥6 total data points per compound).

Anti HBV activity and cytotoxicity in dHepaRG and Primary Human Hepatocytes (PHH) table:

| Compound number | dHepaRG HBV % of replication at 1 µM compared to DMSO | PHH HBV % of replication at 1 µM compared to DMSO | Cytotoxicity ($CC_{50}$ in µM) in dHepaRG CellTiter-Glo ® |
|---|---|---|---|
| DMSO | 100% | 100% | |
| ADF | ++ | ++ | |
| TFV | ++++ | ++++ | +++ |
| TAF | ++++ | ++++ | + |
| 3 | ++++ | ++++ | +++ |
| 2 | ++++ | ++++ | |
| 5 | ++++ | ++++ | |
| 19 | ++++ | ++++ | |
| 21 | ++++ | ++++ | +++ |
| 15 | ++++ | ++++ | |
| 17 | +++ | ++++ | |
| 7 | ++ | ++ | |
| 8 | ++ | ++ | |
| 1 | ++++ | ++++ | |
| 16 | ++++ | ++++ | |
| 6 | ++ | + | |
| 13 | ++ | ++++ | |
| 10 | ++ | ++++ | |
| 25 | ++ | ++ | |
| 14 | ++ | ++ | |
| 3a | ++++ | ++++ (*) | |
| 5c | + | +++ (*) | |
| 5b | +++ | ++++ (*) | |
| 20 | ++++ | ++++ (*) | +++ |
| 21a | ++++ | ++++ (*) | |

HBV % of replication at 1 µM compared to DMSO is provided as follows: ++++ ≤ 30% < +++ ≤ 50% < ++ ≤ 80% < +
$CC_{50}$ is provided as follows: + < 10 µM ≤ ++ ≤ 50 µM < +++
(*) n = 1

The invention claimed is:

1. A Compound of formula (III):

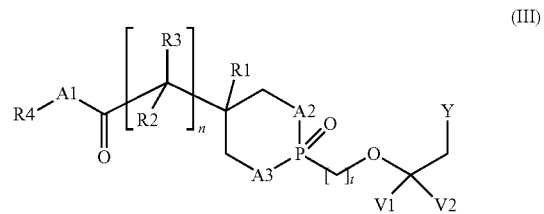

or a pharmaceutically acceptable salt, isotope or solvate thereof,
wherein
A1 represents O, S or NR5,
A2 represents O, S or NR6,
A3 represents O, S or NR7,
R1, R2 and R3 each independently represent H, an optionally substituted $C_1$-$C_8$ alkyl, or a halogen, and R2 and R3 can be linked together with the carbon atom to which they are attached to form a 3- to 9-membered cyclic optionally substituted cycloalkyl fragment,
R4 and R5 each independently represent H, an optionally substituted $C_1$-$C_{24}$ alkyl, a ($C_1$-$C_3$ alkylene)$_q$-($C_3$-$C_7$ cycloalkyl), a ($C_1$-$C_3$ alkylene)$_r$-($C_6$-$C_{10}$ aryl), a ($C_1$-$C_3$ alkylene)$_u$-(4-7 membered heterocycloalkyl), a ($C_1$-$C_3$ alkylene)$_w$-(5-6 membered monocycloheteroaryl) or a ($C_1$-$C_3$ alkylene)$_z$-(9-10 membered bicycloheteroaryl),
when A1 is NR5, R4 can be linked with R5 and form a cyclic amine with the N of NR5,
R6 represents H or an optionally substituted $C_1$-$C_8$ alkyl, a $C_1$-$C_8$ haloalkyl, a C1-C8 hydroxyalkyl,
R7 represents H, an optionally substituted $C_1$-$C_8$ alkyl,
n represents an integer comprised from 1 to 3, and
q, r, u, w and z independently represent an integer chosen from 0 or 1
t represents an integer comprised from 0 to 3,
V1 and V2 each independently represent H, an optionally substituted $C_1$-$C_6$ alkyl, or V1 and V2 can be linked together with the carbon atom to which they are attached to form a 3- to 13-membered cyclic optionally substituted cycloalkyl fragment, and
Y represents a nucleobase.

2. The Compound according to claim 1, wherein V1 and V2 each independently represent H or a $C_1$-$C_3$ alkyl, a $C_1$-$C_3$ haloalkyl or a $C_1$-$C_3$ hydroxyalkyl or V1 and V2 can be linked together with the carbon atom to which they are attached to form a 3- to 8, preferably 5- to 7-, membered cycloalkyl, halocycloalkyl or hydroxycycloalkyl fragment, preferably H or a methyl and t represents an integer chosen from 1 or 2.

3. The Compound according to claim 1 of formula (IV):

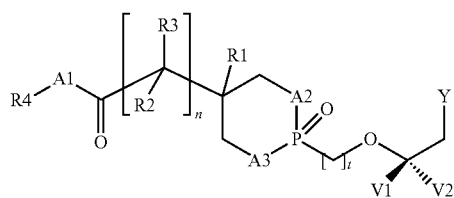

(IV)

wherein preferably

V1 represents H and V2 represents a methyl, or

V2 represents H and V1 represents a methyl.

4. The Compound according to claim 1, wherein A2 and A3 are O.

5. The Compound according to claim 1, wherein Y represents a nucleobase moiety of formula (V):

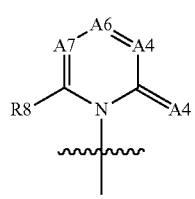

(V)

wherein

A4 represents O or S,

A5 represents N or NR9,

A6 represents C=O or C—R10,

A7 represents N or CR11,

R8 and R11 each independently represent H, an optionally substituted $C_1$-$C_6$ alkyl, an optionally substituted $C_2$-$C_6$ alkenyl, an optionally substituted $C_2$-$C_6$ alkynyl, OR13, SR13, N(R13)$_2$ or a halogen, R9 represents N, CR12, C(OR12) or C(NHR12), R10 represents H, an optionally substituted $C_1$-$C_7$ alkyl, an optionally substituted $C_2$-$C_6$ alkenyl, an optionally substituted $C_2$-$C_6$ alkynyl, CN, NO$_2$, OR14, NH(OR14), N(R14)$_2$, SR14, NHC(O)OR14, N[C(O) OR14]$_2$, N[C(O)R14]$_2$, NHC(O)N(R14)$_2$, N(R14)C (O)R14, 5-6 membered monocycloheteroaryl, 9-10 membered bicycloheteroaryl or a halogen, R12, R13 and R14 each independently represent H, an optionally substituted $C_1$-$C_{24}$ alkyl, a ($C_1$-$C_3$ alkylene)$_a$-($C_3$-$C_7$ cycloalkyl), a ($C_1$-$C_3$ alkylene)$_b$-($C_6$-$C_{10}$ aryl), a ($C_1$-$C_3$ alkylene)$_d$-(4-7 membered heterocycloalkyl), a ($C_1$-$C_3$ alkylene)$_e$-(5-6 membered monocycloheteroaryl) or a ($C_1$-$C_3$ alkylene)$_f$-(9-10 membered bicycloheteroaryl), and a, b, d, e and f independently represent an integer chosen from 0 or 1.

6. The Compound according to claim 1, wherein Y represents a nucleobase moiety of formula (IX):

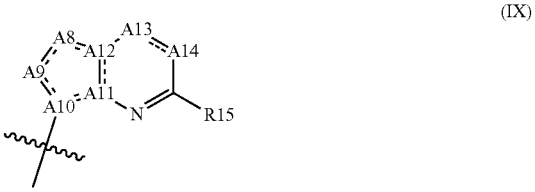

(IX)

wherein

A8 and A9 are each independently selected from N, CR16, C(OR16), C(NHR16),

A10, A11 and A12 independently represent C or N, with at least one of A10, A11, A12 representing N, A13 represents C(O) or CR17, A14 represents N or NR18, R15 and R17 independently represent H, an optionally substituted $C_1$-$C_7$ alkyl, an optionally substituted $C_2$-$C_6$ alkenyl, an optionally substituted $C_2$-$C_6$ alkynyl, CN, NO$_2$, OR19, N(R19)$_2$, SR19, NHC(O)OR19, N[C(O) OR19]$_2$, NHC(O)N(R19)$_2$, N(R19)C(O)R19, N[C(O) R19]$_2$, 5-6 membered monocycloheteroaryl, 9-10 membered bicycloheteroaryl or a halogen, R16 and R18 independently represent H or an optionally substituted $C_1$-$C_6$ alkyl, R19 represents H, an optionally substituted $C_1$-$C_{24}$ alkyl, a ($C_1$-$C_3$ alkylene)$_g$-($C_3$-$C_7$ cycloalkyl), an optionally substituted ($C_1$-$C_3$ alkylene)$_i$-($C_6$-$C_{10}$ aryl), a ($C_1$-$C_3$ alkylene)$_j$-(4-7 membered heterocycloalkyl), a ($C_1$-$C_3$ alkylene)$_k$-(5-6 membered monocycloheteroaryl) or a ($C_1$-$C_3$ alkylene)$_l$-(9-10 membered bicycloheteroaryl), g, i, j, k and l independently represent an integer chosen from 0 or 1, and there are at least three double bonds in the double cyclic structure formed by A8, A9, A10, A11, A12, A13 and A14 of formula (IX).

7. The Compound according to claim 6, characterised in that Y is of formula (X), (XI), (XII) or (XIII):

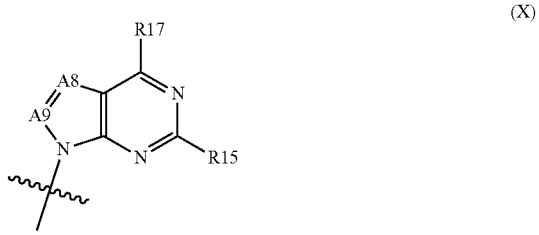

(X)

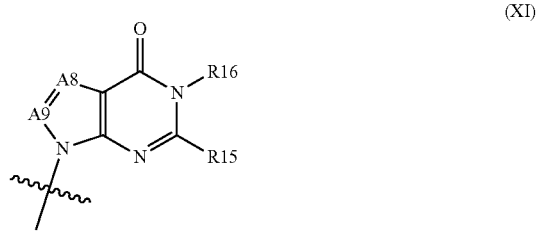

(XI)

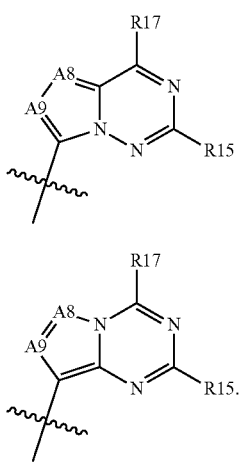

8. The Compound according to claim 7, wherein
Y is of formula (X),
A8 represents N,
A9 represents CH,
R15 represents H,
R17 represents $N(R19)_2$, NHC(O)OR19, $N[C(O)OR19]_2$, $NHC(O)N(R19)_2$, N(R19)C(O)R19, or $N[C(O)R19]_2$, and
R19 represents H, a $C_1$-$C_4$ alkyl, a phenyl, a halophenyl.

9. The Compound according to claim 1 for its use as a medicament.

10. The Compound according to claim 1 for its use as an antiviral drug and/or as a hepatic-targeted drug.

11. The Compound according to claim 1 for its simultaneous, separate or sequential use with at least one of the following compounds: a viral polymerase or reverse transcriptase inhibitor, a reverse transcriptase translocation inhibitor, Interferon alpha, Interferon beta, Interferon lambda, an immune response stimulator and/or modulator, an RNAi viral gene silencer, a nucleoside reverse transcriptase inhibitor (NRTI), a nucleotide reverse transcriptase inhibitor, a non-nucleoside reverse transcriptase inhibitor (NNRTI), a viral protease inhibitor, a viral integrase inhibitor, a viral fusion/entry inhibitor, a viral capsid assembly modulator and/or inhibitor, a prenylation inhibitor, an anti-HBV and/or anti-HDV toll-like receptor agonist, a CRISPR-Cas9 antiviral treatment compound, a viral gene editing treatment compound, a sodium-taurocholate cotransporting polypeptide (NTCP)-receptor inhibitor, a hepatitis B surface antigen (HBsAg) inhibitor, an antisense viral mRNA binder, a viral therapeutic vaccine, a cyclophilin inhibitor, a farnesoid X receptor (FXR) agonist.

12. The compound according to claim 1, wherein
A2 and/or A3 independently represent O,
R4 represents H or a $C_1$-$C_6$ alkyl, a $C_1$-$C_6$ haloalkyl, or a $C_1$-$C_6$ hydroxyalkyl, and
if A1 is NR5, R5 represents H or a $C_1$-$C_6$ alkyl, a $C_1$-$C_6$ haloalkyl, or a $C_1$-$C_6$ hydroxyalkyl.

13. The compound according to claim 1, wherein
A1 represents O,
R2 and/or R3 represent H, and
R4, R6 and R7 each independently represent H or a $C_1$-$C_6$ alkyl.

14. The compound according to claim 10 for treatment of HBV, HDV and/or HIV infections.

* * * * *